(12) United States Patent
Choi

(10) Patent No.: US 11,174,920 B2
(45) Date of Patent: Nov. 16, 2021

(54) TRANSMISSION APPARATUS OF AGRICULTURAL WORKING AUTOMOBILE

(71) Applicant: LS MTRON LTD., Anyang-si (KR)

(72) Inventor: Kyu Beom Choi, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 254 days.

(21) Appl. No.: 16/089,474

(22) PCT Filed: Mar. 31, 2017

(86) PCT No.: PCT/KR2017/003554
§ 371 (c)(1),
(2) Date: Sep. 28, 2018

(87) PCT Pub. No.: WO2017/171472
PCT Pub. Date: Oct. 5, 2017

(65) Prior Publication Data
US 2019/0178348 A1 Jun. 13, 2019

(30) Foreign Application Priority Data
Mar. 31, 2017 (KR) .................. 10-2017-0041655

(51) Int. Cl.
*F16H 3/091* (2006.01)
*F16H 3/24* (2006.01)
(Continued)

(52) U.S. Cl.
CPC ............ *F16H 3/091* (2013.01); *A01B 71/02* (2013.01); *B60K 6/48* (2013.01); *F16H 3/093* (2013.01);
(Continued)

(58) Field of Classification Search
CPC ............. F16H 3/091; F16H 3/24; F16H 3/093
See application file for complete search history.

(56) References Cited

U.S. PATENT DOCUMENTS 1,396,512 A * 11/1921 Fergusson ................ F16H 3/22
74/343
1,447,856 A * 3/1923 Johnson .................... F16H 3/24
74/343
(Continued)

FOREIGN PATENT DOCUMENTS

DE 2802166 A1 7/1979
DE 102005003027 B3 2/2006
(Continued)

OTHER PUBLICATIONS

European Search Report for related European Application No. 1775896.8; dated Oct. 28, 2019; (8 pages).
(Continued)

*Primary Examiner* — Terence Boes
(74) *Attorney, Agent, or Firm* — K&L Gates LLP

(57) ABSTRACT

The present invention relates to a transmission apparatus of an agricultural working automobile, the transmission apparatus comprising: a first gear-shifting part for performing gear-shifting to adjust the speed of an agricultural working automobile; and a second gear-shifting part for performing gear-shifting to adjust the speed of the agricultural working automobile, wherein the second gear-shifting part comprises a sub-gear-shifting drive mechanism for performing gear-shifting, using one operation selected from among an operation transferred through a first power transmission path from the first gear-shifting part and an operation transferred through a second power transmission path from the first gear-shifting part.

12 Claims, 39 Drawing Sheets

(51) Int. Cl.
*F16H 3/093* (2006.01)
*B60K 6/48* (2007.10)
*A01B 71/02* (2006.01)
*A01B 33/08* (2006.01)

(52) U.S. Cl.
CPC .............. *F16H 3/24* (2013.01); *A01B 33/082* (2013.01); *Y02T 10/62* (2013.01)

(56) References Cited

U.S. PATENT DOCUMENTS

| | | | | |
|---|---|---|---|---|
| 1,497,274 | A | * | 6/1924 | Hawley ..................... F16H 3/24 74/343 |
| 1,524,476 | A | * | 1/1925 | Fawick ..................... F16H 3/24 74/343 |
| 1,638,149 | A | * | 8/1927 | Cotta ........................ F16H 3/24 74/343 |
| 1,850,834 | A | * | 3/1932 | Finch ................... F16H 63/3408 74/473.33 |
| 1,859,788 | A | * | 5/1932 | Padgett ..................... F16H 3/24 74/745 |
| 5,383,375 | A | | 1/1995 | Ogawa et al. |
| 6,718,841 | B1 | | 4/2004 | Schepperle |
| 2011/0308343 | A1 | | 12/2011 | Nakamura |

FOREIGN PATENT DOCUMENTS

| | | |
|---|---|---|
| DE | 102005033027 A1 | 1/2007 |
| DE | 102006038193 A1 | 2/2008 |
| DE | 102013224742 A1 | 6/2015 |
| JP | H07139618 A | 5/1995 |
| JP | H10169727 A | 6/1998 |
| JP | 2003-176858 | 6/2003 |
| JP | 2003-287088 | 10/2003 |
| JP | 2007-085436 | 4/2007 |

OTHER PUBLICATIONS

International Search Report for related International Application No. PCT/KR2017/003554; dated Oct. 5, 2017; (3 Pages).
Written Opinion for related International Application No. PCT/KR2017/003554; dated Oct. 5, 2017; (8 Pages).
Office Action in CN Application No. 201780022533.1, dated Dec. 3, 2020 (11 pages).

* cited by examiner

TRANSMISSION APPARATUS OF AGRICULTURAL WORKING AUTOMOBILE

CROSS-REFERENCE TO RELATED APPLICATIONS

The present application is a National Stage of International Application No. PCT/KR2017/003554 filed Mar. 31, 2017, which claims priority to Korean Application No. 10-2016-0040468, filed Apr. 1, 2016, Korean Application No. 10-2016-0041428, filed on Apr. 5, 2016, Korean Application No. 10-2017-0041655, filed on Mar. 31, 2017, and Korean Application No. 10-2017-0041665 filed on Mar. 31, 2017 the disclosures of which are incorporated herein by reference.

TECHNICAL FIELD

The present invention relates to a transmission apparatus of an agricultural working automobile configured to adjust a speed of the agricultural working automobile.

BACKGROUND ART

Agricultural working automobiles are used to cultivate crops, which are necessary for human life, using soil. For example, combines, tractors, or the like correspond to the agricultural working automobile. The combine performs the work of reaping and threshing crops such as rice, barley, wheat, beans, or the like. The tractor performs the work necessary for cultivating crops using a traction force.

The agricultural working automobile includes a transmission apparatus to adjust a torque, a speed, etc. as needed during work.

FIG. 1 is a schematic block diagram of a transmission apparatus of an agricultural working automobile according to the related art.

Referring to FIG. 1, a transmission apparatus 11 of an agricultural working automobile according to the related art includes a first gear-shifting part 12 for gear shifting and a second gear-shifting part 13 for gear shifting.

The first gear-shifting part 12 includes a first drive mechanism 121 driven by a driving power provided from an engine and an output mechanism 122 driven by a driving power provided from the first drive mechanism 121. The first drive mechanism 121 performs the gear shifting using a plurality of gears and a sleeve.

The second gear-shifting part 13 includes an input mechanism 131 driven by a driving power provided from the output mechanism 122 and a second drive mechanism 133 driven by a driving power provided from the input mechanism 131. The second drive mechanism 133 performs the gear shifting using a plurality of gears and a sleeve.

In the transmission apparatus 11 of an agricultural working automobile according to the related art, the second gear-shifting part 13 and the first gear-shifting part 12 are connected to each other only through a connection between the output mechanism 122 and the input mechanism 131.

That is, in the transmission apparatus 11 of an agricultural working automobile according to the related art, the second gear-shifting part 13 and the first gear-shifting part 12 are connected to each other only through one power transmission path.

Accordingly, in the transmission apparatus 11 of an agricultural working automobile according to the related art, since a driving power provided through one power transmission path needs to be transmitted to each of the gears of the second drive mechanism 133 by the input mechanism 131, a configuration of the input mechanism 131 is complicated, thereby increasing a difficulty in manufacturing work.

DISCLOSURE

Technical Problem

Therefore, the present invention is designed to solve the problems and is for providing a transmission apparatus of an agricultural working automobile which alleviates complexity of a configuration and reduces difficulty of manufacturing work.

Technical Solution

To solve the above problems, the present invention may include the following configurations.

A transmission apparatus of an agricultural working automobile according to the present invention includes a first gear-shifting part which performs gear shifting to adjust a speed of an agricultural working automobile, and a second gear-shifting part which performs gear shifting to adjust the speed of the agricultural working automobile. The second gear-shifting part includes a sub gear-shifting part which performs gear shifting for a driving power transmitted from the first gear-shifting part, the sub gear-shifting part includes a sub gear-shifting drive mechanism which performs gear shifting using a driving power transmitted through one power transmission path selected from a first power transmission path through which the driving power, in which the gear shifting is performed, is transmitted from the first gear-shifting part, and a second power transmission path through which the driving power, in which the gear shifting is performed, is transmitted from the first gear-shifting part.

Advantageous Effects

The present invention can provide the following effects.

The present invention is implemented so that a first gear-shifting part and a second gear-shifting part are connected to each other through a plurality power transmission paths, thereby alleviating complexity of a configuration thereof and improving ease of manufacturing work.

BEST MODE

Hereinafter, embodiments of a transmission apparatus of an agricultural working automobile according to the present invention will be described in detail with reference to the accompanying drawings.

Figure 1:
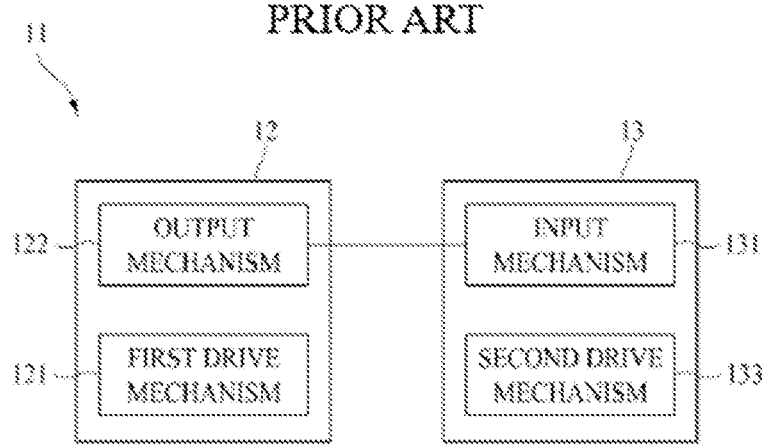
FIG. 1 is a schematic block diagram of a transmission apparatus of an agricultural working automobile according to the related art.
Figure 2:
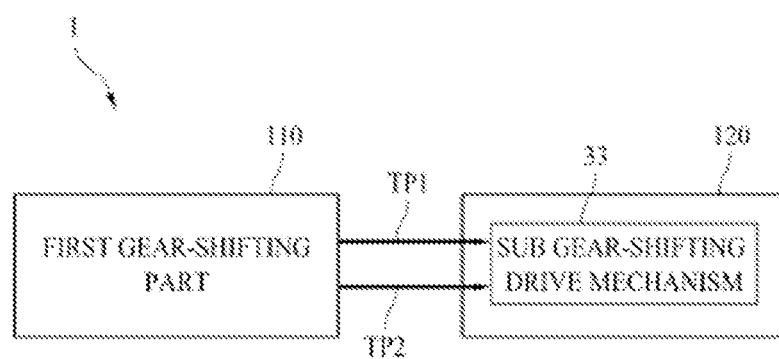
FIG. 2 is a schematic block diagram of a transmission apparatus of an agricultural working automobile according to the present invention.
Figure 3:
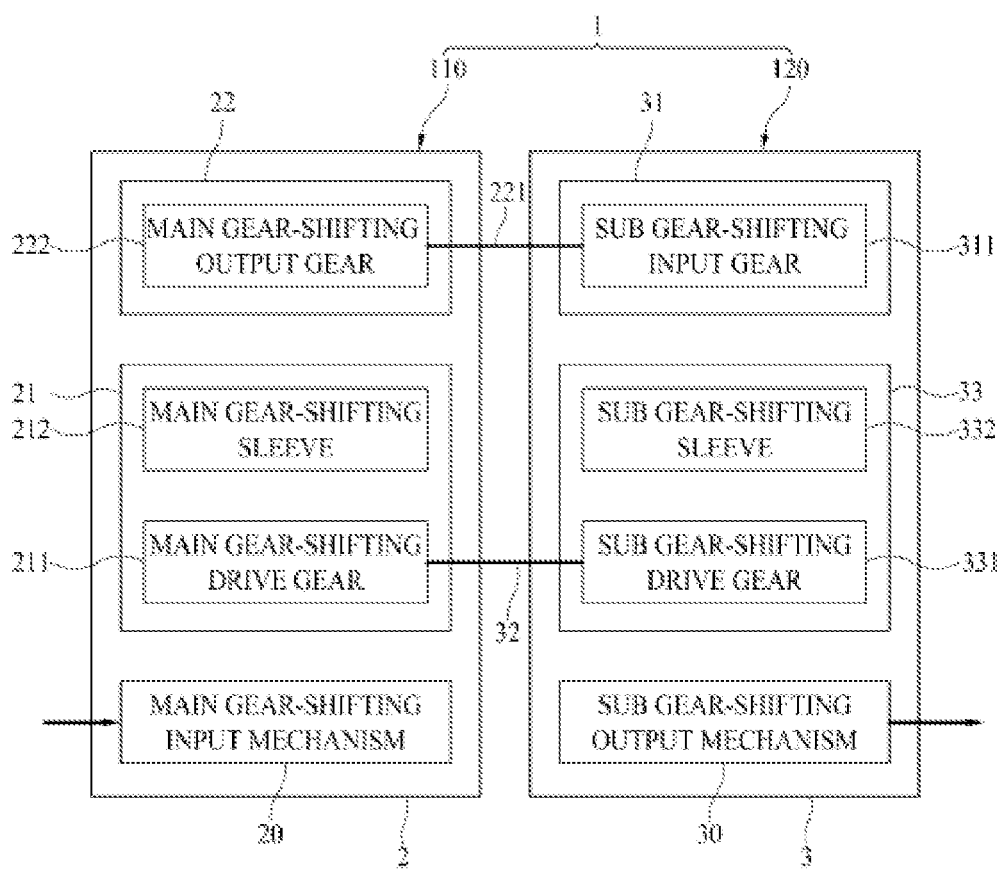
FIG. 3 is a schematic block diagram of a transmission apparatus of an agricultural working automobile according to a first embodiment of the present invention.

Referring to FIGS. 2 and 3, a transmission apparatus 1 of an agricultural working automobile according to the present invention is installed in an agricultural working automobile (not shown) such as tractors, combines or the like. The transmission apparatus 1 of an agricultural working automobile according to the present invention performs a gear-shifting function, which adjusts a torque, a speed, or the like as needed, in the agricultural working automobile.

The transmission apparatus 1 of an agricultural working automobile according to the present invention may include a first gear-shifting part 110 which performs gear shifting to adjust the speed of the agricultural working automobile, and a second gear-shifting part 120 which performs gear shifting to adjust the speed of the agricultural working automobile. The second gear-shifting part 120 may include a sub gear-shifting part 3 (shown in FIG. 3) which performs the gear shifting on the driving power transmitted from the first gear-shifting part 110. The sub gear-shifting part 3 may include a sub gear-shifting drive mechanism 33 which performs the gear shifting using the driving power transmitted through one power transmission path selected from a first power transmission path TP1 through which the driving power, in which the gear shifting is performed, is transmitted from the first gear-shifting part 110, and a second power transmission path TP2 through which the driving power, in which the gear shifting is performed, is transmitted from the first gear-shifting part 110.

Accordingly, the transmission apparatus 1 of an agricultural working automobile according to the present invention is implemented such that the first gear-shifting part 110 and the second gear-shifting part 120 are connected to each other through the plurality of power transmission paths TP1 and TP2. Thus, the transmission apparatus 1 of an agricultural working automobile according to the present invention may divide a configuration for transmitting the driving power to the sub gear-shifting drive mechanism 33 into each of the first power transmission path TP1 and the second power transmission path TP2. Accordingly, the transmission apparatus 1 of an agricultural working automobile according to the present invention may alleviate complexity of the configuration for transmitting the driving power in which the gear shifting is performed at different speeds to the sub gear-shifting drive mechanism 33 and also improve ease of manufacturing work.

Here, the transmission apparatus 1 of an agricultural working automobile according to the present invention may mainly include a first embodiment and a second embodiment according to a structure of the first gear-shifting part 110. Hereinafter, the transmission apparatus 1 of an agricultural working automobile according to the first and second embodiments of the present invention will be sequentially described with reference to the accompanying drawings.

First Embodiment

A transmission apparatus 1 of an agricultural working automobile according to a first embodiment of the present invention may include the first gear-shifting part 110 and the second gear-shifting part 120.

Referring to FIG. 2, the first gear-shifting part 110 performs gear shifting to adjust a speed of the agricultural working automobile. The first gear-shifting part 110 may be installed in the agricultural working automobile. The first gear-shifting part 110 may be connected to the second gear-shifting part 120. The first gear-shifting part 110 may perform the gear shifting on the driving power provided from a first external device and output the driving power in which the gear shifting is performed to the second gear-shifting part 120. The second gear-shifting part 120 may perform additional gear shifting on the driving power transmitted from the first gear-shifting part 110 and output the driving power in which the additional gear shifting is performed to a second external device. The first external device may be an engine (not shown) of the agricultural working automobile. The second external device may be a driving device (not shown) of the agricultural working automobile.

Referring to FIGS. 2 and 3, the first gear-shifting part 110 may include a main gear-shifting part 2.

The main gear-shifting part 2 performs first gear shifting to adjust the speed of the agricultural working automobile. The main gear-shifting part 2 may perform the first gear shifting on the driving power provided from the first external device, and output the driving power in which the first gear shifting is performed. The main gear-shifting part 2 may output the driving power in which the first gear shifting is performed to the second gear-shifting part 120. When the main gear-shifting part 2 is implemented to be directly connected to the sub gear-shifting part 3, the main gear-shifting part 2 may output the driving power in which the first gear shifting is performed to the sub gear-shifting part 3.

Figure 4:
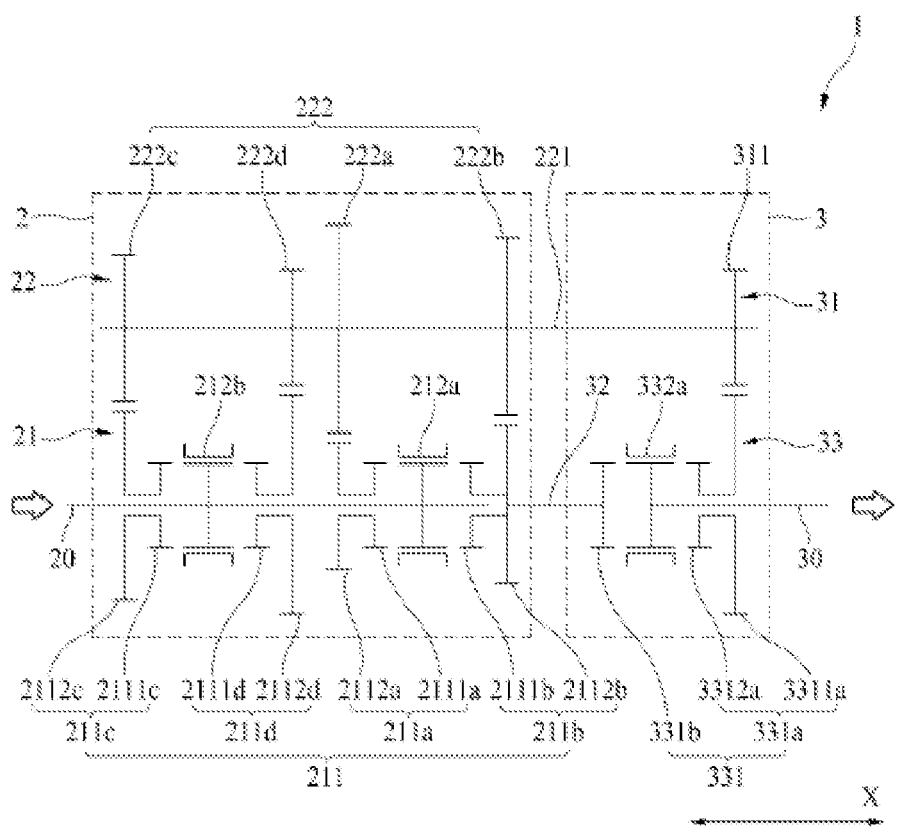
FIG. 4 is a schematic power transmission diagram of the transmission apparatus of an agricultural working automobile according to the first embodiment of the present invention.

Referring to FIGS. 3 and 4, the main gear-shifting part 2 may include a main gear-shifting drive mechanism 21 and a main gear-shifting output mechanism 22.

The main gear-shifting drive mechanism 21 performs the first gear shifting on the driving power provided from the engine (not shown). The main gear-shifting drive mechanism 21 may be connected to a main gear-shifting input mechanism 20. The main gear-shifting input mechanism 20 is rotated by the driving power provided from the engine. The main gear-shifting input mechanism 20 may function as a rotation shaft in the main gear-shifting drive mechanism 21. For example, the main gear-shifting input mechanism 20 may be a shaft. The main gear-shifting drive mechanism 21 may perform the first gear shifting on the driving power transmitted through the main gear-shifting input mechanism 20. The main gear-shifting drive mechanism 21 may be connected to the main gear-shifting output mechanism 22. The main gear-shifting drive mechanism 21 may perform the first gear shifting in conjunction with the main gear-shifting output mechanism 22.

The main gear-shifting drive mechanism 21 may include a plurality of main gear-shifting drive gears 211. The main gear-shifting drive mechanism 21 may include a number of main gear-shifting drive gears 211 corresponding to a first gear-shifting stage performable by the main gear-shifting part 2. Each of the main gear-shifting drive gears 211 transmits the driving power using a plurality of gear teeth and may be, for example, a helical gear.

The main gear-shifting drive mechanism 21 may include at least one main gear-shifting sleeve 212. The main gear-shifting sleeve 212 may be selectively connected to any one of the two main gear-shifting drive gears 211. The main gear-shifting sleeve 212 may be connected to a corresponding main gear-shifting drive gear 211 by being selectively engaged with any one of the two main gear-shifting drive gears 211. The main gear-shifting sleeve 212 may be selectively connected to any one of the two main gear-shifting drive gears 211 by a gear-shifting operation of an operator. The main gear-shifting sleeve 212 may be coupled to the main gear-shifting input mechanism 20. Accordingly, the main gear-shifting sleeve 212 may rotate as the main gear-shifting input mechanism 20 rotates. The main gear-shifting sleeve 212 may rotate about the main gear-shifting input mechanism 20 as a rotation shaft. In this case, the main gear-shifting drive gears 211 connected to the main gear-shifting sleeve 212 may rotate. The main gear-shifting sleeve 212 may be a synchronizer sleeve. The main gear-shifting drive mechanism 21 may include a required number of the main gear-shifting sleeves 212 according to the first gear-shifting stage to be performed by the main gear-shifting part 2.

For example, the main gear-shifting drive mechanism 21 may include a first main gear-shifting drive gear 211a, a second main gear-shifting drive gear 211b, and a first main gear-shifting sleeve 212a. In this case, the main gear-shifting drive mechanism 21 may be implemented as described below.

The first main gear-shifting drive gear 211a may be idly coupled to the main gear-shifting input mechanism 20. A bearing (not shown) may be installed between the first main gear-shifting drive gear 211a and the main gear-shifting input mechanism 20. The first main gear-shifting drive gear 211a may include a first drive input gear 2111a for being connected to the first main gear-shifting sleeve 212a and a first drive output gear 2112a for being connected to the main gear-shifting output mechanism 22.

The second main gear-shifting drive gear 211b may be idly coupled to the main gear-shifting input mechanism 20. A bearing (not shown) may be installed between the second main gear-shifting drive gear 211b and the main gear-shifting input mechanism 20. The second main gear-shifting drive gear 211b and the first main gear-shifting drive gear 211a may be disposed to be spaced apart from each other in a first axis direction (an X axis direction). The first axis direction (the X axis direction) is a direction parallel to the main gear-shifting input mechanism 20. The second main gear-shifting drive gear 211b may include a second drive input gear 2111b for being connected to the first main gear-shifting sleeve 212a and a second drive output gear 2112b for being connected to the main gear-shifting output mechanism 22. When the second main gear-shifting drive gear 211b performs the gear shifting at a higher speed than the first main gear-shifting drive gear 211a, the second main gear-shifting drive gear 2112b may be implemented to have a greater diameter than the first drive output gear 2112a.

The first main gear-shifting sleeve 212a may be coupled to the main gear-shifting input mechanism 20 so as to be positioned between the first main gear-shifting drive gear 211a and the second main gear-shifting drive gear 211b. The first main gear-shifting sleeve 212a may be coupled to the main gear-shifting input mechanism 20 to be movable in the first axis direction (the X axis direction). Accordingly, the first main gear-shifting sleeve 212a may be selectively connected to the first main gear-shifting drive gear 211a or the second main gear-shifting drive gear 211b to perform the first gear shifting. In this case, the first main gear-shifting sleeve 212a may move along the first axis direction (the X axis direction) by the gear-shifting operation of the operator. When the first main gear-shifting sleeve 212a moves to a left side with reference to FIG. 4, the first main gear-shifting sleeve 212a may be engaged with the first main gear-shifting drive gear 211a to rotate the first main gear-shifting drive gear 211a. Accordingly, the main gear-shifting part 2 may perform the first gear shifting using the first main gear-shifting drive gear 211a. When the first main gear-shifting sleeve 212a moves to a right side with reference to FIG. 4, the first main gear-shifting sleeve 212a may be engaged with the second main gear-shifting drive gear 211b to rotate the second main gear-shifting drive gear 211b. Accordingly, the main gear-shifting part 2 may perform the first gear shifting using the second main gear-shifting drive gear 211b.

As described above, when the main gear-shifting drive mechanism 21 includes the first main gear-shifting sleeve 212*a*, the second main gear-shifting drive gear 211*b*, and the first main gear-shifting drive gear 211*a*, the main gear-shifting part 2 may perform the first gear shifting in two stages.

For example, the main gear-shifting drive mechanism 21 may further include a third main gear-shifting drive gear 211*c*, a fourth main gear-shifting drive gear 211*d*, and a second main gear-shifting sleeve 212*b* in addition to the first main gear-shifting drive gear 211*a*, the second main gear-shifting drive gear 211*b*, and the first main gear-shifting sleeve 212*a*. In this case, the main gear-shifting drive mechanism 21 may be implemented as described below.

The third main gear-shifting drive gear 211*c* may be idly coupled to the main gear-shifting input mechanism 20. A bearing (not shown) may be installed between the third main gear-shifting drive gear 211*c* and the main gear-shifting input mechanism 20. The third main gear-shifting drive gear 211*c* may include a third drive input gear 2111*c* for being connected to the second main gear-shifting sleeve 212*b* and a third drive output gear 2112*c* for being connected to the main gear-shifting output mechanism 22.

The fourth main gear-shifting drive gear 211*d* may be idly coupled to the main gear-shifting input mechanism 20. A bearing (not shown) may be installed between the fourth main gear-shifting drive gear 211*d* and the main gear-shifting input mechanism 20. The fourth main gear-shifting drive gear 211*d* and the third main gear-shifting drive gear 211*c* may be disposed to be spaced apart from each other in the first axis direction (the X axis direction). The fourth main gear-shifting drive gear 211*d* may be disposed to be positioned between the third main gear-shifting drive gear 211*c* and the first main gear-shifting drive gear 211*a*. The fourth main gear-shifting drive gear 211*d* may include a fourth drive input gear 2111*d* for being connected to the second main gear-shifting sleeve 212*b* and a fourth drive output gear 2112*d* for being connected to the main gear-shifting output mechanism 22. When the fourth main gear-shifting drive gear 211*d* performs the gear shifting at a higher speed than the third main gear-shifting drive gear 211*c*, the fourth drive output gear 2112*d* may be implemented to have a greater diameter than the third drive output gear 2112*c*. When the fourth main gear-shifting drive gear 211*d* is implemented as a fourth speed stage, the third main gear-shifting drive gear 211*c* is implemented as a third speed stage, the second main gear-shifting drive gear 211*b* is implemented as a second speed stage, and the first main gear-shifting drive gear 211*a* is implemented as a first speed stage, in order from the highest speed to the lowest speed, the fourth drive output gear 2112*d* may be implemented to have the greatest diameter and the first drive output gear 2112*a* may be implemented to have the smallest diameter. The second drive output gear 2112*b* may be implemented to have a greater diameter than the first drive output gear 2112*a* and a smaller diameter than the third drive output gear 2112*c*.

The second main gear-shifting sleeve 212*b* may be coupled to the main gear-shifting input mechanism 20 so as to be positioned between the third main gear-shifting drive gear 211*c* and the fourth main gear-shifting drive gear 211*d*. The second main gear-shifting sleeve 212*b* may be coupled to the main gear-shifting input mechanism 20 to be movable in the first axis direction (the X axis direction). Accordingly, the second main gear-shifting sleeve 212*b* may be selectively connected to the third main gear-shifting drive gear 211*c* or the fourth main gear-shifting drive gear 211*d* to perform the first gear shifting. In this case, the second main gear-shifting sleeve 212*b* may move along the first axis direction (the X axis direction) by the gear-shifting operation of the operator. When the second main gear-shifting sleeve 212*b* moves to the left side with reference to FIG. 4, the second main gear-shifting sleeve 212*b* may be engaged with the third main gear-shifting drive gear 211*c* to rotate the third main gear-shifting drive gear 211*c*. Accordingly, the main gear-shifting part 2 may perform the first gear shifting using the third main gear-shifting drive gear 211*c*. When the second main gear-shifting sleeve 212*b* moves to the right side with reference to FIG. 4, the second main gear-shifting sleeve 212*b* may be engaged with the fourth main gear-shifting drive gear 211*d* to rotate the fourth main gear-shifting drive gear 211*d*. Accordingly, the main gear-shifting part 2 may perform the first gear shifting using the fourth main gear-shifting drive gear 211*d*.

The second main gear-shifting sleeve 212*b*, the fourth main gear-shifting drive gear 211*d*, and the third main gear-shifting drive gear 211*c* may be disposed on positions spaced apart from the first main gear-shifting sleeve 212*a*, the second main gear-shifting drive gear 211*b*, and the first main gear-shifting drive gear 211*a* in the first axis direction (the X axis direction). In this case, the main gear-shifting input mechanism 20 may be installed to be positioned in each of the fourth main gear-shifting drive gear 211*d*, the third main gear-shifting drive gear 211*c*, the second main gear-shifting drive gear 211*b*, and the first main gear-shifting drive gear 211*a*.

As described above, when the main gear-shifting drive mechanism 21 includes the second main gear-shifting sleeve 212*b*, the fourth main gear-shifting drive gear 211*d*, the third main gear-shifting drive gear 211*c*, the first main gear-shifting sleeve 212*a*, the second main gear-shifting drive gear 211*b*, and the first main gear-shifting drive gear 211*a*, the main gear-shifting part 2 may perform the first gear shifting in four stages.

Although not shown in the drawings, the main gear-shifting part 2 may be implemented to perform the first gear shifting in six stages, eight stages, or the like. When the first gear shifting is performed in the six stages, the main gear-shifting part 2 may include six main gear-shifting drive gears 211 having different diameters and three main gear-shifting sleeves 212. When the first gear shifting is performed in the eight stages, the main gear-shifting part 2 may include eight main gear-shifting drive gears 211 having different diameters and four main gear-shifting sleeves 212.

Meanwhile, the main gear-shifting part 2 may be implemented to perform the first gear shifting in three stages, five stages, seven stages, or the like. When the first gear shifting is performed in the three stages, the main gear-shifting part 2 may include three main gear-shifting drive gears 211 having different diameters and two main gear-shifting sleeves 212. In this case, one main gear-shifting sleeve 212 among the two main gear-shifting sleeves 212 may only move to one side to be connected to one main gear-shifting drive gear 211. When the first gear shifting is performed in the five stages, the main gear-shifting part 2 may include five main gear-shifting drive gears 211 having different diameters and three main gear-shifting sleeves 212. In this case, one main gear-shifting sleeve 212 among the three main gear-shifting sleeves 212 may only move to one side to be connected to one main gear-shifting drive gear 211. When the first gear shifting is performed in the seven stages, the main gear-shifting part 2 may include seven main gear-shifting drive gears 211 having different diameters and four main gear-shifting sleeves 212. In this case, one main gear-shifting sleeve 212 among the four main gear-shifting sleeves 212 may only move to one side to be connected to one main gear-shifting drive gear 211.

Referring to FIGS. 2 to 4, the main gear-shifting output mechanism 22 is driven according to the driving power of the main gear-shifting drive mechanism 21. The main gear-shifting output mechanism 22 is driven in conjunction with the main gear-shifting drive mechanism 21 to output the driving power in which the first gear shifting is performed to the second gear-shifting part 120. When the main gear-shifting part 2 is implemented to be directly connected to the sub gear-shifting part 3, the main gear-shifting output mechanism 22 may output the driving power in which the first gear shifting is performed to the sub gear-shifting part 3.

The main gear-shifting output mechanism 22 may include a main gear-shifting output member 221.

The main gear-shifting output member 221 is connected to the second gear-shifting part 120. Accordingly, the main gear-shifting output member 221 may output the driving power in which the first gear shifting is performed to the second gear-shifting part 120. The main gear-shifting output member 221 may be disposed parallel to the main gear-shifting input mechanism 20. The main gear-shifting output member 221 may function as a rotation shaft in the main gear-shifting output mechanism 22. For example, the main gear-shifting output member 221 may be a shaft. When the main gear-shifting part 2 is implemented to be directly connected to the sub gear-shifting part 3, the main gear-shifting output member 221 may be connected to the sub gear-shifting part 3 to output the driving power in which the first gear shifting is performed to the sub gear-shifting part 3.

The main gear-shifting output mechanism 22 may include a plurality of main gear-shifting output gears 222.

The main gear-shifting output gears 222 are connected to the main gear-shifting output member 221. The main gear-shifting output gears 222 may be connected to the main gear-shifting output member 221 by being coupled to the main gear-shifting output member 221. The main gear-shifting output gears 222 may rotate about the main gear-shifting output member 221 as a rotation shaft. Each of the main gear-shifting output gears 222 may be connected to each of the main gear-shifting drive gears 211 of the main gear-shifting drive mechanism 21. Accordingly, the main gear-shifting output gears 222 may rotate the main gear-shifting output member 221 by rotating by the driving power provided from the main gear-shifting drive gears 221. Each of the main gear-shifting output gears 222 may be connected to each of the main gear-shifting drive gears 211 by being engaged with each of the main gear-shifting drive gears 211. Each of the main gear-shifting output gears 222 may receive the driving power using a plurality of gear teeth. For example, the main gear-shifting output gears 222 may be helical gears.

The main gear-shifting output mechanism 22 may include the same number of main gear-shifting output gears 222 as the main gear-shifting drive gears 211 of the main gear-shifting drive mechanism 21. For example, when the main gear-shifting drive mechanism 21 includes the first main gear-shifting drive gear 211a, the second main gear-shifting drive gear 211b, and the first main gear-shifting sleeve 212a, the main gear-shifting output mechanism 22 may include a first main gear-shifting output gear 222a connected to the first main gear-shifting drive gear 211a and a second main gear-shifting output gear 222b connected to the second main gear-shifting drive gear 211b.

The first main gear-shifting output gear 222a may be coupled to the main gear-shifting output member 221. The first main gear-shifting output gear 222a may be connected to the first main gear-shifting drive gear 211a by being engaged with the first drive output gear 2112a of the first main gear-shifting drive gear 211a. When the first main gear-shifting sleeve 212a is connected to the first main gear-shifting drive gear 211a, the first main gear-shifting output gear 222a may rotate the main gear-shifting output member 221 while rotating as the first main gear-shifting drive gear 211a rotates. When the first main gear-shifting sleeve 212a is connected to the second main gear-shifting drive gear 211b, the first main gear-shifting output gear 222a may rotate as the main gear-shifting output member 221 rotates. In this case, the main gear-shifting output member 221 may rotate as the second main gear-shifting output gear 222b rotates. The first main gear-shifting output gear 222a may be implemented to have a smaller diameter than the first main gear-shifting drive gear 211a. Accordingly, the first main gear-shifting output gear 222a rotates the main gear-shifting output member 221 while rotating, thereby achieving acceleration gear shifting in which the speed is increased. The first main gear-shifting output gear 222a may also be implemented to have a greater diameter than the first main gear-shifting drive gear 211a. In this case, the first main gear-shifting output gear 222a rotates the main gear-shifting output member 221 while rotating, thereby achieving deceleration gear shifting in which the speed becomes slow. The first main gear-shifting output gear 222a may also be implemented to have the same diameter as the first main gear-shifting drive gear 211a. In this case, the driving power may be transmitted from the first main gear-shifting drive gear 211a to the first main gear-shifting output gear 222a without changing the speed.

The second main gear-shifting output gear 222b may be coupled to the main gear-shifting output member 221. The second main gear-shifting output gear 222b may be coupled to the main gear-shifting output member 221 at a position spaced apart from the first main gear-shifting output gear 222a in the first axis direction (the X axis direction). The second main gear-shifting output gear 222b may be connected to the second main gear-shifting drive gear 211b by being engaged with the second main gear-shifting drive gear 2112b of the second main gear-shifting drive gear 211b. When the first main gear-shifting sleeve 212a is connected to the second main gear-shifting drive gear 211b, the second main gear-shifting output gear 222b may rotate the main gear-shifting output member 221 while rotating as the second main gear-shifting drive gear 211b rotates. When the first main gear-shifting sleeve 212a is connected to the first main gear-shifting drive gear 211a, the second main gear-shifting output gear 222b may rotate as the main gear-shifting output member 221 rotates. In this case, the main gear-shifting output member 221 may rotate as the first main gear-shifting output gear 222a rotates. The second main gear-shifting output gear 222b may be implemented to have a smaller diameter than the second main gear-shifting drive gear 211b so that the acceleration gear shifting is achieved. The second main gear-shifting output gear 222b may also be implemented to have a greater diameter than the second main gear-shifting drive gear 211b so that the deceleration gear-shifting is achieved. The second main gear-shifting output gear 222b may also be implemented to have the same diameter as the second main gear-shifting drive gear 211b so that there is no speed change. The second main gear-shifting output gear 222b may be implemented to have a smaller diameter than the first main gear-shifting output gear 222a.

In this case, the second main gear-shifting drive gear 211*b* may be implemented to perform the gear shifting at a higher speed than the first main gear-shifting drive gear 211*a*.

For example, when the main gear-shifting drive mechanism 21 includes the first main gear-shifting drive gear 211*a*, the second main gear-shifting drive gear 211*b*, the first main gear-shifting sleeve 212*a*, the third main gear-shifting drive gear 211*c*, the fourth main gear-shifting drive gear 211*d*, and the second main gear-shifting sleeve 212*b*, the main gear-shifting output mechanism 22 may include a third main gear-shifting output gear 222*c* connected to the third main gear-shifting drive gear 211*c* and a fourth main gear-shifting output gear 222*d* connected to the fourth main gear-shifting drive gear 211*d* in addition to the first main gear-shifting output gear 222*a* and the second main gear-shifting output gear 222*b*.

The third main gear-shifting output gear 222*c* may be coupled to the main gear-shifting output member 221. The third main gear-shifting output gear 222*c* may be connected to the third main gear-shifting drive gear 211*c* by being engaged with the third drive output gear 2112*c* of the third main gear-shifting drive gear 211*c*. When the second main gear-shifting sleeve 212*b* is connected to the third main gear-shifting drive gear 211*c*, the third main gear-shifting output gear 222*c* may rotate the main gear-shifting output member 221 while rotating as the third main gear-shifting drive gear 211*c* rotates. When the second main gear-shifting sleeve 212*b* is not connected to the third main gear-shifting drive gear 211*c*, the third main gear-shifting output gear 222*c* may rotate as the main gear-shifting output member 221 rotates. In this case, the main gear-shifting output member 221 may rotate as at least one of the main gear-shifting output gears 222*a*, 222*b*, and 222*d* other than the third main gear-shifting output gear 222*c* rotates. The third main gear-shifting output gear 222*c* may be implemented to have a smaller diameter than the third main gear-shifting drive gear 211*c* so that the acceleration gear shifting is achieved. The third main gear-shifting output gear 222*c* may also be implemented to have a greater diameter than the third main gear-shifting drive gear 211*c* so that the deceleration gear shifting is achieved. The third main gear-shifting output gear 222*c* may also be implemented to have the same diameter as the third main gear-shifting drive gear 211*c* so that there is no speed change. The third main gear-shifting output gear 222*c* may be implemented to have a smaller diameter than the second main gear-shifting output gear 222*b*. In this case, the third main gear-shifting drive gear 211*c* may be implemented to perform the gear shifting at a higher speed than the second main gear-shifting drive gear 211*b*.

The fourth main gear-shifting output gear 222*d* may be coupled to the main gear-shifting output member 221. The fourth main gear-shifting output gear 222*d* may be coupled to the main gear-shifting output member 221 at a position spaced apart from the third main gear-shifting output gear 222*c* in the first axis direction (the X axis direction). The fourth main gear-shifting output gear 222*d* may be disposed to be positioned between the third main gear-shifting output gear 222*c* and the first main gear-shifting output gear 222*a*. The fourth main gear-shifting output gear 222*d* may be connected to the fourth main gear-shifting drive gear 211*d* by being engaged with the fourth drive output gear 2112*d* of the fourth main gear-shifting drive gear 211*d*. When the second main gear-shifting sleeve 212*b* is connected to the fourth main gear-shifting drive gear 211*d*, the fourth main gear-shifting output gear 222*d* may rotate the main gear-shifting output member 221 while rotating as the fourth main gear-shifting drive gear 211*d* rotates. When the second main gear-shifting sleeve 212*b* is not connected to the fourth main gear-shifting drive gear 211*d*, the fourth main gear-shifting output gear 222*d* may rotate as the main gear-shifting output member 221 rotates. In this case, the main gear-shifting output member 221 may rotate as at least one of the main gear-shifting output gears 222*a*, 222*b*, and 222*c* other than the fourth main gear-shifting output gear 222*d* rotates. The fourth main gear-shifting output gear 222*d* may be implemented to have a smaller diameter than the fourth main gear-shifting drive gear 211*d* so that the acceleration gear shifting is achieved. The fourth main gear-shifting output gear 222*d* may also be implemented to have a greater diameter than the fourth main gear-shifting drive gear 211*d* so that the deceleration gear shifting is achieved. The fourth main gear-shifting output gear 222*d* may also be implemented to have the same diameter as the fourth main gear-shifting drive gear 211*d* so that there is no speed change. The fourth main gear-shifting output gear 222*d* may be implemented to have a smaller diameter than the third main gear-shifting output gear 222*c*. In this case, the fourth main gear-shifting drive gear 211*d* may be implemented to perform the gear shifting at a higher speed than the third main gear-shifting drive gear 211*c*.

When fourth main gear-shifting drive gear 211*d* is implemented as a fourth speed stage, the third main gear-shifting drive gear 211*c* is implemented as a third speed stage, the second main gear-shifting drive gear 211*b* is implemented as a second speed stage, and the first main gear-shifting drive gear 211*a* is implemented as a first speed stage, in order from the highest speed to the lowest speed, the fourth main gear-shifting output gear 222*d* may be implemented to have the smallest diameter, and the first main gear-shifting output gear 222*a* may be implemented to have the greatest diameter. The second main gear-shifting output gear 222*b* may be implemented to have a smaller diameter than the first main gear-shifting output gear 222*a* and a greater diameter than the third main gear-shifting output gear 222*c*.

As described above, when the main gear-shifting output mechanism 22 includes the fourth main gear-shifting output gear 222*d*, the third main gear-shifting output gear 222*c*, the second main gear-shifting output gear 222*b*, and the first main gear-shifting output gear 222*a*, the main gear-shifting part 2 may perform the first gear shifting in four stages.

Although not shown in the drawings, the main gear-shifting part 2 may be implemented to perform the first gear shifting in even-numbered speed stages such as the six stages, the eight stages, or the like. The main gear-shifting part 2 may be implemented to perform the first gear shifting in odd-numbered speed stages such as the three stages, the five stages, the seven stages, or the like.

Referring to FIG. 2, the second gear-shifting part 120 performs gear-shifting to adjust the speed of the agricultural working automobile. The second gear-shifting part 120 may be installed in the agricultural working automobile. The second gear-shifting part 120 may be connected to the first gear-shifting part 110. The second gear-shifting part 120 may perform additional gear shifting on the driving power performed by the first gear-shifting part 110 and output the driving power to the second external device.

Referring to FIGS. 2 and 3, the second gear-shifting part 120 may include the sub gear-shifting part 3.

The sub gear-shifting part 3 performs second gear shifting to adjust the speed of the agricultural working automobile. The sub gear-shifting part 3 may be connected to the first gear-shifting part 110. The sub gear-shifting part 3 may be connected to the main gear-shifting part 2 of the first gear-shifting part 110. In this case, the sub gear-shifting part 3 may perform the second gear shifting on the driving power in which the first gear shifting is performed and output the driving power in which the second gear shifting is performed to the second external device.

The sub gear-shifting part 3 may include the sub gear-shifting drive mechanism 33.

The sub gear-shifting drive mechanism 33 performs the gear shifting using the driving power transmitted through one power transmission path selected between the first power transmission path TP1 and the second power transmission path TP2. The sub gear-shifting drive mechanism 33 may be connected to the main gear-shifting part 2 through each of the first power transmission path TP1 and the second power transmission path TP2. In this case, the main gear-shifting part 2 may output the driving power in which the first gear shifting is performed to the sub gear-shifting part 3 through the first power transmission path TP1 and the second power transmission path TP2. The sub gear-shifting drive mechanism 33 may perform the second gear shifting using the driving power transmitted through one power transmission path selected between the first power transmission path TP1 and the second power transmission path TP2. Accordingly, the transmission apparatus 1 of an agricultural working automobile according to the first embodiment of the present invention may divide a configuration for transmitting the driving power to the sub gear-shifting drive mechanism 33 into each of the first power transmission path TP1 and the second power transmission path TP2, thereby alleviating complexity of the configuration for transmitting the driving power in which the first gear shifting is performed to the sub gear-shifting drive mechanism 33 and improving ease of manufacturing work.

The sub gear-shifting drive mechanism 33 may be connected to a sub gear-shifting output mechanism 30. The sub gear-shifting output mechanism 30 may be rotated by the driving power in which the second gear shifting is performed by the sub gear-shifting drive mechanism 33. The sub gear-shifting output mechanism 30 is connected to the second external device. Accordingly, the sub gear-shifting part 3 may output the driving power, in which the second gear shifting is performed after passing through the first gear-shifting, to the second external device through the sub gear-shifting output mechanism 30. The sub gear-shifting output mechanism 30 may be a shaft.

Referring to FIGS. 3 and 4, the sub gear-shifting part 3 may include a sub gear-shifting input mechanism 31 and a sub gear-shifting connection mechanism 32.

The sub gear-shifting input mechanism 31 may be connected to the main gear-shifting part 2. Accordingly, the sub gear-shifting input mechanism 31 may implement the first power transmission path through which the driving power in which the first gear shifting is performed is transmitted from the main gear-shifting part 2. The sub gear-shifting input mechanism 31 may be connected to the main gear-shifting output mechanism 22. In this case, the sub gear-shifting input mechanism 31 and the main gear-shifting output mechanism 22 may implement the first power transmission path. The sub gear-shifting input mechanism 31 may be connected to the sub gear-shifting drive mechanism 33. Accordingly, the sub gear-shifting input mechanism 31 may transmit the driving power transmitted through the first power transmission path to the sub gear-shifting drive mechanism 33.

The sub gear-shifting input mechanism 31 may include a sub gear-shifting input gear 311.

The sub gear-shifting input gear 311 may be connected to the main gear-shifting output member 221. Accordingly, the sub gear-shifting input gear 311 may rotate as the main gear-shifting output member 221 rotates. The sub gear-shifting input gear 311 receives the driving power in which the first gear shifting is performed from the main gear-shifting output member 221 and may transmit the received drive to the sub gear-shifting drive mechanism 33. The sub gear-shifting input gear 311 may transmit the driving power to the sub gear-shifting drive mechanism 33 using a plurality of gear teeth. For example, the sub gear-shifting input gear 311 may be a helical gear. The sub gear-shifting input gear 311 may be connected to the main gear-shifting output member 221 by being coupled to the main gear-shifting output member 221. In this case, the main gear-shifting output member 221 may transmit the driving power in which the first gear shifting is performed to the sub gear-shifting input gear 311 and, simultaneously, may function as a rotation shaft of the sub gear-shifting input gear 311. The sub gear-shifting input gear 311 may also be connected to the main gear-shifting output member 221 through a separate shaft. In this case, the shaft to which the sub gear-shifting input gear 311 is coupled may be coupled to the main gear-shifting output member 221. The shaft to which the sub gear-shifting input gear 311 is coupled and the main gear-shifting output member 221 may be disposed on the same line.

The sub gear-shifting connection mechanism 32 may be connected to the main gear-shifting part 2. Accordingly, the sub gear-shifting connection mechanism 32 may implement the second power transmission path through which the driving power in which the first gear shifting is performed is transmitted from the main gear-shifting part 2. The sub gear-shifting connection mechanism 32 may be connected to the main gear-shifting part 2 so that the second power transmission path is implemented by being connected to the main gear-shifting drive mechanism 21. The sub gear-shifting connection mechanism 32 may be connected to the sub gear-shifting drive mechanism 33. Accordingly, the sub gear-shifting connection mechanism 32 may transmit the driving power transmitted through the second power transmission path to the sub gear-shifting drive mechanism 33.

Thus, since the transmission apparatus 1 of an agricultural working automobile according to the first embodiment of the present invention is implemented so that the main gear-shifting part 2 and the sub gear-shifting part 3 are connected to each other through a plurality of power transmission paths, the sub gear-shifting connection mechanism 32 and the sub gear-shifting input mechanism 31 may share the configuration for transmitting the driving power to the sub gear-shifting drive mechanism 33. Accordingly, the transmission apparatus 1 of an agricultural working automobile according to the first embodiment of the present invention may implement the configuration of the sub gear-shifting input mechanism 31 in a simple manner compared to a case in which the main gear-shifting part 2 and the sub gear-shifting part 3 are connected to each other through only one power transmission path. Thus, the transmission apparatus 1 of an agricultural working automobile according to the first embodiment of the present invention may alleviate complexity of the configuration for the sub gear-shifting input mechanism 31 and also improve ease of manufacturing work.

The sub gear-shifting connection mechanism 32 may be disposed to be positioned between the main gear-shifting drive mechanism 21 and the sub gear-shifting drive mechanism 33. One side of the sub gear-shifting connection mechanism 32 may be connected to the main gear-shifting drive mechanism 21. The other side of the sub gear-shifting connection mechanism 32 may be connected to the sub gear-shifting drive mechanism 33. The sub gear-shifting connection mechanism 32 may be a shaft.

The sub gear-shifting drive mechanism 33 will be described in more detail with reference to FIGS. 3 and 13 as below.

Referring to FIGS. 3 and 4, the sub gear-shifting drive mechanism 33 may be connected to each of the sub gear-shifting input mechanism 31 and the sub gear-shifting connection mechanism 32. The sub gear-shifting drive mechanism 33 may perform the second gear shifting using one driving power selected from the driving power transmitted from the sub gear-shifting input mechanism 31 and the driving power transmitted from the sub gear-shifting connection mechanism 32. That is, the sub gear-shifting drive mechanism 33 may perform the second gear shifting using one driving power selected from the driving power transmitted through the first power transmission path and the driving power transmitted through the second power transmission path. The sub gear-shifting drive mechanism 33 may perform the second gear shifting using one driving power selected by the gear-shifting operation of the operator.

The sub gear-shifting drive mechanism 33 may include a plurality of sub gear-shifting drive gears 331. The sub gear-shifting drive mechanism 33 may include a number of sub gear-shifting drive gears 331 corresponding to a second gear-shifting stage performable by the sub gear-shifting part 3. For example, when the sub gear-shifting part 3 is implemented to perform the second gear shifting in two stages, the sub gear-shifting drive mechanism 33 may include two sub gear-shifting drive gears 331. The sub gear-shifting drive gears 331 are provided to transmit the driving power using a plurality of gear teeth and, for example, may be helical gears.

One sub gear-shifting drive gear 331 of the sub gear-shifting drive gears 331 is connected to the main gear-shifting drive mechanism 21 through the sub gear-shifting connection mechanism 32 so that the sub gear-shifting drive mechanism 33 may be connected to the main gear-shifting part 2. In this case, one side of the sub gear-shifting connection mechanism 32 may be coupled to one main gear-shifting drive gear 211 of the main gear-shifting drive gears 211, and the other side of the sub gear-shifting connection mechanism 32 may be coupled to one sub gear-shifting drive gear 331 of the sub gear-shifting drive gears 331. That is, the sub gear-shifting connection mechanism 32 may connect the main gear-shifting drive gear 211 to the sub gear-shifting drive gear 331 in a direct connection manner. Accordingly, the transmission apparatus 1 of an agricultural working automobile according to the first embodiment of the present invention may alleviate complexity of the configuration of the sub gear-shifting part 3 and reduce manufacturing costs for the sub gear-shifting part 3 in comparison with a comparative example having only one power transmission path.

Figure 5:
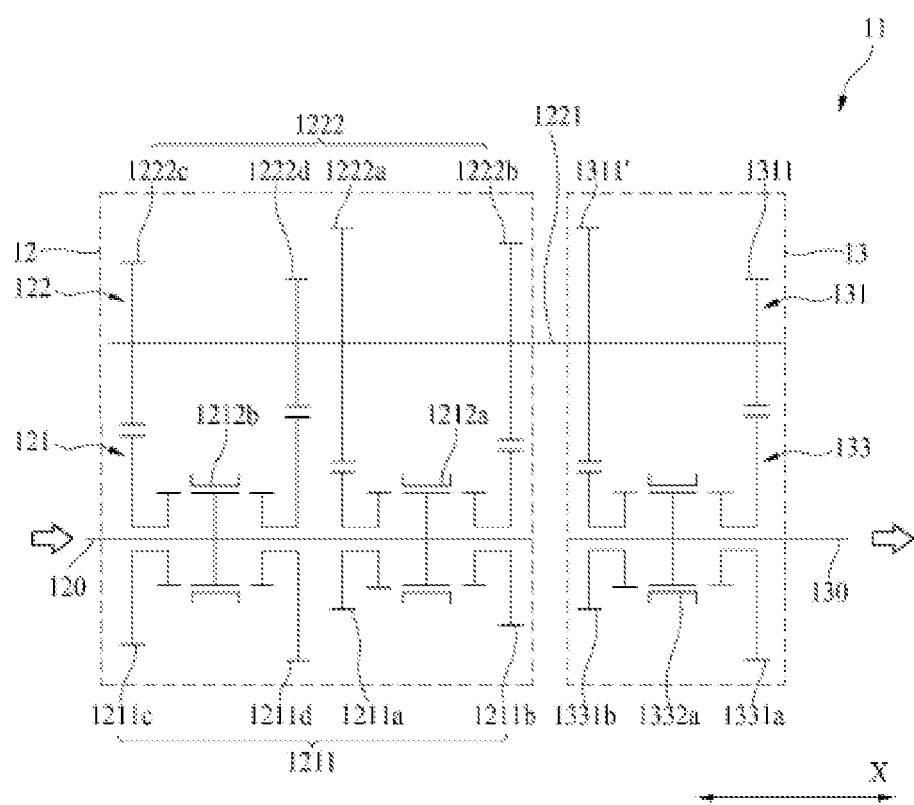
FIG. 5 is a schematic power transmission diagram for describing a disadvantage of a case in which a main gear-shifting part is connected to a sub gear-shifting part through one power transmission path.

This is exemplified by the case in which the sub gear-shifting part 3 or 13 performs the second gear shifting in two stages as shown in FIGS. 4 and 5, and will be described in more detail below in comparison with comparative examples in which the sub gear-shifting part 13 is connected to the main gear-shifting part 12 through only one power transmission path and an example in which the sub gear-shifting part 3 is connected to the main gear-shifting part 2 through two power transmission paths. In this case, both the comparative example and the example include two sub gear-shifting drive gears 331a and 331b, or 1331a and 1331b for the sub gear-shifting drive mechanism 33 or 133 to perform the second gear shifting in two stages. First, as shown in FIG. 5, in a case of the comparative example in which the sub gear-shifting part 13 is connected to the main gear-shifting part 12 through only one power transmission path, the sub gear-shifting drive mechanism 133 receives the driving power in which the first gear shifting is performed through only the sub gear-shifting input mechanism 131. Accordingly, the sub gear-shifting input mechanism 131 needs to include two sub gear-shifting input gears 1311 and 1311' to transmit the driving power in which the first gear shifting is performed to each of the two sub gear-shifting drive gears 1331a and 1331b. Further, all of the sub gear-shifting drive gears 1331a and 1331b need to have a function of receiving the driving power from the sub gear-shifting input gears 1311 and 1311' and transmitting the driving power to the sub gear-shifting out mechanism 130. Accordingly, all of the sub gear-shifting drive gears 1331a and 1331b need to be implemented to include an input gear for receiving the driving power and an output gear for transmitting the driving power.

Next, as shown in FIG. 4, in the case of the example in which the sub gear-shifting part 3 is connected to the main gear-shifting part 2 through two power transmission paths, the sub gear-shifting drive mechanism 33 receives the driving power in which the first gear shifting is performed through the sub gear-shifting input mechanism 31 and the sub gear-shifting connection mechanism 32. In this case, one sub gear-shifting drive gear 331a of the sub gear-shifting drive gears 331a and 331b is connected to the sub gear-shifting input mechanism 31 to receive the driving power in which the first gear shifting is performed. The other one sub gear-shifting drive gear 331b of the sub gear-shifting drive gears 331a and 331b is connected to the sub gear-shifting connection mechanism 32 to receive the driving power in which the first gear shifting is performed. Accordingly, the transmission apparatus 1 of an agricultural working automobile according to the first embodiment of the present invention may provide operating effects as described below in comparison with the comparative example.

First, in the transmission apparatus 1 of an agricultural working automobile according to the first embodiment of the present invention, since the sub gear-shifting input mechanism 31 needs to have only one sub gear-shifting input gear 311, one sub gear-shifting input gear 1311' (shown in FIG. 5) may be omitted in comparison with the comparative example. Accordingly, the transmission apparatus 1 of an agricultural working automobile according to the first embodiment of the present invention may not only implement the configuration of the sub gear-shifting input mechanism 31 in a simple manner but also reduce manufacturing costs for the sub gear-shifting input mechanism 31.

Second, the sub gear-shifting drive gear 331b, which is connected to the sub gear-shifting connection mechanism 32, between the sub gear-shifting drive gears 331a and 331b does not need to have the input gear for receiving the driving power when compared with the comparative example Thus, the transmission apparatus 1 of an agricultural working automobile according to the first embodiment of the present invention may not only implement the configuration of the sub gear-shifting drive mechanism 33 in a simple manner but also reduce manufacturing costs for the sub gear-shifting drive mechanism 33.

Referring to FIGS. 3 and 4, the sub gear-shifting drive gear 331, which is spaced apart from the main gear-shifting drive mechanism 21 by the shortest distance, of the sub gear-shifting drive gears 331 is connected to the main gear-shifting drive mechanism 21 through the sub gear-shifting connection mechanism 32 so that the sub gear-shifting drive mechanism 33 may be connected to the main gear-shifting part 2. The shortest distance is on the basis of the first axis direction (the X axis direction). In this case, the sub gear-shifting connection mechanism 32 may be coupled to each of the sub gear-shifting drive gear 331 and the main gear-shifting drive gear 211, which are spaced apart from each other by the shortest distance, among the sub gear-shifting drive gears 331 and the main gear-shifting drive gears 211.

Accordingly, the transmission apparatus 1 of an agricultural working automobile according to the first embodiment of the present invention may reduce the length of the sub gear-shifting connection mechanism 32 on the basis of the first axis direction (the X axis direction), thereby not only improving drive transmission performance to the sub gear-shifting connection mechanism 32 but also reducing manufacturing costs for the sub gear-shifting connection mechanism 32. Further, in the transmission apparatus 1 of an agricultural working automobile according to the first embodiment of the present invention, the sub gear-shifting connection mechanism 32 may connect the sub gear-shifting drive gear 331 to the main gear-shifting drive gear 211 in a direct connection manner, thereby implementing the configuration for connecting the sub gear-shifting drive gear 331 to the main gear-shifting drive gear 211 in a simple manner. The sub gear-shifting connection mechanism 32 and the main gear-shifting input mechanism 20 may be disposed on the same line. In this case, the sub gear-shifting connection mechanism 32, the main gear-shifting input mechanism 20, and the sub gear-shifting output mechanism 30 may be disposed on the same line. Accordingly, ease of manufacturing work of the transmission apparatus 1 of an agricultural working automobile according to the first embodiment of the present invention may be improved by improving ease of disposition for the main gear-shifting drive gears 211 and the sub gear-shifting drive gears 331.

Referring to FIGS. 3 and 4, the sub gear-shifting drive mechanism 33 may include at least one sub gear-shifting sleeve 332. The sub gear-shifting sleeve 332 may be selectively connected to any one of the two sub gear-shifting drive gears 331. The sub gear-shifting sleeve 332 may be connected to the corresponding sub gear-shifting drive gear 331 by being selectively engaged with any one of the two sub gear-shifting drive gears 331. The sub gear-shifting sleeve 332 may be selectively connected to any one of the two sub gear-shifting drive gears 331 by the gear-shifting operation of the operator. The sub gear-shifting sleeve 332 is coupled to the sub gear-shifting output mechanism 30. Accordingly, the sub gear-shifting sleeve 332 may rotate the sub gear-shifting output mechanism 30. In this case, the sub gear-shifting sleeve 332 may rotate the sub gear-shifting output mechanism 30 while rotating as the sub gear-shifting drive gear 331 connected to the sub gear-shifting sleeve 332 is rotated. The sub gear-shifting sleeve 332 may rotate about the sub gear-shifting output mechanism 30 as a rotation shaft. The sub gear-shifting sleeve 332 may be a synchronizer sleeve. The sub gear-shifting drive mechanism 33 may include a required number of the sub gear-shifting sleeve 332 in accordance with the second gear-shifting stage to be performed by the sub gear-shifting part 3.

Figure 6:
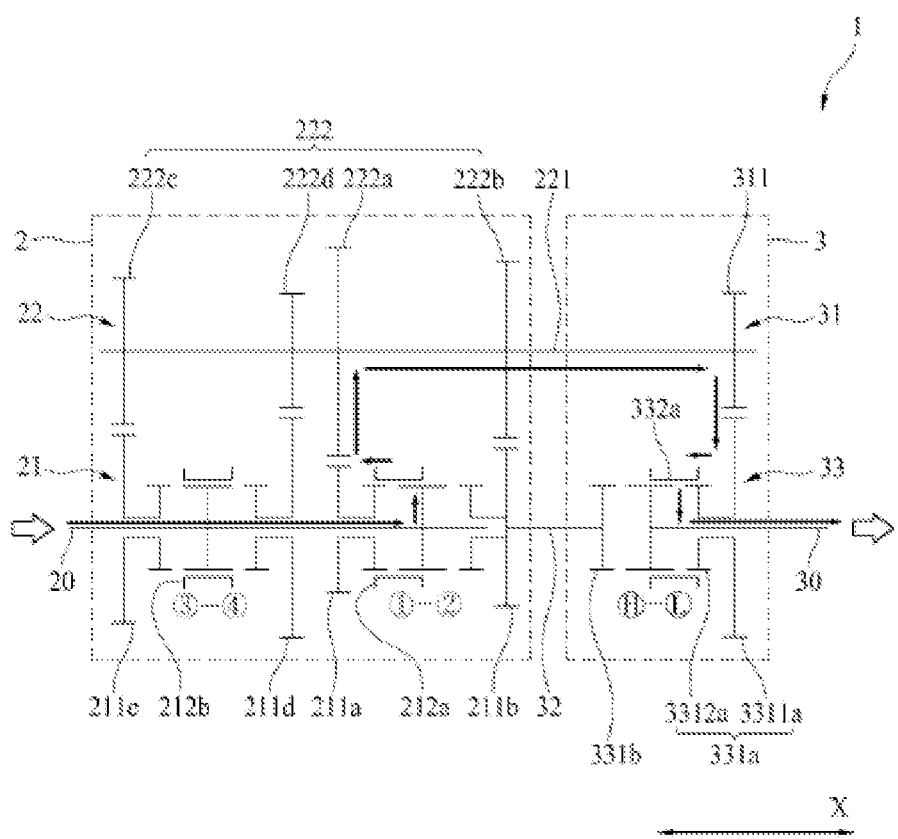
FIGS. 6 to 13 are schematic power transmission diagrams illustrating flows of power transmission according to gear-shifting stages in the transmission apparatus of an agricultural working automobile according to the first embodiment of the present invention.
Figure 10:
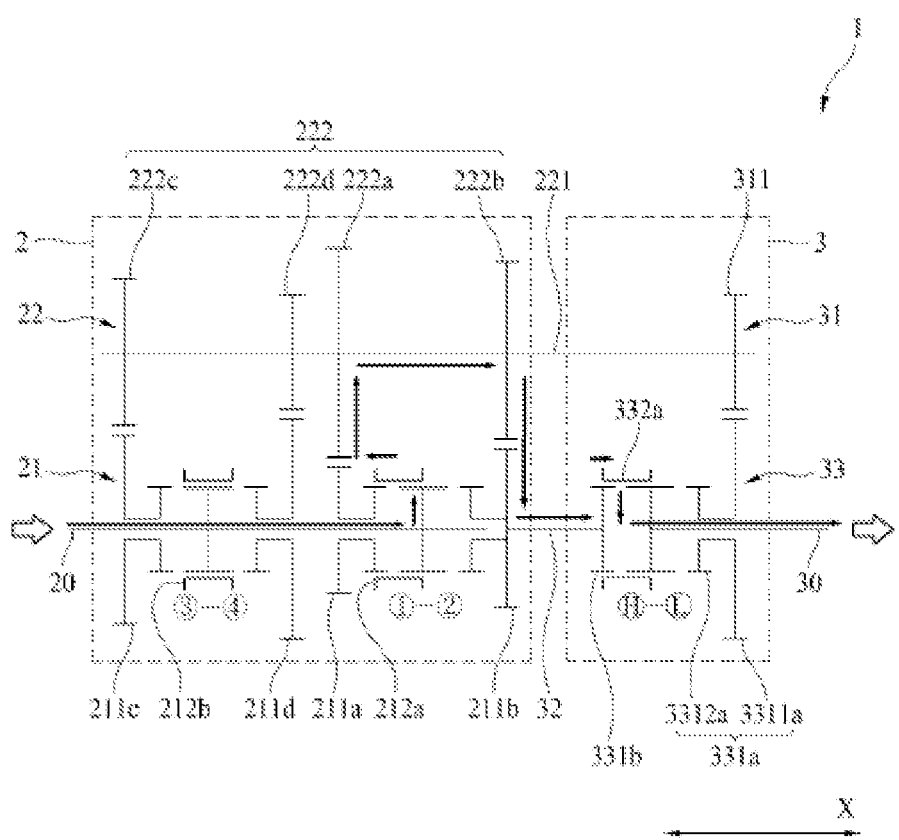

Referring to FIGS. 4, 6, and 10, when the sub gear-shifting part 3 performs the second gear shifting in two stages, the sub gear-shifting drive mechanism 33 may include the first sub gear-shifting drive gear 331a, the second sub gear-shifting drive gear 331b, and a first sub gear-shifting sleeve 332a.

The first sub gear-shifting drive gear 331a may be idly coupled to the sub gear-shifting output mechanism 30. A bearing (not shown) may be installed between the first sub gear-shifting drive gear 331a and the sub gear-shifting output mechanism 30. The first sub gear-shifting drive gear 331a may be rotated by the driving power provided from the sub gear-shifting input mechanism 31. In this case, the first sub gear-shifting drive gear 331a may include a first input gear 3311a for being connected to the sub gear-shifting input mechanism 31 and a first output gear 3312a for being connected to the first sub gear-shifting sleeve 332a. The first input gear 3311a may be engaged with the sub gear-shifting input gear 311. Accordingly, the first sub gear-shifting drive gear 331a may rotate as the sub gear-shifting input gear 311 rotates. That is, the first sub gear-shifting drive gear 331a may be rotated by the driving power transmitted through the first power transmission path. In this case, when the first output gear 3312a is connected to the first sub gear-shifting sleeve 332a, the first sub gear-shifting drive gear 331a is rotated by the driving power transmitted through the first power transmission path in order to rotate the first sub gear-shifting sleeve 332a and the sub gear-shifting output mechanism 30.

The second sub gear-shifting drive gear 331b may be disposed to be spaced apart from the first sub gear-shifting drive gear 331a in the first axis direction (the X axis direction). The first sub gear-shifting sleeve 332a may be disposed between the second sub gear-shifting drive gear 331b and the first sub gear-shifting drive gear 331a. The second sub gear-shifting drive gear 331b may be disposed between the first sub gear-shifting sleeve 332a and the main gear-shifting part 2. The second sub gear-shifting drive gear 331b may be rotated by the driving power provided from the sub gear-shifting connection mechanism 32. That is, the second sub gear-shifting drive gear 331b may be rotated by the driving power transmitted through the second power transmission path. One side of the sub gear-shifting connection mechanism 32 may be coupled to the second main gear-shifting drive gear 211b and the other side of the sub gear-shifting connection mechanism 32 may be coupled to the second sub gear-shifting drive gear 331b. The second main gear-shifting drive gear 211b and the second sub gear-shifting drive gear 331b are disposed to be spaced apart from each other by the shortest distance among the main gear-shifting drive gears 211 and the sub gear-shifting drive gears 331 on the basis of the first axis direction (the X axis direction). One side of the sub gear-shifting connection mechanism 32 may be coupled to the second drive output gear 2112b of the second main gear-shifting drive gear 211b.

The second sub gear-shifting drive gear 331b may include a second output gear for being connected to the first sub gear-shifting sleeve 332a. In this case, when the second output gear is connected to the first sub gear-shifting sleeve 332a, the second sub gear-shifting drive gear 331b is rotated by the driving power transmitted through the second power transmission path in order to rotate the first sub gear-shifting sleeve 332a.

The first sub gear-shifting sleeve 332a may be coupled to the sub gear-shifting output mechanism 30 so as to be positioned between the first sub gear-shifting drive gear 331a and the second sub gear-shifting drive gear 331b. The first sub gear-shifting sleeve 332a may be coupled to the sub gear-shifting output mechanism 30 to be movable in the first axis direction (the X axis direction). Accordingly, the first sub gear-shifting sleeve 332a may be selectively connected to the first sub gear-shifting drive gear 331a or the second sub gear-shifting drive gear 331b to perform the second gear shifting. In this case, the first sub gear-shifting sleeve 332a may be selectively connected to the first sub gear-shifting drive gear 331a or the second sub gear-shifting drive gear 331b while moving along the first axis direction (the X axis direction) by the gear-shifting operation of the operator.

Referring to FIGS. 3 and 4, the sub gear-shifting drive mechanism 33 and the main gear-shifting drive mechanism 21 may be implemented so that the sub gear-shifting drive gear 331, which corresponds to a gear-shifting stage having the highest frequency of use in the sub gear-shifting part 3, and the main gear-shifting drive gear 211, which corresponds to a gear-shifting stage having the highest frequency of use in the main gear-shifting part 2, are connected to each other through the sub gear-shifting connection mechanism 32. That is, the sub gear-shifting connection mechanism 32 may connect the main gear-shifting drive gear 211, which corresponds to the gear-shifting stage having the highest frequency of use in the main gear-shifting part 2, to the sub gear-shifting drive gear 331, which corresponds to the gear-shifting stage having the highest frequency of use in the sub gear-shifting part 3, in a direct connection manner. Accordingly, in the transmission apparatus 1 of an agricultural working automobile according to the present invention, when the main gear-shifting part 2 and the sub gear-shifting part 3 perform the gear shifting at the gear-shifting stage having the highest frequency of use and transmit the driving power through the sub gear-shifting connection mechanism 32, a driving power loss may be reduced and drive transmission performance may be improved. Accordingly, the transmission apparatus 1 of an agricultural working automobile according to the present invention may contribute to improving performance of the agricultural working automobile. For example, when the second main gear-shifting drive gear 211b corresponds to the gear-shifting stage having the highest frequency of use in the main gear-shifting part 2 and the second sub gear-shifting drive gear 331b corresponds to the gear-shifting stage having the highest frequency of use in the sub gear-shifting part 3, the sub gear-shifting connection mechanism 32 may connect the second main gear-shifting drive gear 211b to the second sub gear-shifting drive gear 331b in a direct connection manner.

Referring to FIGS. 6 to 9, when the first sub gear-shifting sleeve 332a is connected to the first sub gear-shifting drive gear 331a, the first sub gear-shifting sleeve 332a may receive the driving power in which the first gear shifting is performed through the sub gear-shifting input mechanism 31. That is, the first sub gear-shifting sleeve 332a may receive the driving power in which the first gear shifting is performed through the first power transmission path. Accordingly, the sub gear-shifting drive mechanism 33 may perform the second gear shifting using the first sub gear-shifting input mechanism 31, the first sub gear-shifting drive gear 331a, and the first sub gear-shifting sleeve 332a and output the driving power in which the second gear shifting is performed through the sub gear-shifting output mechanism 30. In this case, for all first gear-shifting stages performable by the main gear-shifting part 2, the first sub gear-shifting sleeve 332a may receive the driving power in which the first gear shifting is performed through the first power transmission path.

This will be described in detail with reference to FIGS. 6 to 9 as below. Numbers in the circles indicated in the main gear-shifting part 2 in FIGS. 6 to 9 exemplify the first gear shifting stage, and alphabetical letters in the circle indicated in the sub gear-shifting part 3 exemplify the second gear-shifting stage. As shown in FIGS. 6 to 9, when the first sub gear-shifting sleeve 332a is connected to the first sub gear-shifting drive gear 331a, the second gear shifting may be performed at a low stage.

First, when the main gear-shifting part 2 performs the first gear shifting at a first speed stage as shown in FIG. 6, the first main gear-shifting sleeve 212a is connected to the first main gear-shifting drive gear 211a. Accordingly, the driving power provided from the main gear-shifting input mechanism 20 is sequentially transmitted through the first main gear-shifting sleeve 212a, the first main gear-shifting drive gear 211a, the first main gear-shifting output gear 222a, the main gear-shifting output member 221, the sub gear-shifting input gear 311, the first sub gear-shifting drive gear 331a, and the first sub gear-shifting sleeve 332a to perform the first gear shifting and the second gear-shifting and may be output to the second external device through the sub gear-shifting output mechanism 30. In this case, the second main gear-shifting sleeve 212b is in a neutral state in which the second main gear-shifting sleeve 212b is not connected to both the third main gear-shifting drive gear 211c and the fourth main gear-shifting drive gear 211d.

Figure 7:
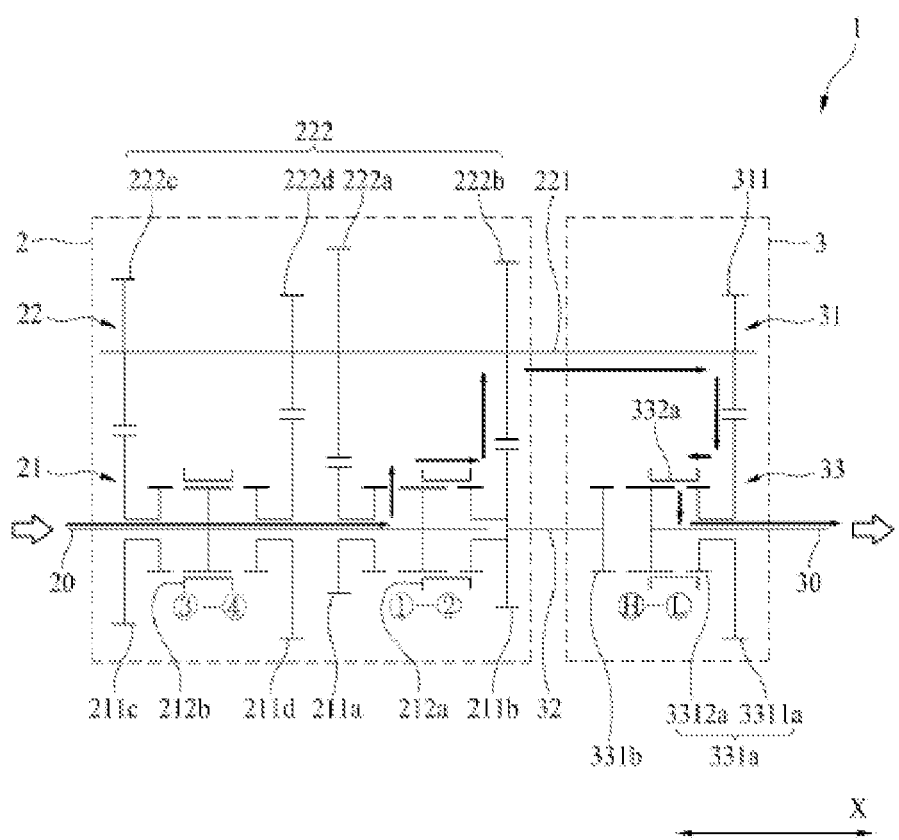

Next, when the main gear-shifting part 2 performs the first gear shifting at a second speed stage as shown in FIG. 7, the first main gear-shifting sleeve 212a is connected to the second main gear-shifting drive gear 211b. Accordingly, the driving power provided from the main gear-shifting input mechanism 20 is sequentially transmitted through the first main gear-shifting sleeve 212a, the second main gear-shifting drive gear 211b, the second main gear-shifting output gear 222b, the main gear-shifting output member 221, the sub gear-shifting input gear 311, the first sub gear-shifting drive gear 331a, and the first sub gear-shifting sleeve 332a to perform the first gear shifting and the second gear-shifting and may be output to the second external device through the sub gear-shifting output mechanism 30. In this case, the second main gear-shifting sleeve 212b is in a neutral state in which the second main gear-shifting sleeve 212b is not connected to both the third main gear-shifting drive gear 211c and the fourth main gear-shifting drive gear 211d.

Figure 8:
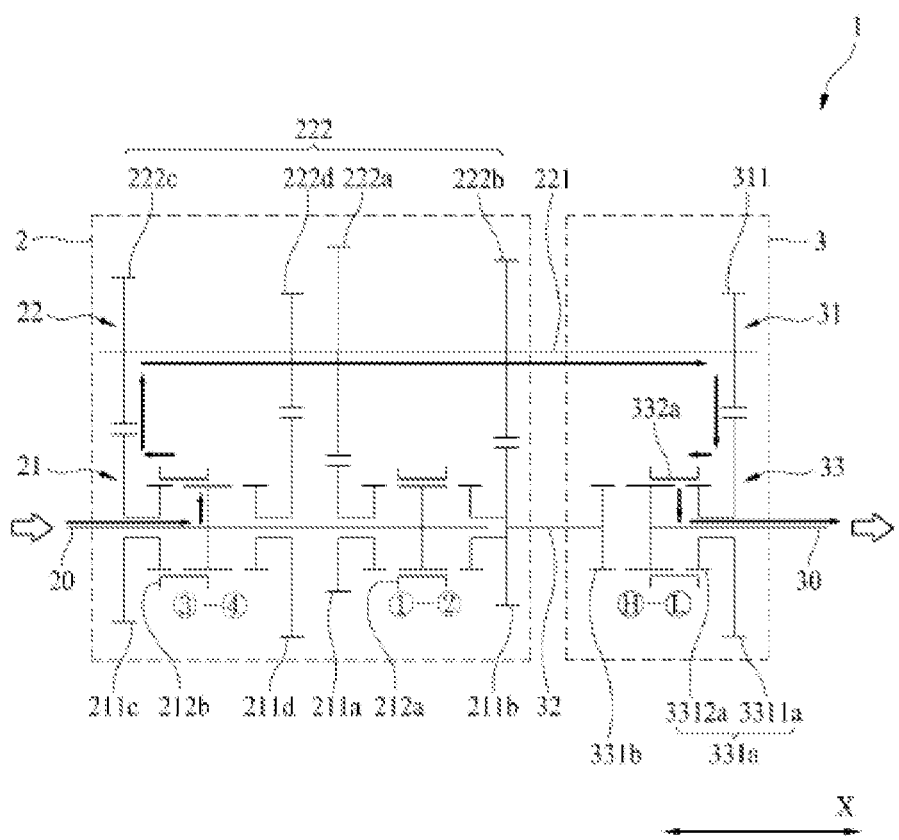

Next, when the main gear-shifting part 2 performs the first gear shifting at a third speed stage as shown in FIG. 8, the second main gear-shifting sleeve 212b is connected to the third main gear-shifting drive gear 211c. Accordingly, the driving power provided from the main gear-shifting input mechanism 20 is sequentially transmitted through the second main gear-shifting sleeve 212b, the third main gear-shifting drive gear 211c, the third main gear-shifting output gear 222c, the main gear-shifting output member 221, the sub gear-shifting input gear 311, the first sub gear-shifting drive gear 331a, and the first sub gear-shifting sleeve 332a to perform the first gear shifting and the second gear shifting and may be output to the second external device through the sub gear-shifting output mechanism 30. In this case, the first main gear-shifting sleeve 212a is in a neutral state in which the first main gear-shifting sleeve 212a is not connected to both the first main gear-shifting drive gear 211a and the second main gear-shifting drive gear 211b.

Figure 9:
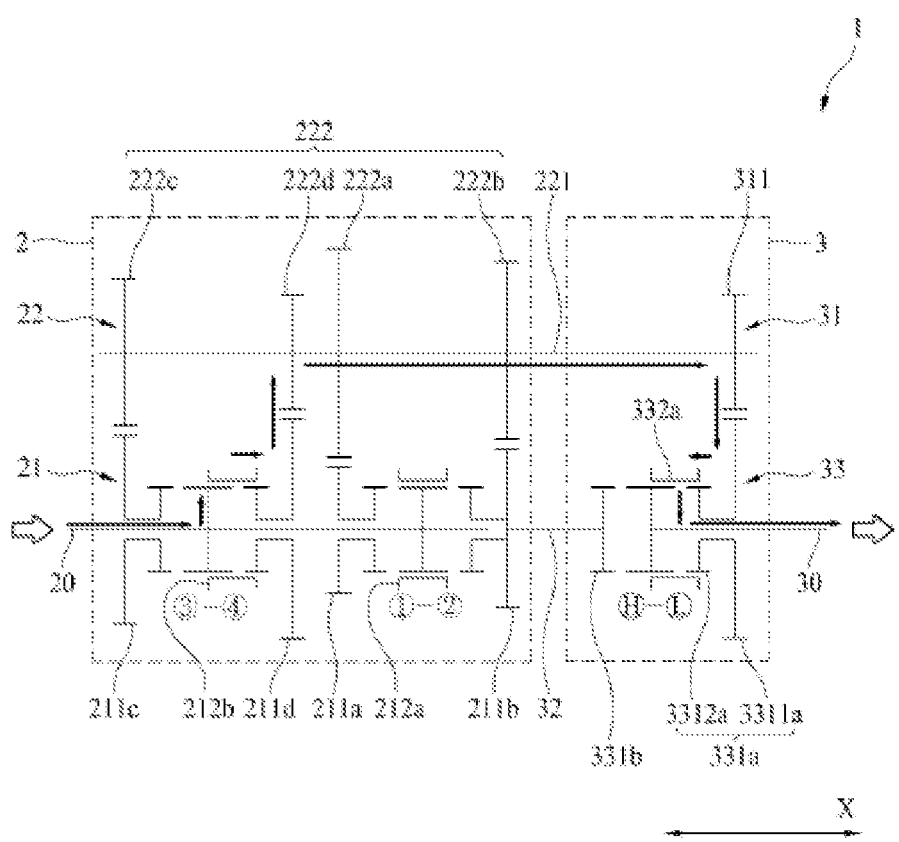

Next, when the main gear-shifting part 2 performs the first gear shifting at a fourth speed stage as shown in FIG. 9, the second main gear-shifting sleeve 212b is connected to the fourth main gear-shifting drive gear 211d. Accordingly, the driving power provided from the main gear-shifting input mechanism 20 is sequentially transmitted through the second main gear-shifting sleeve 212b, the fourth main gear-shifting drive gear 211d, the fourth main gear-shifting output gear 222d, the main gear-shifting output member 221, the sub gear-shifting input gear 311, the first sub gear-shifting drive gear 331a, and the first sub gear-shifting sleeve 332a to perform the first gear shifting and the second gear shifting and may be output to the second external device through the sub gear-shifting output mechanism 30. In this case, the first main gear-shifting sleeve 212a is in a neutral state in which the first main gear-shifting sleeve 212a is not connected to both the first main gear-shifting drive gear 211a and the second main gear-shifting drive gear 211b.

Referring to FIGS. 10 to 13, when the first sub gear-shifting sleeve 332a is connected to the second sub gear-shifting drive gear 331b, the first sub gear-shifting sleeve 332a may receive the driving power in which the first gear shifting is performed through the sub gear-shifting connection mechanism 32. That is, the first sub gear-shifting sleeve 332a may receive the driving power in which the first gear shifting is performed through the second power transmission path. Accordingly, the sub gear-shifting drive mechanism 33 may perform the second gear shifting using the first sub gear-shifting connection mechanism 32, the second sub gear-shifting drive gear 331b, and the first sub gear-shifting sleeve 332a and output the driving power in which the second gear shifting is performed through the sub gear-shifting output mechanism 30. In this case, for all first gear-shifting stages performable by the main gear-shifting part 2, the first sub gear-shifting sleeve 332a may receive the driving power in which the first gear shifting is performed through the second power transmission path.

This will be described in detail with reference to FIGS. 10 to 13 as below. Numbers in the circles indicated in the main gear-shifting part 2 in FIGS. 10 to 13 exemplify the first gear-shifting stage, and alphabetical letters in the circle indicated in the sub gear-shifting part 3 exemplify the second gear-shifting stage. As shown in FIGS. 10 to 13, when the first sub gear-shifting sleeve 332a is connected to the second sub gear-shifting drive gear 331b, the second gear shifting may be performed at a high stage.

First, when the main gear-shifting part 2 performs the first gear shifting at a first speed stage as shown in FIG. 10, the first main gear-shifting sleeve 212a is connected to the first main gear-shifting drive gear 211a. Accordingly, the driving power provided from the main gear-shifting input mechanism 20 is sequentially transmitted through the first main gear-shifting sleeve 212a, the first main gear-shifting drive gear 211a, the first main gear-shifting output gear 222a, the main gear-shifting output member 221, the second main gear-shifting output gear 222b, the second main gear-shifting drive gear 211b, the sub gear-shifting connection mechanism 32, the second sub gear-shifting drive gear 331b, and the first sub gear-shifting sleeve 332a to perform the first gear shifting and the second gear shifting and may be output to the second external device through the sub gear-shifting output mechanism 30. In this case, the second main gear-shifting sleeve 212b is in a neutral state in which the second main gear-shifting sleeve 212b is not connected to both the third main gear-shifting drive gear 211c and the fourth main gear-shifting drive gear 211d.

Figure 11:
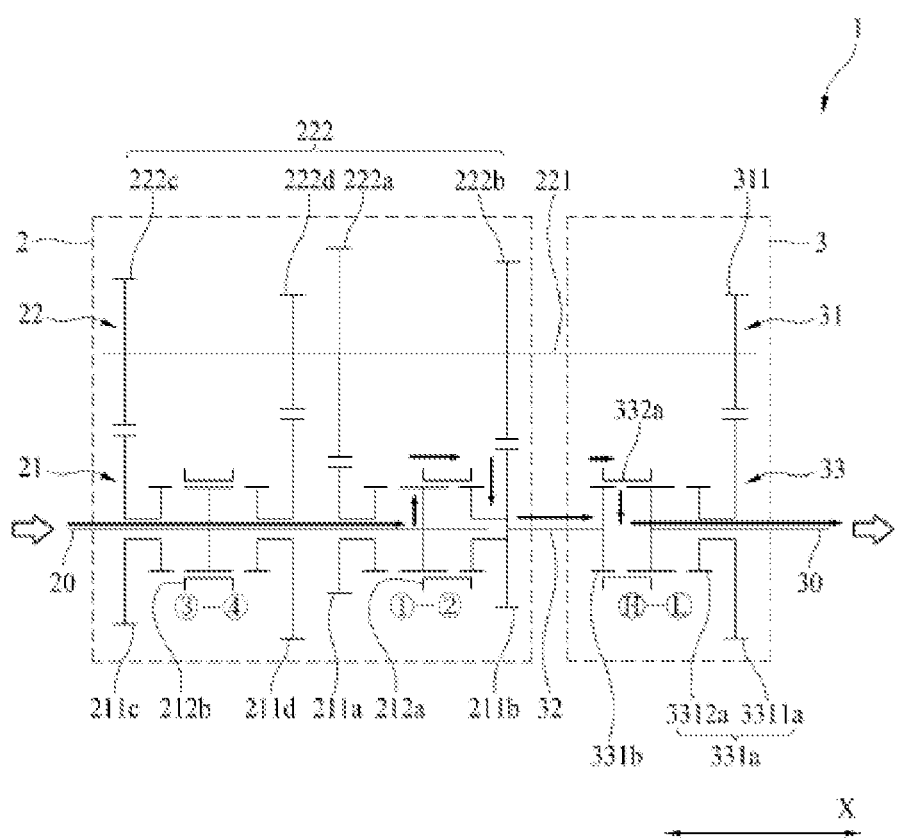

Next, when the main gear-shifting part 2 performs the first gear shifting to a second speed stage as shown in FIG. 11, the first main gear-shifting sleeve 212a is connected to the second main gear-shifting drive gear 211b. Accordingly, the driving power provided from the main gear-shifting input mechanism 20 is sequentially transmitted through the first main gear-shifting sleeve 212a, the second main gear-shifting drive gear 211b, the sub gear-shifting connection mechanism 32, the second sub gear-shifting drive gear 331b, and the first sub gear-shifting sleeve 332a to perform the first gear shifting and the second gear shifting and may be output to the second external device through the sub gear-shifting output mechanism 30. In this case, the second main gear-shifting sleeve 212b is in a neutral state in which the second main gear-shifting sleeve 212b is not connected to both the third main gear-shifting drive gear 211c and the fourth main gear-shifting drive gear 211d.

Figure 12:
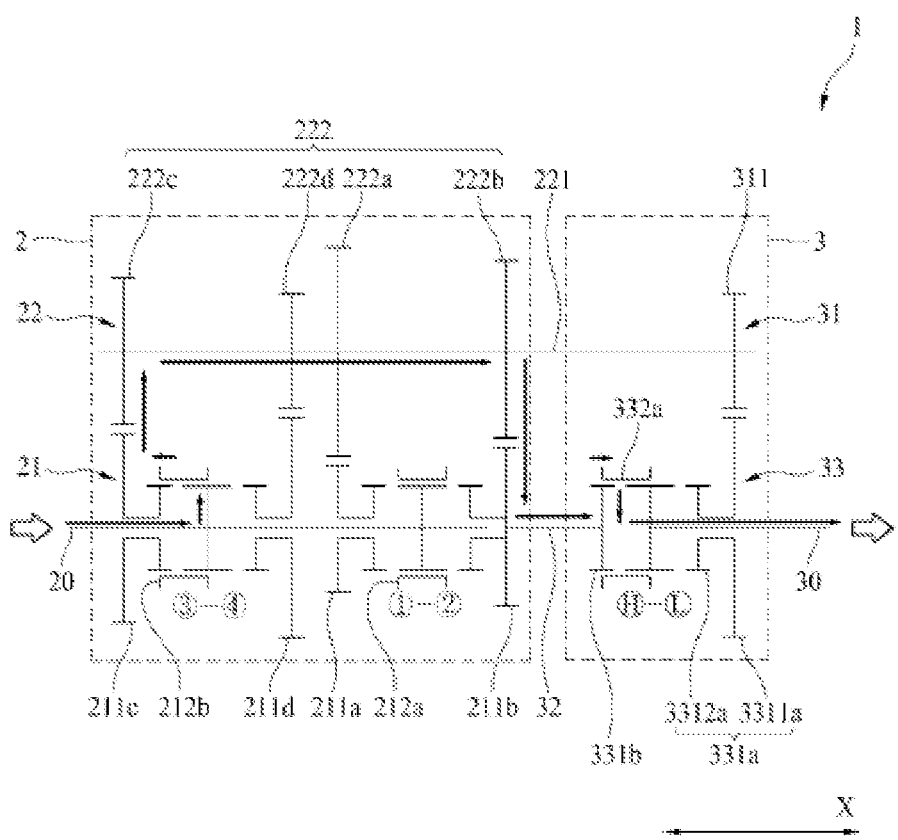

Next, when the main gear-shifting part 2 performs the first gear shifting to a third speed stage as shown in FIG. 12, the second main gear-shifting sleeve 212b is connected to the third main gear-shifting drive gear 211c. Accordingly, the driving power provided from the main gear-shifting input mechanism 20 is sequentially transmitted through the second main gear-shifting sleeve 212b, the third main gear-shifting drive gear 211c, the third main gear-shifting output gear 222c, the main gear-shifting output member 221, the second main gear-shifting output gear 222b, the second main gear-shifting drive gear 211b, the sub gear-shifting connection mechanism 32, the second sub gear-shifting drive gear 331b, and the first sub gear-shifting sleeve 332a to perform the first gear shifting and the second gear shifting and may be output to the second external device through the sub gear-shifting output mechanism 30. In this case, the first main gear-shifting sleeve 212a is in a neutral state in which the first main gear-shifting sleeve 212a is not connected to both the first main gear-shifting drive gear 211a and the second main gear-shifting drive gear 211b.

Figure 13:
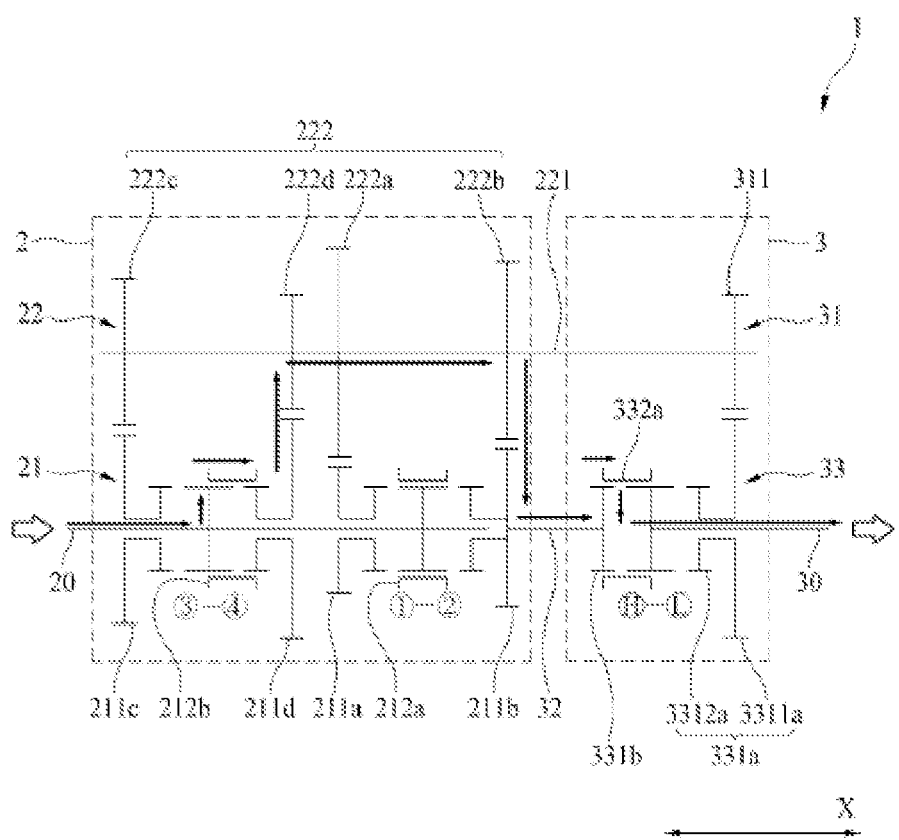

Next, when the main gear-shifting part 2 performs the first gear shifting at a fourth speed stage as shown in FIG. 13, the second main gear-shifting sleeve 212b is connected to the fourth main gear-shifting drive gear 211d. Accordingly, the driving power provided from the main gear-shifting input mechanism 20 is sequentially transmitted through the second main gear-shifting sleeve 212b, the fourth main gear-shifting drive gear 211d, the fourth main gear-shifting output gear 222d, the main gear-shifting output member 221, the second main gear-shifting output gear 222b, the second main gear-shifting drive gear 211b, the sub gear-shifting connection mechanism 32, the second sub gear-shifting drive gear 331b, and the first sub gear-shifting sleeve 332a to perform the first gear shifting and the second gear shifting and may be output to the second external device through the sub gear-shifting output mechanism 30. In this case, the first main gear-shifting sleeve 212a is in a neutral state in which the first main gear-shifting sleeve 212a is not connected to both the first main gear-shifting drive gear 211a and the second main gear-shifting drive gear 211b.

Although the embodiment in which the main gear-shifting part 2 performs the first gear shifting in four stages is illustrated in FIGS. 6 to 13, those skilled in the art may easily derive embodiments in which the main gear-shifting part 2 performs the first gear shifting in different gear-shifting stages rather than the four stages such as three stages, five stages, six stages, seven stages, eight stages, or the like from the embodiment.

Here, gear-shifting ranges of the transmission apparatus of an agricultural working automobile according to the first embodiment of the present invention may be adjusted according to the diameter of the first input gear 3311a of the first sub gear-shifting drive gear 331a and the diameter of the sub gear-shifting input gear 311.

For example, like in a configuration of the embodiment described in FIGS. 4 and 6 to 13, a diameter ratio of the first input gear 3311a of the first sub gear-shifting drive gear 331a to the sub gear-shifting input gear 311 may be implemented to be greater than a diameter ratio of the second main gear-shifting drive gear 2112b of the second main gear-shifting drive gear 211b to the second main gear-shifting output gear 222b. In this case, the first sub gear-shifting drive gear 331a rotates at a slower rotational speed than the second sub gear-shifting drive gear 331b having the same rotational speed as a rotational speed of the second main gear-shifting drive gear 211b. That is, in a case in which the first sub gear-shifting sleeve 332a is connected to the first sub gear-shifting drive gear 331a which is rotated by the driving power transmitted through the first power transmission path passing through the sub gear-shifting input mechanism 31, the gear shifting is performed at a slower speed than in a case in which the first sub gear-shifting sleeve 332a is connected to the second sub gear-shifting drive gear 331b which is rotated by the driving power transmitted through the second power transmission path passing through the sub gear-shifting connection mechanism 32.

For example, unlike in the configuration of the embodiment described in FIGS. 4 and 6 to 13, although not shown in the drawings, the diameter ratio of the first input gear 3311a of the first sub gear-shifting drive gear 331a to the sub gear-shifting input gear 311 may be implemented to be smaller than the diameter ratio of the second main gear-shifting drive gear 2112b of the second main gear-shifting drive gear 211b to the second main gear-shifting output gear 222b. In this case, the first sub gear-shifting drive gear 331a rotates at a greater rotational speed than the second sub gear-shifting drive gear 331b having the same rotational speed as the rotational speed of the second main gear-shifting drive gear 211b. That is, in the case in which the first sub gear-shifting sleeve 332a is connected to the first sub gear-shifting drive gear 331a which is rotated by the driving power transmitted through the first power transmission path passing through the sub gear-shifting input mechanism 31, the gear shifting is performed at a faster speed than in the case in which the first sub gear-shifting sleeve 332a is connected to the second sub gear-shifting drive gear 331b which is rotated by the driving power transmitted through the second power transmission path passing through the sub gear-shifting connection mechanism 32.

Figure 14:
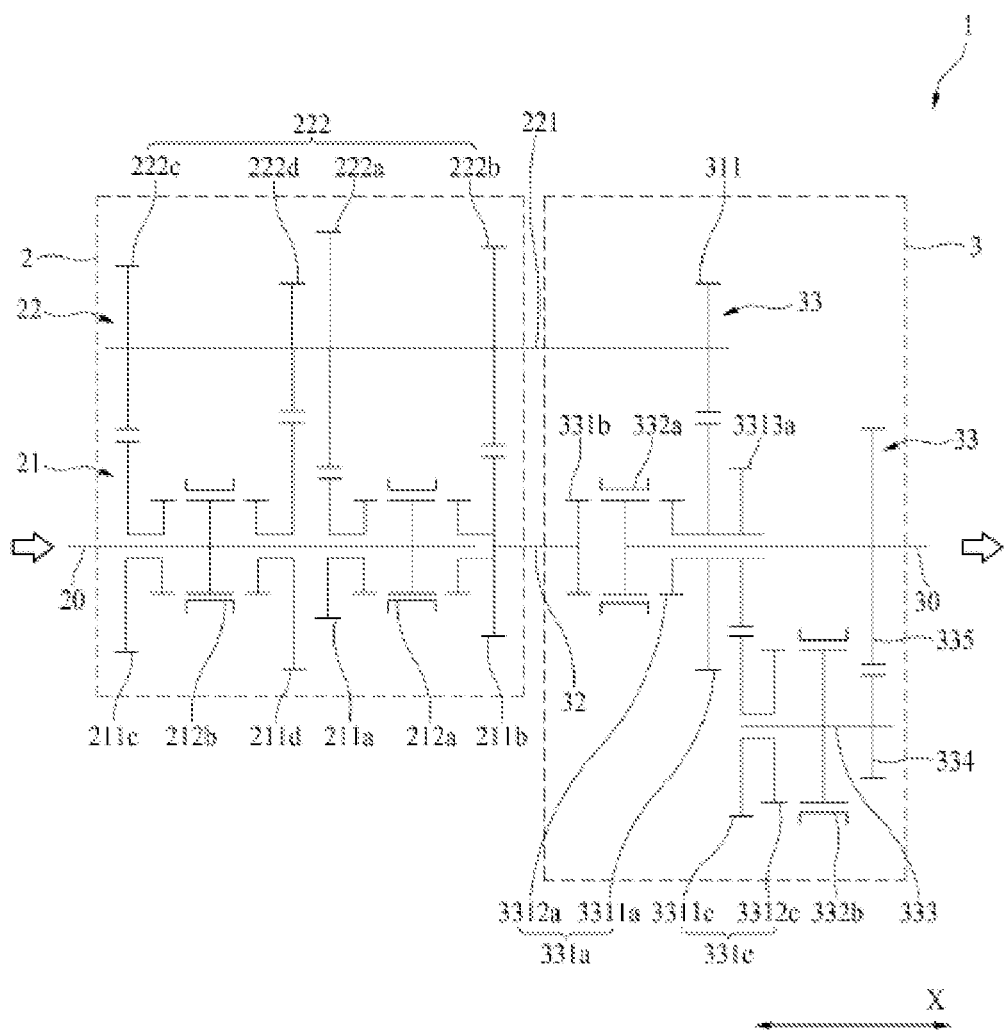
FIGS. 14 to 16 are schematic power transmission diagrams for describing a modified embodiment of the sub gear-shifting part in the transmission apparatus of an agricultural working automobile according to the first embodiment of the present invention.
Figure 15:
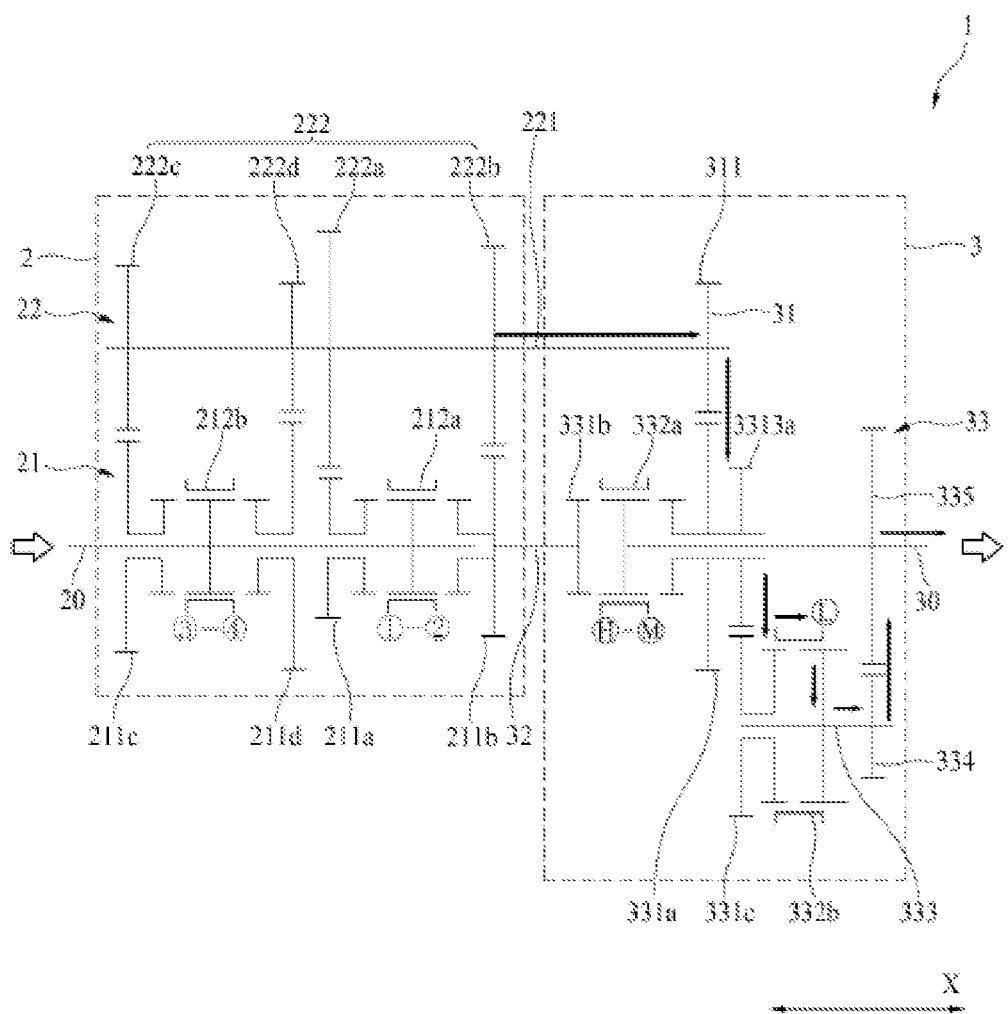
Figure 16:
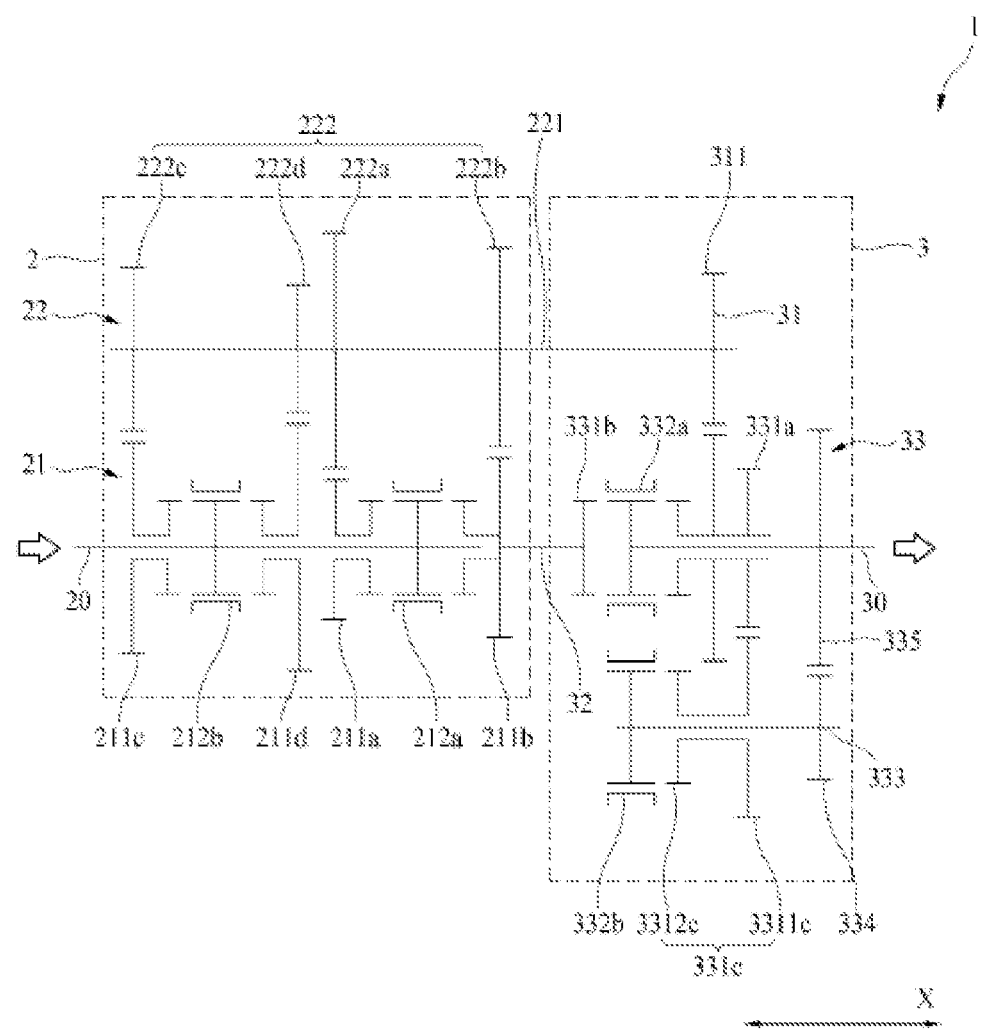

Referring to FIGS. 14 to 16, the sub gear-shifting part 3 according to a modified embodiment of the present invention may further include a third sub gear-shifting drive gear 331c and a second sub gear-shifting sleeve 332b.

The third sub gear-shifting drive gear 331c is connected to the first sub gear-shifting drive gear 331a. Accordingly, the third sub gear-shifting drive gear 331c may rotate as the first sub gear-shifting drive gear 331a rotates. The third sub gear-shifting drive gear 331c may include a third input gear 3311c for being engaged with the first sub gear-shifting drive gear 331a and a third output gear 3312c for being engaged with the second sub gear-shifting sleeve 332b. In this case, the first sub gear-shifting drive gear 331a may include a first sub output gear 3313a for being engaged with the third input gear 3311c. Accordingly, when the first sub gear-shifting drive gear 331a rotates, the third sub gear-shifting drive gear 331c may rotate through the engagement between the first sub output gear 3313a and the third input gear 3311c. In this case, when the third output gear 3312c is in a state of being connected to the second sub gear-shifting sleeve 332b, the third sub gear-shifting drive gear 331c is rotated by the first sub gear-shifting drive gear 331a to rotate the second sub gear-shifting sleeve 332b.

The second sub gear-shifting sleeve 332b is selectively connected to the third sub gear-shifting drive gear 331c for the second gear shifting. In this case, the second sub gear-shifting sleeve 332b may be selectively connected to the third sub gear-shifting drive gear 331c by the gear-shifting operation of the operator while moving along the first axis direction (the X axis direction). The second sub gear-shifting sleeve 332b is connected to the sub gear-shifting output mechanism 30. Accordingly, when the second sub gear-shifting sleeve 332b is connected to the third sub gear-shifting drive gear 331c, the sub gear-shifting output mechanism 30 may output the driving power provided from the second sub gear-shifting sleeve 332b. In this case, the first sub gear-shifting sleeve 332a is in a neutral state in which the first sub gear-shifting sleeve 332a is not connected to both the first sub gear-shifting drive gear 331a and the second sub gear-shifting drive gear 331b. When the first sub gear-shifting sleeve 332a is connected to the first sub gear-shifting drive gear 331a or the second sub gear-shifting drive gear 331b, the sub gear-shifting output mechanism 30 may output the driving power provided from the first sub gear-shifting sleeve 332a. In this case, the second sub gear-shifting sleeve 332b is in a neutral state which is not connected to the third sub gear-shifting drive gear 331c.

As described above, since the sub gear-shifting part 3 may perform the second gear shifting in three stages, the transmission apparatus 1 of an agricultural working automobile according to the first embodiment of the present invention may be implemented so that the agricultural working automobile may perform work in accordance with various work environments through more detailed gear shifting. Accordingly, the transmission apparatus 1 of an agricultural working automobile according to the first embodiment of the present invention may not only improve efficiency of the work using the agricultural working automobile but also contribute to increasing utilization of the agricultural working automobile for various working environments.

The sub gear-shifting drive mechanism 33 may include a connection shaft 333, a first connection gear 334, and a second connection gear 335.

The connection shaft 333 connects the second sub gear-shifting sleeve 332b to the first connection gear 334. The second sub gear-shifting sleeve 332b and the first connection gear 334 may be coupled to the connection shaft 333 at a position spaced apart from each other in the first axis direction (the X axis direction). Accordingly, when the second sub gear-shifting sleeve 332b rotates, the connection shaft 333 may rotate the first connection gear 334 while rotating as the second sub gear-shifting sleeve 332b rotates. The connection shaft 333 may be disposed parallel to the sub gear-shifting output mechanism 30. The third sub gear-shifting drive gear 331c may be idly coupled to the connection shaft 333. A bearing (not shown) may be installed between the third sub gear-shifting drive gear 331c and the connection shaft 333.

The first connection gear 334 rotates as the connection shaft 333 rotates. The first connection gear 334 may be engaged with the second connection gear 335. Accordingly, the first connection gear 334 may rotate the second connection gear 335 while rotating as the connection shaft 333 rotates. The first connection gear 334 may transmit the driving power to the second connection gear 335 using a plurality of gear teeth. For example, the first connection gear 334 may be a helical gear.

The second connection gear 335 is coupled to the sub gear-shifting output mechanism 30. The second connection gear 335 may be coupled to the sub gear-shifting output mechanism 30 at a position spaced apart from the first sub gear-shifting drive gear 331a in the first axis direction (the X axis direction). The second connection gear 335 may be engaged with the first connection gear 334. Accordingly, the second connection gear 335 may rotate the sub gear-shifting output mechanism 30 while rotating as the first connection gear 334 rotates. The second connection gear 335 may receive the driving power from the first connection gear 334 using a plurality of gear teeth. For example, the second connection gear 335 may be a helical gear.

The second connection gear 335 may be formed to have a greater diameter than the first connection gear 334. Accordingly, deceleration may be achieved in a process of transmitting the driving power from the first connection gear 334 to the second connection gear 335. In this case, as shown in FIG. 15, when the second sub gear-shifting sleeve 332b is connected to the third sub gear-shifting drive gear 331c, the second gear shifting may be performed at a low stage. When the first sub gear-shifting sleeve 332a is connected to the second sub gear-shifting drive gear 331b, the second gear shifting may be performed at a high stage. When the first sub gear-shifting sleeve 332a is connected to the first sub gear-shifting drive gear 331a, the second gear shifting may be performed at a middle stage. In this case, the high stage is the fastest speed and the low stage is the slowest speed. The middle stage is the middle speed between the high stage and the low stage.

As shown in FIG. 15, when the second sub gear-shifting sleeve 332b is connected to the third sub gear-shifting drive gear 331c, the second sub gear-shifting sleeve 332b may receive the driving power in which the first gear shifting is performed through the first power transmission path. In this case, for all first gear-shifting stages performable by the main gear-shifting part 2, the second sub gear-shifting sleeve 332b may receive the driving power in which the first gear shifting is performed through the first power transmission path. The driving power transmitted through the first power transmission path is sequentially transmitted through the sub gear-shifting input gear 311, the first sub gear-shifting drive gear 331a, the third sub gear-shifting drive gear 331c, the second sub gear-shifting sleeve 332b, the connection shaft 333, the first connection gear 334, and the second connection gear 335 to perform the second gear-shifting and may be output to the second external device through the sub gear-shifting output mechanism 30.

Here, as shown in FIG. 15, the sub gear-shifting drive mechanism 33 may be disposed so that the second sub gear-shifting sleeve 332b is positioned between the third sub gear-shifting drive gear 331c and the first connection gear 334.

Meanwhile, as shown in FIG. 16, the sub gear-shifting drive mechanism 33 may be disposed so that the third sub gear-shifting drive gear 331c is positioned between the second sub gear-shifting sleeve 332b and the first connection gear 334. In this case, the second sub gear-shifting sleeve 332b and the third sub gear-shifting drive gear 331c may be disposed so that at least parts thereof overlap the first sub gear-shifting sleeve 332a and the first sub gear-shifting drive gear 331a.

Accordingly, since the transmission apparatus 1 of an agricultural working automobile according to the first embodiment of the present invention may be implemented such that a length thereof based on the first axis direction (the X axis direction) is reduced, an installation area occupied by the agricultural working automobile based on the first axis direction (X axis direction) may be reduced. Accordingly, the transmission apparatus 1 of an agricultural working automobile according to the first embodiment of the present invention may contribute to improving utilization of spaces for installing and disposing various devices on the agricultural working automobile. Referring to FIG. 16, the second sub gear-shifting sleeve 332b and the third sub gear-shifting drive gear 331c may be disposed on bottoms of the first sub gear-shifting sleeve 332a and the first sub gear-shifting drive gear 331a so as to overlap the first sub gear-shifting sleeve 332a and the first sub gear-shifting drive gear 331a.

Figure 17:
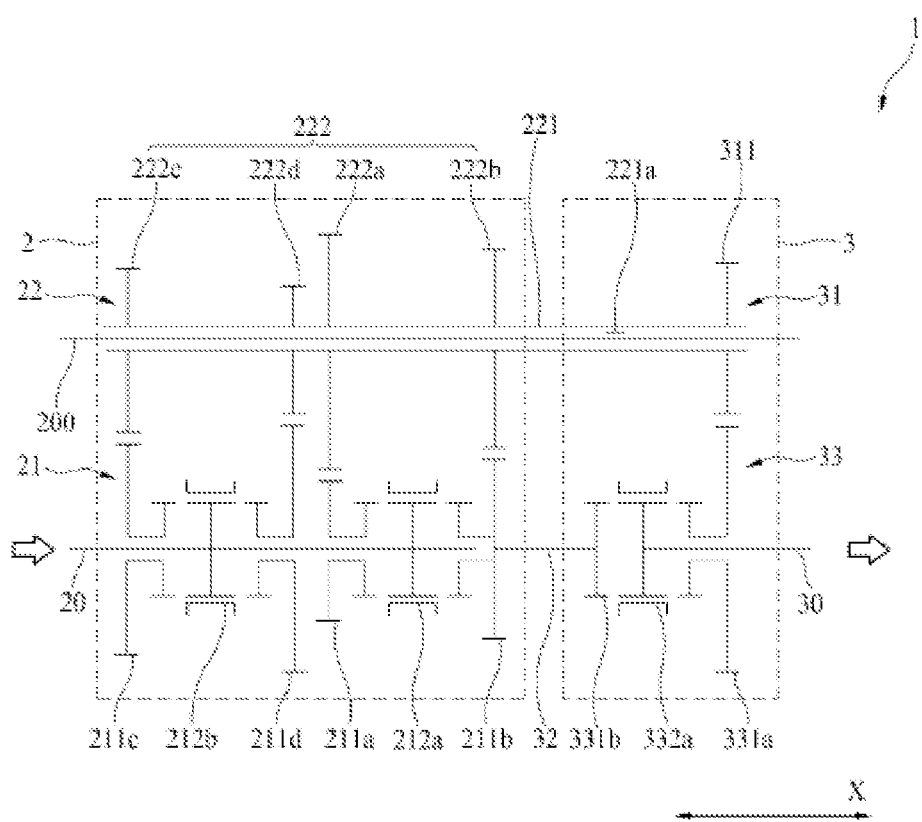
FIGS. 17 and 18 are schematic power transmission diagrams for describing a modified embodiment of a main gear-shifting output member in the transmission apparatus of an agricultural working automobile according to the first embodiment of the present invention.
Figure 18:
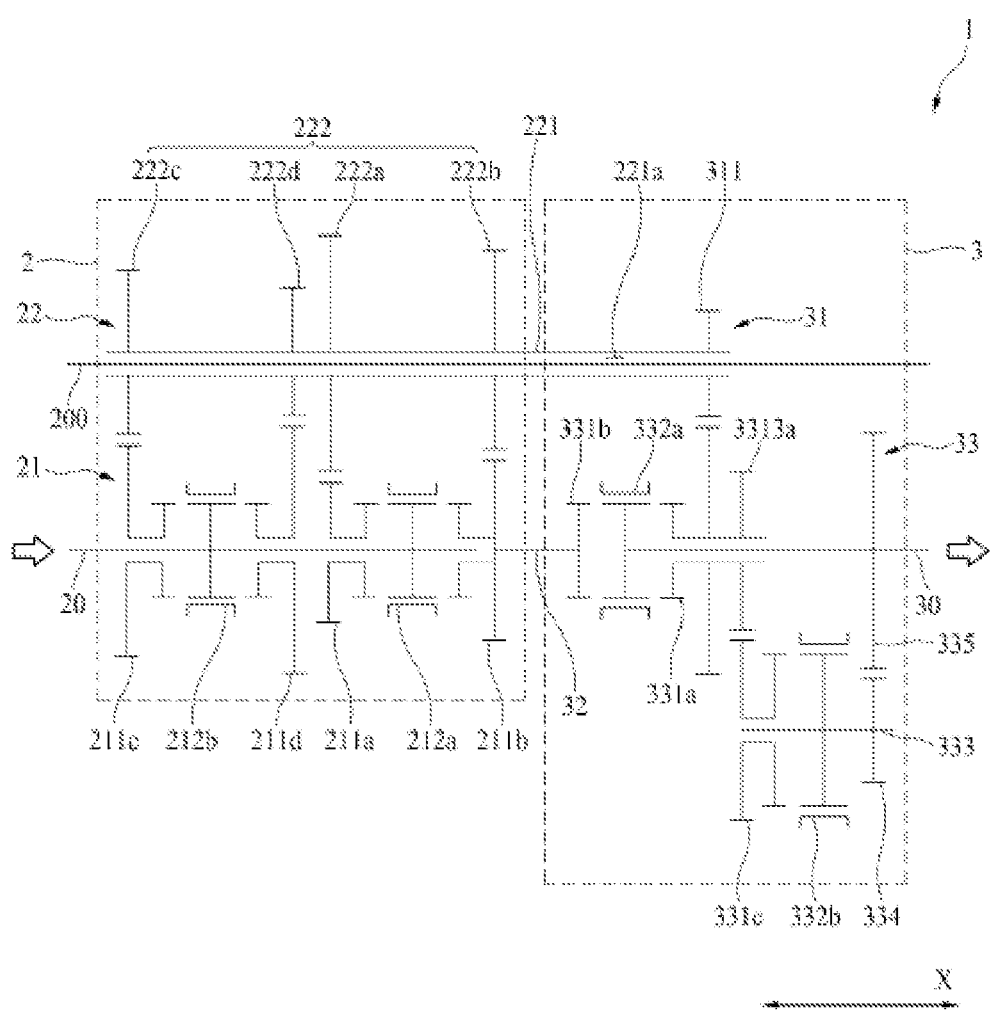

Referring to FIGS. 17 and 18, in the transmission apparatus 1 of an agricultural working automobile according to the first embodiment of the present invention, a through hole 221a may be formed in the main gear-shifting output member 221. The through hole 221a may be formed to pass through the main gear-shifting output member 221. Accordingly, a power transmission shaft 200 of the agricultural working automobile may be installed in the main gear-shifting output member 221. The power transmission shaft 200 is installed to traverse the inside of the main gear-shifting output member 221 through the through hole 221a to transmit a predetermined drive. Accordingly, the transmission apparatus 1 of a working automobile according to the first embodiment of the present invention may contribute to further improving utilization of the spaces for installing and disposing various devices on the agricultural working automobile.

Figure 19:
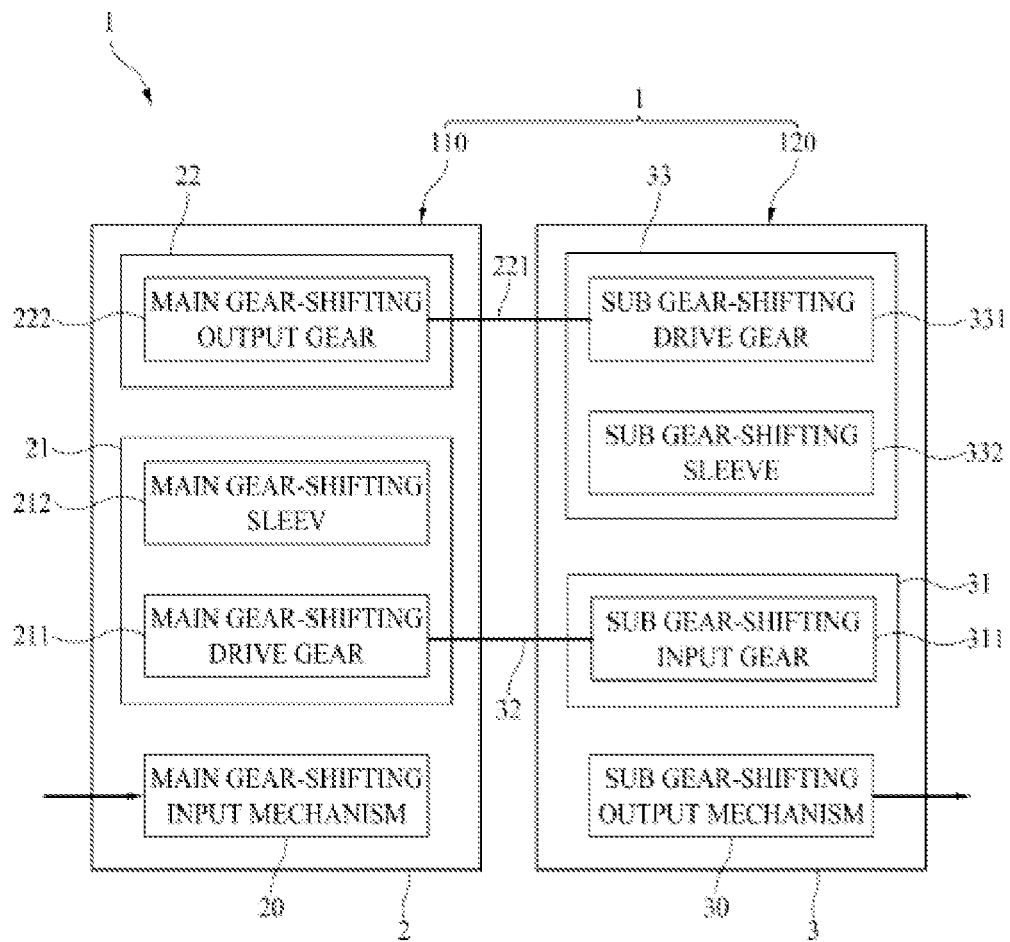
FIG. 19 is a schematic block diagram of a transmission apparatus of an agricultural working automobile according to a modified first embodiment of the present invention.
Figure 20:
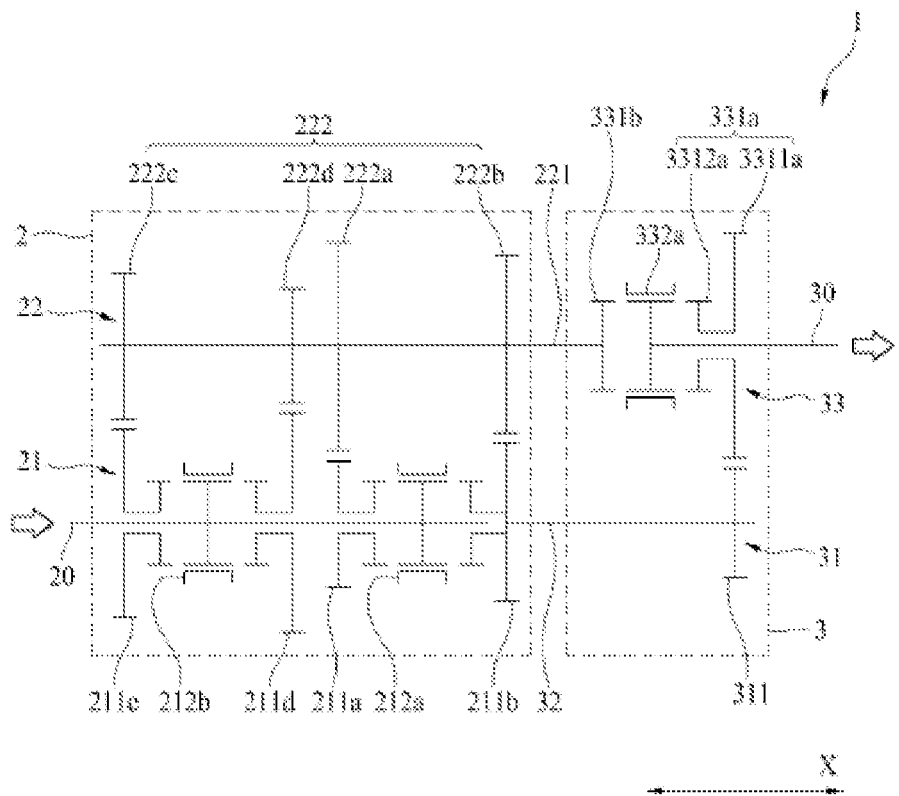
FIGS. 20 to 22 are schematic power transmission diagrams of the transmission apparatus of an agricultural working automobile according to the modified first embodiment of the present invention.

Referring to FIGS. 19 and 20, a transmission apparatus 1 of an agricultural working automobile according to a modified first embodiment of the present invention may include the first gear-shifting part 110 and the second gear-shifting part 120. Since the first gear-shifting part 110 and the second gear-shifting part 120 are substantially the same as those described in the transmission apparatus 1 of an agricultural working automobile according to the first embodiment of the present invention, the following description will focus on parts with differences. Here, description will be made on the basis of an embodiment in which a main gear-shifting part 2 of the first gear-shifting part 110 and a sub gear-shifting part 3 of the second gear-shifting part 120 are connected to each other through two power transmission paths.

A main gear-shifting output mechanism 22 of the main gear-shifting part 2 may be connected to a sub gear-shifting drive mechanism 33 of the sub gear-shifting part 3. Accordingly, the main gear-shifting output mechanism 22 may implement the first power transmission path. One side of a main gear-shifting output member 221 of the main gear-shifting output mechanism 22 may be coupled to a main gear-shifting output gears 222 of the main gear-shifting output mechanism 22, and the other side of the main gear-shifting output member 221 of the main gear-shifting output mechanism 22 may be coupled to one of the sub gear-shifting drive gears 331 of the sub gear-shifting drive mechanism 33. Accordingly, the sub gear-shifting drive mechanism 33 may receive the driving power from the main gear-shifting output mechanism 22 through the main gear-shifting output member 221.

A main gear-shifting drive mechanism 21 of the main gear-shifting part 2 may be connected to a sub gear-shifting input mechanism 31 of the sub gear-shifting part 3. Accordingly, the sub gear-shifting input mechanism 31 may implement the second power transmission path. A sub gear-shifting connection mechanism 32 of the sub gear-shifting part 3 may connect the main gear-shifting drive mechanism 21 to the sub gear-shifting input mechanism 31. In this case, the sub gear-shifting input mechanism 31 and the sub gear-shifting connection mechanism 32 may implement the second power transmission path. One side of the sub gear-shifting connection mechanism 32 may be coupled to one of the main gear-shifting drive gears 211 of the main gear-shifting drive mechanism 21, and the other side of the sub gear-shifting connection mechanism 32 may be coupled to a sub gear-shifting input gear 311 of the sub gear-shifting input mechanism 31. Accordingly, the sub gear-shifting input mechanism 31 receives the driving power from the main gear-shifting drive mechanism 21 through the sub gear-shifting connection mechanism 32.

A sub gear-shifting input gear 311 of the sub gear-shifting input mechanism 31 may be connected to the sub gear-shifting connection mechanism 32. Accordingly, the sub gear-shifting input gear 311 may rotate as the sub gear-shifting connection mechanism 32 rotates. The sub gear-shifting input gear 311 receives the driving power in which the first gear shifting is performed from the sub gear-shifting connection mechanism 32 and may transmit the received drive to the sub gear-shifting drive mechanism 33. In this case, the sub gear-shifting connection mechanism 32 may transmit the driving power in which the first gear shifting is performed to the sub gear-shifting input gear 311, and simultaneously, may function as a rotation shaft of the sub gear-shifting input gear 311.

The sub gear-shifting drive mechanism 33 may perform the second gear shifting using the driving power transmitted through one power transmission path selected from the driving power transmitted through the first power transmission path and the driving power transmitted through the second power transmission path. The sub gear-shifting drive mechanism 33 may be connected to each of the main gear-shifting output mechanism 22 and the sub gear-shifting input mechanism 31. Thus, the sub gear-shifting drive mechanism 33 may receive the driving power through the first power transmission path implemented by the main gear-shifting output mechanism 22, and the driving power through the second power transmission path implemented by the sub gear-shifting connection mechanism 32. In this case, the sub gear-shifting drive mechanism 33 may perform the second gear shifting using one driving power selected from the driving power transmitted from the main gear-shifting output mechanism 22 and the driving power transmitted from the sub gear-shifting input mechanism 31.

The sub gear-shifting drive mechanism 33 may be connected to the sub gear-shifting output mechanism 30. The sub gear-shifting output mechanism 30 may be rotated by the driving power in which the second gear shifting is performed by the sub gear-shifting drive mechanism 33. The sub gear-shifting output mechanism 30 may be connected to the second external device. Accordingly, the sub gear-shifting part 3 may output the driving power, in which the second gear shifting is performed after performing the first gear shifting, to the second external device through the sub gear-shifting output mechanism 30. The sub gear-shifting output mechanism 30 and the main gear-shifting output member 221 may be disposed on the same line.

One sub gear-shifting drive gear 331 of the sub gear-shifting drive gears 331 is connected to the main gear-shifting output mechanism 22 through the main gear-shifting output member 221 so that the sub gear-shifting drive mechanism 33 may be connected to the main gear-shifting part 2. In this case, one side of the main gear-shifting output member 221 may be coupled to one main gear-shifting output gear 222 of the main gear-shifting output gears 222, and the other side of the main gear-shifting output member 221 may be coupled to one sub gear-shifting drive gear 331 of the sub gear-shifting drive gears 331. That is, the main gear-shifting output member 221 may connect the main gear-shifting output gear 222 to the sub gear-shifting drive gear 331 in a direct connection manner. The sub gear-shifting drive gear 331, which is spaced apart from the main gear-shifting output mechanism 22 by the shortest distance, of the sub gear-shifting drive gears 331 is connected to the main gear-shifting output member 221 so that the sub gear-shifting drive mechanism 33 may be connected to the main gear-shifting part 2. The shortest distance is on the basis of the first axis direction (the X axis direction).

The sub gear-shifting drive mechanism 33 may include a first sub gear-shifting drive gear 331a which is rotated by the driving power provided from the sub gear-shifting input mechanism 31, a second sub gear-shifting drive gear 331b which is rotated by the driving power provided from the main gear-shifting output mechanism 22, and a first sub gear-shifting sleeve 332a selectively connected to the first sub gear-shifting drive gear 331a or the second sub gear-shifting drive gear 331b for the second gear shifting.

The first sub gear-shifting drive gear 331a may be connected to the sub gear-shifting input mechanism 31. The sub gear-shifting connection mechanism 32 may be coupled to the sub gear-shifting input mechanism 31. Accordingly, when the first sub gear-shifting sleeve 332a is connected to the sub gear-shifting input mechanism 31, the first sub gear-shifting sleeve 332a may receive the driving power in which the first gear shifting is performed through the sub gear-shifting input mechanism 31 and the sub gear-shifting connection mechanism 32. That is, the first sub gear-shifting sleeve 332a may receive the driving power in which the first gear shifting is performed through the second power transmission path.

The second sub gear-shifting drive gear 331b may be coupled to the main gear-shifting output member 221. Accordingly, when the first sub gear-shifting sleeve 332a is connected to the second sub gear-shifting drive gear 331a, the first sub gear-shifting sleeve 332a may receive the driving power in which the first gear shifting is performed through the main gear-shifting output member 221 coupled to the main gear-shifting output mechanism 22. That is, the first sub gear-shifting sleeve 332a may receive the driving power in which the first gear shifting is performed through the first power transmission path.

Figure 21:
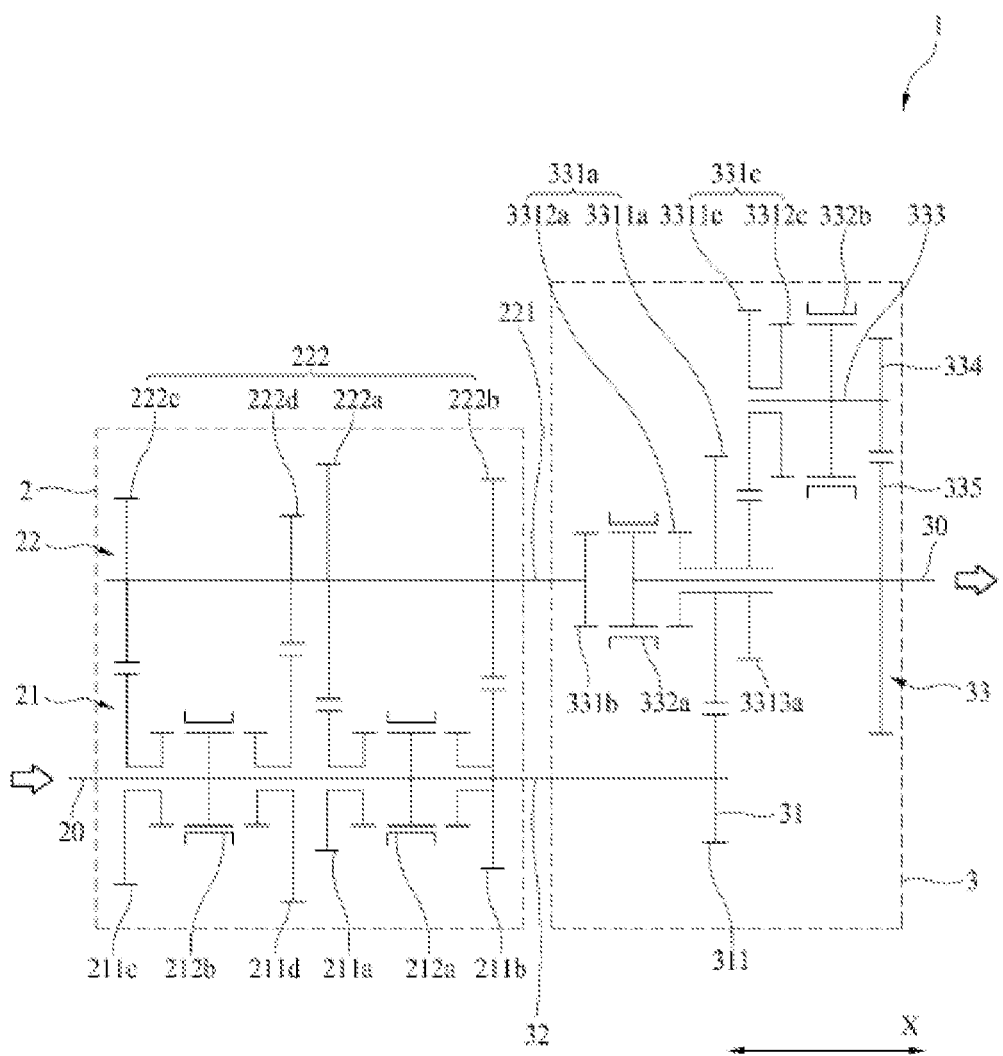
Figure 22:
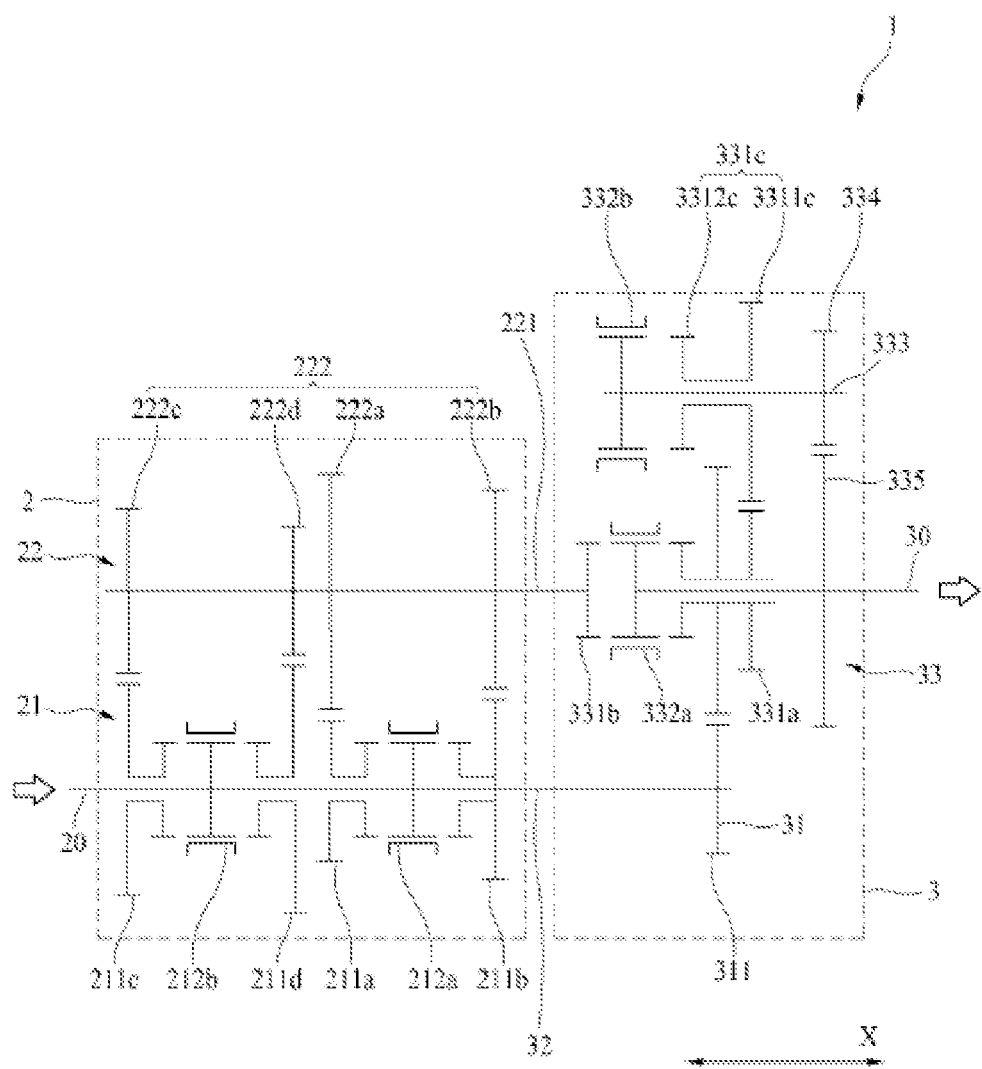

Referring to FIGS. 21 and 22, the transmission apparatus 1 of an agricultural working automobile according to the modified first embodiment of the present invention may be implemented to include the sub gear-shifting part 3 according to the above-described modified embodiment of the present invention. In this case, the sub gear-shifting part 3 may include the third sub gear-shifting drive gear 331c, the second sub gear-shifting sleeve 332b, the connection shaft 333, the first connection gear 334, and the second connection gear 335. This is substantially the same as that described in the sub gear-shifting part 3 according to the above-described modified embodiment of the present invention, and thus a detailed description thereof will be omitted.

Second Embodiment

A transmission apparatus 1 of an agricultural working automobile according to a second embodiment of the present invention may include the first gear-shifting part 110 and the second gear-shifting part 120. In the transmission apparatus 1 of an agricultural working automobile according to the second embodiment of the present invention, since the first gear-shifting part 110 and the second gear-shifting part 120 are substantially the same as those described in the first embodiment, the following description will focus on parts with differences.

Figure 23:
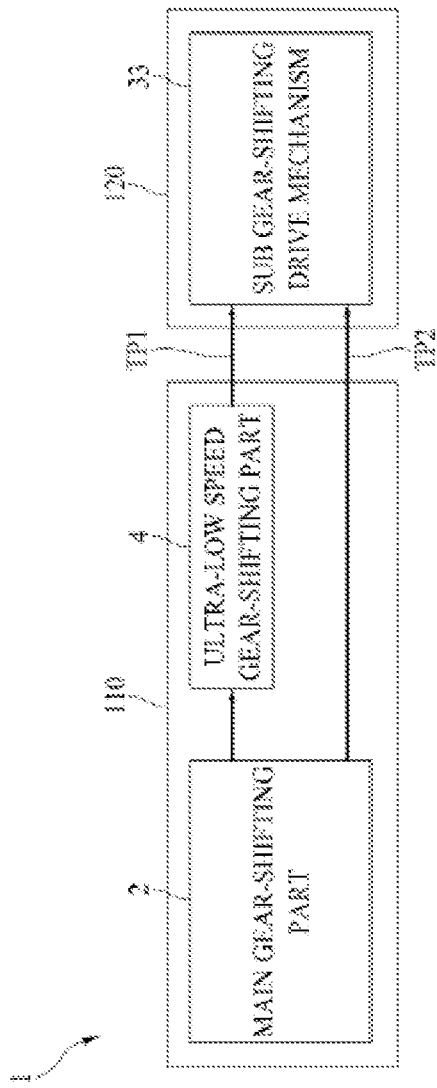
FIGS. 23 and 24 are schematic block diagrams of a transmission apparatus of an agricultural working automobile according to a second embodiment of the present invention.
Figure 24:
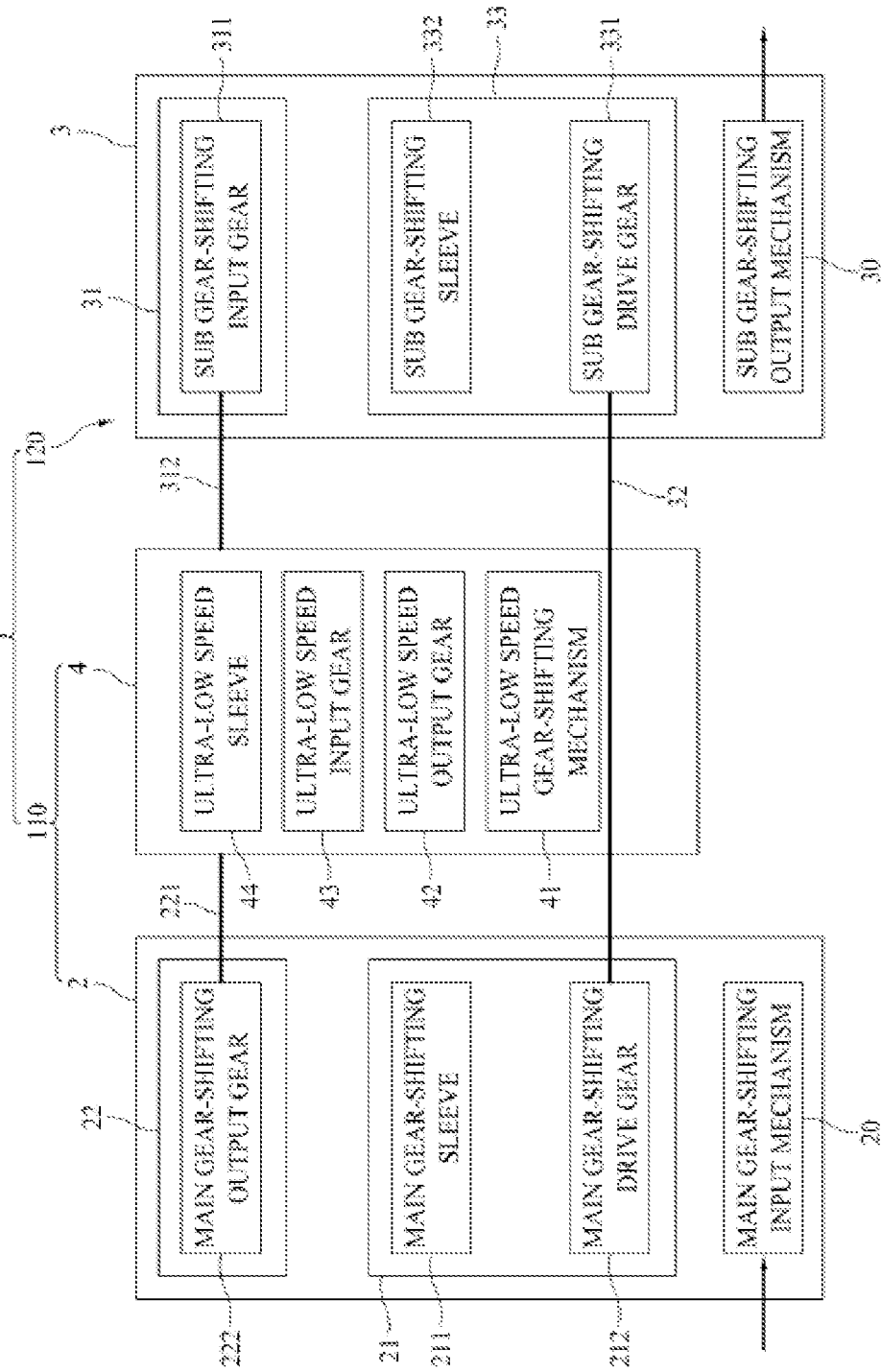
Figure 25:
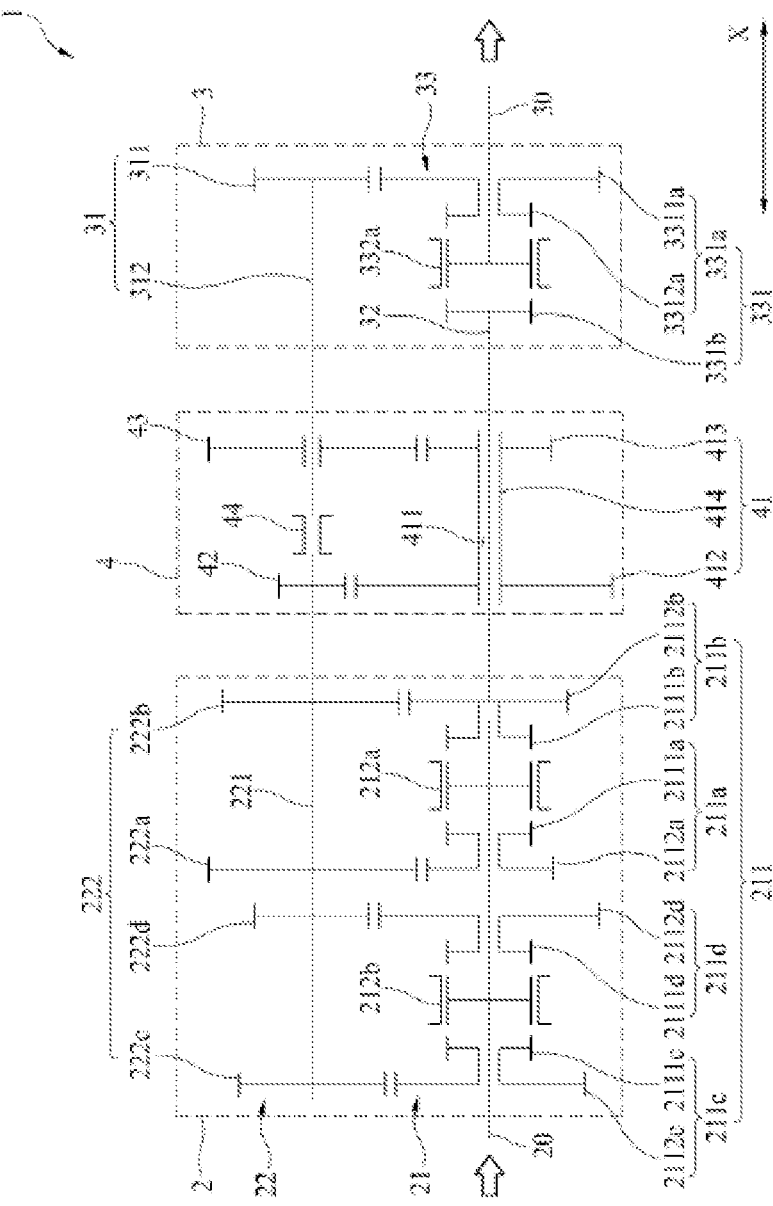
FIGS. 25 to 27 are schematic power transmission diagrams of the transmission apparatus of an agricultural working automobile according to the second embodiment of the present invention.

Referring to FIGS. 23 to 25, the first gear-shifting part 110 may include the main gear-shifting part 2 and an ultra-low speed gear-shifting part 4.

The main gear-shifting part 2 performs the first gear shifting to adjust a speed of the agricultural working automobile. Since the main gear-shifting part 2 coincides substantially with that described in the first embodiment, the following description will focus on parts with differences. The main gear-shifting part 2 may be connected to each of the ultra-low speed gear-shifting part 4 and the sub gear-shifting part 3. Accordingly, the main gear-shifting part 2 may output the driving power in which the first gear shifting is performed to each of the ultra-low speed gear-shifting part 4 and the sub gear-shifting part 3. The main gear-shifting part 2 may include the main gear-shifting drive mechanism 21 and the main gear-shifting output mechanism 22.

The main gear-shifting output mechanism 22 may be connected to each of the main gear-shifting drive mechanism 21 and the ultra-low speed gear-shifting part 4. The main gear-shifting output mechanism 22 may include the main gear-shifting output member 221 and the main gear-shifting output gears 222.

The main gear-shifting output member 221 may be connected to the ultra-low speed gear-shifting part 4. Accordingly, the main gear-shifting output member 221 may output the driving power in which the first gear shifting is performed to the ultra-low speed gear-shifting part 4. The main gear-shifting output member 221 may function as one of the power transmission paths for the main gear-shifting part 2 to output the driving power in which the first gear shifting is performed Referring to FIGS. 23 and 25, the ultra-low speed gear-shifting part 4 may be installed between the main gear-shifting part 2 and the second gear-shifting part 120. The ultra-low speed gear-shifting part 4 may be installed between the main gear-shifting part 2 and the second gear-shifting part 120 on the basis of the first axis direction (the X axis direction). The ultra-low speed gear-shifting part 4 may perform one gear shifting selected from normal gear shifting and ultra-low speed gear shifting on the driving power transmitted from the main gear-shifting part 2. The selection of either one gear shifting of the normal gear shifting and the ultra-low speed gear shifting may be performed by the gear-shifting operation of the operator. When the normal gear shifting is selected, the ultra-low speed gear-shifting part 4 may output the driving power transmitted from the main gear-shifting part 2 to the second gear-shifting part 120 as it is. When the ultra-low speed gear shifting is selected, the ultra-low speed gear-shifting part 4 may perform the gear shifting on the driving power transmitted from the main gear-shifting part 2 at an ultra-low speed and output to the second gear-shifting part 120. When the ultra-low speed gear-shifting part 4 is implemented to be connected to the sub gear-shifting part 3 of the second gear-shifting part 120, the ultra-low speed gear-shifting part 4 may perform one gear shifting selected from the normal gear shifting and ultra-low speed gear shifting on the driving power transmitted from the main gear-shifting part 2 and output to the sub gear-shifting part 3.

The ultra-low speed gear-shifting part 4 may include an ultra-low speed gear-shifting mechanism 41.

The ultra-low speed gear-shifting mechanism 41 performs the ultra-low speed gear shifting on the driving power transmitted from the main gear-shifting part 2. The ultra-low speed gear-shifting mechanism 41 may be positioned between the main gear-shifting drive mechanism 21 and the sub gear-shifting drive mechanism 33. The ultra-low speed gear-shifting mechanism 41 may include a first gear-shifting gear 412, a second gear-shifting gear 413, and a coupling member 414.

The first gear-shifting gear 412 may be coupled to the coupling member 414. The first gear-shifting gear 412 may be formed to have a greater diameter than the second gear-shifting gear 413. The first gear-shifting gear 412 may receive the driving power using a plurality of gear teeth. For example, the first gear-shifting gear 412 may be a helical gear.

The second gear-shifting gear 413 may be coupled to the coupling member 414. The second gear-shifting gear 413 and the first gear-shifting gear 412 may be coupled to the coupling member 414 at a position spaced apart from each other on the basis of the first axis direction (the X axis direction). When the first gear-shifting gear 412 rotates the coupling member 414 while rotating, the second gear-shifting gear 413 may rotate as the coupling member 414 rotates. That is, the second gear-shifting gear 413 may rotate as the first gear-shifting gear 412 rotates. The second gear-shifting gear 413 may be formed to have a smaller diameter than the first gear-shifting gear 412. The second gear-shifting gear 413 may receive the driving power using a plurality of gear teeth. For example, the second gear-shifting gear 413 may be a helical gear.

The coupling member 414 may function as a rotation shaft of the first gear-shifting gear 412 and the second gear-shifting gear 413. The first gear-shifting gear 412 and the second gear-shifting gear 413 may rotate about the coupling member 414 as a rotation shaft.

The ultra-low speed gear-shifting part 4 may include an ultra-low speed input gear 42, an ultra-low speed output gear 43, and an ultra-low speed sleeve 44.

The ultra-low speed input gear 42 may be connected to each of the main gear-shifting part 2 and the ultra-low speed gear-shifting mechanism 41. The ultra-low speed input gear 42 may be connected to the main gear-shifting output mechanism 22. Accordingly, the ultra-lowshifting speed input gear 42 may be rotated by the driving power transmitted through the main gear-output mechanism 22. In this case, the ultra-low speed gear-shifting mechanism 41 may be connected to the ultra-low speed input gear 42. Accordingly, the ultra-low speed gear-shifting mechanism 41 may perform the ultra-low speed gear shifting on the driving power transmitted through the ultra-low speed input gear 42.

The ultra-low speed input gear 42 may be connected to the main gear-shifting output mechanism 22 by being coupled to the main gear-shifting output member 221. The ultra-low speed input gear 42 may be connected to the first gear-shifting gear 412. The ultra-low speed input gear 42 may be connected to the first gear-shifting gear 412 by being engaged with the first gear-shifting gear 412. Accordingly, the ultra-low speed input gear 42 rotates the first gear-shifting gear 412 while rotating as the main gear-shifting output member 221 rotates. The ultra-low speed input gear 42 may transmit the driving power using a plurality of gear teeth. For example, the ultra-low speed input gear 42 may be a helical gear. The ultra-low speed input gear 42 may be formed to have a smaller diameter than the first gear-shifting gear 412. Accordingly, deceleration gear shifting, in which the speed becomes slow, may be achieved in a process in which the driving power is transmitted from the ultra-low speed input gear 42 to the first gear-shifting gear 412.

The ultra-low speed output gear 43 may be connected to the ultra-low speed gear-shifting mechanism 41. Accordingly, the ultra-low speed output gear 43 may be rotated by the driving power transmitted through the ultra-low speed gear-shifting mechanism 41. The ultra-low speed output gear 43 may be connected to the second gear-shifting gear 413. The ultra-low speed output gear 43 may be connected to the second gear-shifting gear 413 by being engaged with the second gear-shifting gear 413. Accordingly, the ultra-low speed output gear 43 may rotate as the second gear-shifting gear 413 rotates. The ultra-low speed output gear 43 may receive the driving power using a plurality of gear teeth. For example, the ultra-low speed output gear 43 may be a helical gear. The ultra-low speed output gear 43 may be formed to have a greater diameter than the second gear-shifting gear 413. Accordingly, deceleration gear shifting, in which the speed becomes slow, may be achieved in a process in which the driving power is transmitted from the second gear-shifting gear 413 to the ultra-low speed output gear 43. Accordingly, since the deceleration gear shifting is achieved while transmitting the driving power from ultra-low speed input gear 42 to the first gear-shifting gear 412, and additional deceleration gear shifting is achieved while transmitting the driving power from the second gear-shifting gear 413 to the ultra-low speed output gear 43, the ultra-low speed gear-shifting part 4 may perform the ultra-low speed gear shifting. The ultra-low speed output gear 43 may be connected to the second gear-shifting part 120. The ultra-low speed output gear 43 may output the driving power in which the ultra-low speed gear shifting is performed to the second gear-shifting part 120 through the ultra-low speed sleeve 44.

The ultra-low speed sleeve 44 may be disposed between the main gear-shifting output member 221 and the second gear-shifting part 120. The ultra-low speed sleeve 44 may selectively connect the second gear-shifting part 120 to the main gear-shifting output mechanism 22 or the ultra-low speed output gear 43.

For example, when the normal gear shifting is selected, the ultra-low speed sleeve 44 may connect the main gear-shifting output member 221 to the second gear-shifting part 120. Accordingly, the driving power in which the first gear shifting is performed may be transmitted from the main gear-shifting part 2 to the second gear-shifting part 120 after passing through the main gear-shifting output member 221 and the ultra-low speed sleeve 44.

For example, when the ultra-low speed gear shifting is selected, the ultra-low speed sleeve 44 may connect the ultra-low speed output gear 43 to the second gear-shifting part 120. Accordingly, the driving power in which the first gear shifting is performed may be transmitted from the main gear-shifting part 2 to the second gear-shifting part 120 after passing through the main gear-shifting output member 221, the ultra-low speed input gear 42, the first gear-shifting gear 412, the coupling member 414, the second gear-shifting gear 413, the ultra-low speed output gear 43, and the ultra-low speed sleeve 44. The ultra-low speed sleeve 44 may be a synchronizer sleeve.

Referring to FIGS. 23 to 25, the second gear-shifting part 120 may include the sub gear-shifting part 3.

The sub gear-shifting part 3 performs second gear shifting to adjust the speed of the agricultural working automobile. The sub gear-shifting part 3 may include the sub gear-shifting drive mechanism 33.

The sub gear-shifting drive mechanism 33 performs the gear shifting using the driving power transmitted through one power transmission path selected between the first power transmission path TP1 and the second power transmission path TP2. The sub gear-shifting drive mechanism 33 may be connected to the first gear-shifting part 110 through each of the first power transmission path TP1 and the second power transmission path TP2. In this case, the first gear-shifting part 110 may output the driving power in which the first gear shifting is performed to the sub gear-shifting part 3 through the first power transmission path TP1 and the second power transmission path TP2. The sub gear-shifting drive mechanism 33 may perform the second gear shifting using the driving power transmitted through one power transmission path selected between the first power transmission path TP1 and the second power transmission path TP2. The first power transmission path TP1 is a path through which the driving power is transmitted from the main gear-shifting part 2 to the sub gear-shifting part 3 after passing through the ultra-low speed gear-shifting part 4. The second power transmission path TP2 is a path through which the driving power is transmitted directly from the main gear-shifting part 2 to the sub gear-shifting part 3 without passing through the ultra-low speed gear-shifting part 4. That is, the transmission apparatus 1 of an agricultural working automobile according to the second embodiment of the present invention is implemented so that the first gear-shifting part 110 and the sub gear-shifting part 3 are connected to each other through the first power transmission path TP1 passing through the ultra-low speed gear-shifting part 4 and the second power transmission path TP2 without passing through the ultra-low speed gear-shifting part 4.

Accordingly, the transmission apparatus 1 of an agricultural working automobile according to the second embodiment of the present invention is implemented to include the second power transmission path TP2 so that a part of a speed region is prevented from being unnecessarily overlapped and to prevent the ultra-low speed gear shifting from being applied even when the sub gear-shifting part 3 performs a high speed gear shifting so that an increase in maintenance costs due to a decrease in fuel efficiency may be reduced. Also, the transmission apparatus 1 of an agricultural working automobile according to the second embodiment of the present invention may divide the configuration for transmitting the driving power to the sub gear-shifting drive mechanism 33 into each of the first power transmission path TP1 and the second power transmission path TP2, thereby alleviating complexity of the configuration for transmitting the driving power to the sub gear-shifting drive mechanism 33 and improving ease of manufacturing work.

Referring to FIGS. 23 to 25, the sub gear-shifting part 3 may include the sub gear-shifting input mechanism 31 and the sub gear-shifting connection mechanism 32.

The sub gear-shifting input mechanism 31 may be connected to the ultra-low speed gear-shifting part 4. Accordingly, the sub gear-shifting input mechanism 31 may implement the first power transmission path which receives the driving power from the ultra-low speed gear-shifting part 4. The sub gear-shifting input mechanism 31 may receive the driving power, in which the normal gear shifting or the ultra-low speed gear shifting is performed, from the ultra-low speed gear-shifting part 4. The sub gear-shifting input mechanism 31 may transmit the driving power transmitted from the ultra-low speed gear-shifting part 4 to the sub gear-shifting drive mechanism 33.

The sub gear-shifting input mechanism 31 may be connected to the ultra-low speed output gear 43. The ultra-low speed output gear 43 may be idly coupled to the sub gear-shifting input mechanism 31. The ultra-low speed output gear 43 may output the driving power in which the ultra-low speed gear shifting is performed to the sub gear-shifting input mechanism 31 through the ultra-low speed sleeve 44. The ultra-low speed sleeve 44 may be disposed between the main gear-shifting output member 221 and the sub gear-shifting input mechanism 31. The ultra-low speed sleeve 44 may selectively connect the sub gear-shifting input mechanism 31 to the main gear-shifting output mechanism 22 or the ultra-low speed output gear 43.

For example, when the normal gear shifting is selected, the ultra-low speed sleeve 44 may connect the main gear-shifting output member 221 to the sub gear-shifting input mechanism 31. Accordingly, the driving power in which the first gear shifting is performed may be transmitted from the main gear-shifting part 2 to the sub gear-shifting part 3 after passing through the main gear-shifting output member 221, ultra-low speed sleeve 44, and the sub gear-shifting input mechanism 31.

For example, when the ultra-low speed gear shifting is selected, the ultra-low speed sleeve 44 may connect the ultra-low speed output gear 43 to the sub gear-shifting input mechanism 31. Accordingly, the driving power in which the first gear shifting is performed may be transmitted from the main gear-shifting part 2 to the sub gear-shifting part 3 after passing through the main gear-shifting output member 221, the ultra-low speed input gear 42, the first gear-shifting gear 412, the coupling member 414, the second gear-shifting gear 413, the ultra-low speed output gear 43, the ultra-low speed sleeve 44, and the sub gear-shifting input mechanism 31.

The sub gear-shifting input mechanism 31 may include the sub gear-shifting input gear 311 and the sub gear-shifting input member 312.

The sub gear-shifting input gear 311 may be connected to the sub gear-shifting input member 312. Accordingly, the sub gear-shifting input gear 311 may rotate as the sub gear-shifting input member 312 rotates. The sub gear-shifting input gear 311 receives the driving power from the sub gear-shifting input member 312 and may transmit the received drive to the sub gear-shifting drive mechanism 33. The sub gear-shifting input gear 311 may be connected to the sub gear-shifting input member 312 by being coupled to the sub gear-shifting input member 312.

The sub gear-shifting input member 312 may be connected to the ultra-low speed gear-shifting part 4. Accordingly, the sub gear-shifting input member 312 may receive the driving power from the ultra-low speed gear-shifting part 4. The sub gear-shifting input member 312 may be connected to the ultra-low speed sleeve 44. The sub gear-shifting input gear 311 may be coupled to the sub gear-shifting input member 312. Accordingly, when the normal gear shifting is selected, the driving power in which the first gear shifting is performed may be transmitted to the sub gear-shifting drive mechanism 33 after passing through the main gear-shifting output member 221, the ultra-low speed sleeve 44, the sub gear-shifting input member 312, and the sub gear-shifting input gear 311. When the ultra-low speed gear shifting is selected, the driving power in which the first gear shifting is performed may be transmitted to the sub gear-shifting drive mechanism 33 after passing through the main gear-shifting output member 221, the ultra-low speed input gear 42, the first gear-shifting gear 412, the coupling member 414, the second gear-shifting gear 413, the ultra-low speed output gear 43, the ultra-low speed sleeve 44, the sub gear-shifting input member 312, and the sub gear-shifting input gear 311.

The sub gear-shifting input member 312 may be disposed parallel to the first axis direction (the X axis direction). The sub gear-shifting input member 312 may function as a rotation shaft in the sub gear-shifting input mechanism 31. For example, the sub gear-shifting input member 312 may be a shaft. The sub gear-shifting input member 312 may function as one of the power transmission paths through which the sub gear-shifting part 3 receives the driving power. The sub gear-shifting input member 312 and the main gear-shifting output member 221 may be disposed on the same line.

The sub gear-shifting connection mechanism 32 may be connected to the main gear-shifting part 2. Accordingly, the sub gear-shifting connection mechanism 32 may implement the second power transmission path through which the driving power in which the first gear shifting is performed is directly transmitted from the main gear-shifting part 2. The sub gear-shifting connection mechanism 32 may be connected to the main gear-shifting part 2 so that the second power transmission path is implemented, by being connected to the main gear-shifting drive mechanism 21. The sub gear-shifting connection mechanism 32 may be connected to the sub gear-shifting drive mechanism 33. Accordingly, the sub gear-shifting connection mechanism 32 may transmit the driving power transmitted through the second power transmission path to the sub gear-shifting drive mechanism 33.

Accordingly, the sub gear-shifting part 3 may include the first power transmission path which receives the driving power from the main gear-shifting part 2 after passing through the ultra-low speed gear-shifting part 4 through the sub gear-shifting input mechanism 31, and the second power transmission path which directly receives the driving power from the main gear-shifting part 2 without passing through the ultra-low speed gear-shifting part 4 through the sub gear-shifting connection mechanism 32. Meanwhile, the main gear-shifting part 2 may include a first power output path which outputs the driving power through the main gear-shifting output member 221 and a second power output path which outputs the driving power through the sub gear-shifting connection mechanism 32.

Accordingly, the transmission apparatus 1 of an agricultural working automobile according to the second embodiment of the present invention may prevent a part of the speed region from being unnecessarily overlapped and reduce an increase in maintenance costs due to a decrease in fuel efficiency by being implemented to prevent the ultra-low speed gear-shifting from being applied even when the sub gear-shifting part 3 performs high speed gear shifting. Also, in the transmission apparatus 1 of an agricultural working automobile according to the second embodiment of the present invention, the sub gear-shifting input mechanism 31 and the sub gear-shifting connection mechanism 32 may share the configuration for transmitting the driving power to the sub gear-shifting drive mechanism 33, thereby implementing the configuration of the sub gear-shifting input mechanism 31 in a simple manner Thus, the transmission apparatus 1 of an agricultural working automobile according to the second embodiment of the present invention may alleviate complexity of the configuration for the sub gear-shifting input mechanism 31 and also improve ease of manufacturing work.

The sub gear-shifting connection mechanism 32 may be disposed to be positioned between the main gear-shifting drive mechanism 21 and the sub gear-shifting drive mechanism 33. One side of the sub gear-shifting connection mechanism 32 may be connected to the main gear-shifting drive mechanism 21. The other side of the sub gear-shifting connection mechanism 32 may be connected to the sub gear-shifting drive mechanism 33. The sub gear-shifting connection mechanism 32 may traverse the ultra-low speed gear-shifting part 4 to be coupled to each of the main gear-shifting drive mechanism 21 and the sub gear-shifting drive mechanism 33. In this case, a connection hole 411 may be formed in the ultra-low speed gear-shifting mechanism 41. The connection hole 411 may be formed to pass through the coupling member 414 of the ultra-low speed gear-shifting mechanism 41. The sub gear-shifting connection mechanism 32 is positioned in the ultra-low speed gear-shifting mechanism 41 through the connection hole 411 to connect the main gear-shifting drive mechanism 21 to the sub gear-shifting drive mechanism 33. Accordingly, the transmission apparatus 1 of an agricultural working automobile according to the second embodiment of the present invention may reduce the length of the sub gear-shifting connection mechanism 32 on the basis of the first axis direction (the X axis direction), thereby not only improving drive transmission performance to the sub gear-shifting connection mechanism 32 but also reducing manufacturing costs for the sub gear-shifting connection mechanism 32. Further, in the transmission apparatus 1 of an agricultural working automobile according to the second embodiment of the present invention, the sub gear-shifting connection mechanism 32 may connect the sub gear-shifting drive gear 331 to the main gear-shifting drive gear 211 in a direct connection manner, thereby implementing the configuration for connecting the sub gear-shifting drive gear 331 to the main gear-shifting drive gear 211 in a simple manner. The ultra-low speed gear-shifting mechanism 41 may be idly coupled to the sub gear-shifting connection mechanism 32 installed in the connection hole 411. The coupling member 414 of the ultra-low speed gear-shifting mechanism 41 may be idly coupled to the sub gear-shifting connection mechanism 32. A bearing (not shown) may be installed between the coupling member 414 and the sub gear-shifting connection mechanism 32.

The sub gear-shifting connection mechanism 32 may be disposed on the same line as the main gear-shifting drive mechanism 20. Accordingly, the transmission apparatus 1 of an agricultural working automobile according to the second embodiment of the present invention may improve ease of manufacturing work by improving ease of disposition for the main gear-shifting drive mechanism 21 and the sub gear-shifting drive mechanism 33. The sub gear-shifting connection mechanism 32 may be a shaft.

The sub gear-shifting drive mechanism 33 will be described in more detail with reference to FIGS. 23 to 27 as below.

Referring to FIGS. 24 and 25, the sub gear-shifting drive mechanism 33 may be connected to each of the sub gear-shifting input mechanism 31 and the sub gear-shifting connection mechanism 32. The sub gear-shifting drive mechanism 33 may perform the second gear shifting using one driving power selected from the driving power transmitted from the sub gear-shifting input mechanism 31 and the driving power transmitted from the sub gear-shifting connection mechanism 32. That is, the sub gear-shifting drive mechanism 33 may perform the second gear shifting using one driving power selected from the driving power transmitted through the first power transmission path and the driving power transmitted through the second power transmission path. The driving power transmitted through the first power transmission path is transmitted from the first main gear-shifting output mechanism 22 after passing through the ultra-low speed gear-shifting part 4. In this case, the driving power transmitted through the first power transmission path is a driving power in which the normal gear shifting or the ultra-low speed gear shifting is performed after the first gear shifting is performed. The driving power transmitted through the second power transmission path is directly transmitted from the first main gear-shifting drive mechanism 21 without passing through the ultra-low speed gear-shifting part 4. In this case, the driving power transmitted through the second power transmission path is a driving power in which only the first gear shifting is performed. The sub gear-shifting drive mechanism 33 may perform the second gear shifting using one driving power selected by gear-shifting operation of the operator.

Figure 26:
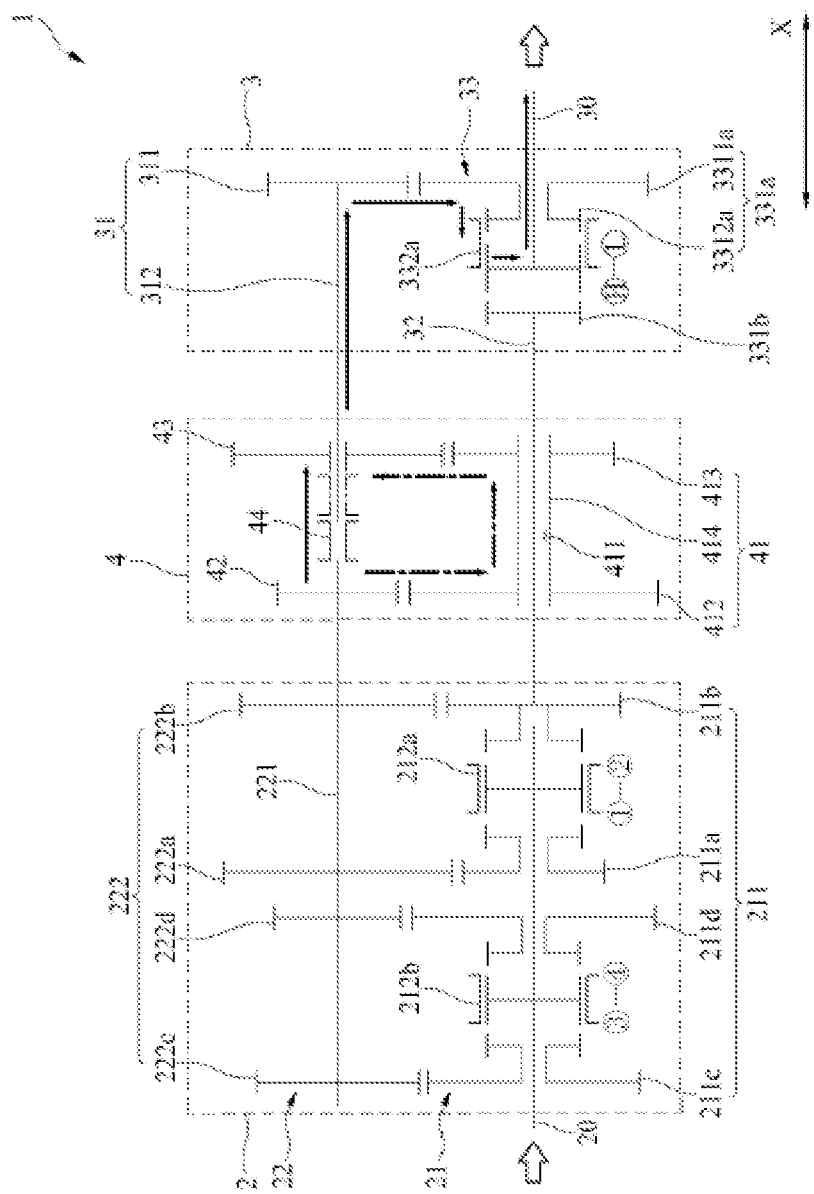
Figure 27:
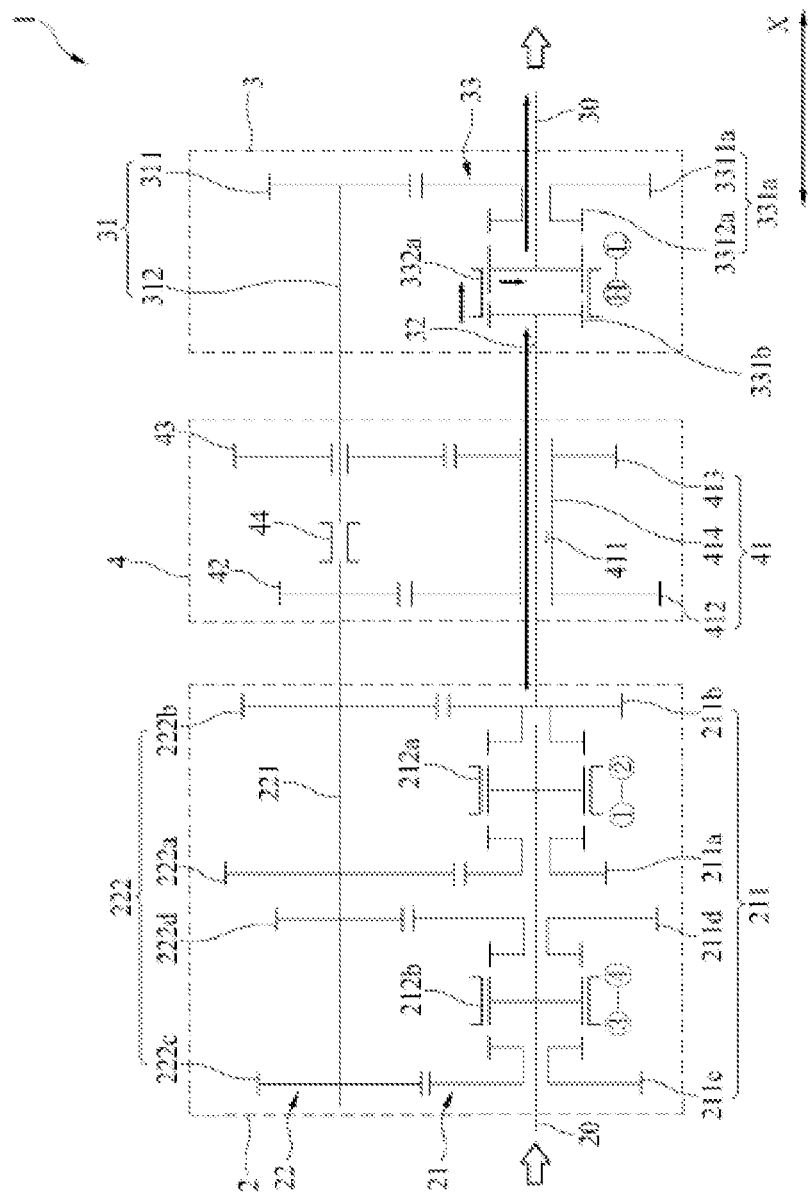
Figure 28:
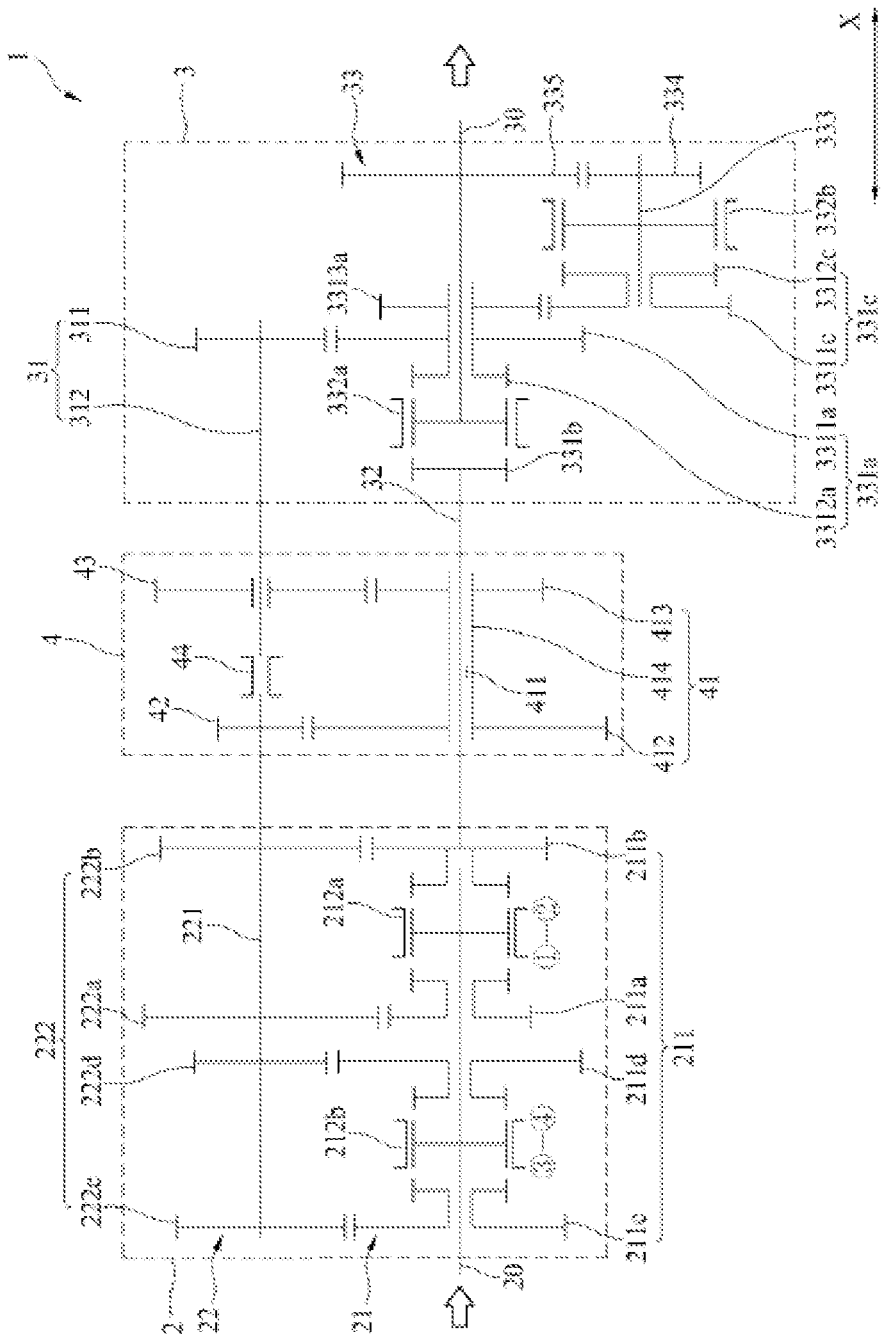
FIGS. 28 to 30 are schematic power transmission diagrams for describing a modified embodiment of a sub gear-shifting part in the transmission apparatus of an agricultural working automobile according to the second embodiment of the present invention.

Referring to FIGS. 25 to 27, when the sub gear-shifting part 3 performs the second gear shifting in two stages, the sub gear-shifting drive mechanism 33 may include the first sub gear-shifting drive gear 331a, the second sub gear-shifting drive gear 331b, and the first sub gear-shifting sleeve 332a.

The first sub gear-shifting drive gear 331a may be idly coupled to the sub gear-shifting output mechanism 30. A bearing (not shown) may be installed between the first sub gear-shifting drive gear 331a and the sub gear-shifting output mechanism 30. The first sub gear-shifting drive gear 331a may be rotated by the driving power provided from the sub gear-shifting input mechanism 31. In this case, the first sub gear-shifting drive gear 331a may include a first input gear 4311a for being connected to the sub gear-shifting input mechanism 31 and a first output gear 4312a for being connected to the first sub gear-shifting sleeve 332a. The first input gear 4311a may be engaged with the sub gear-shifting input gear 311. Accordingly, the first sub gear-shifting drive gear 331a may rotate as the sub gear-shifting input gear 311 rotates. That is, the first sub gear-shifting drive gear 331a may be rotated by the driving power transmitted through the first power transmission path. In this case, when the first output gear 4312a is connected to the first sub gear-shifting sleeve 332a, the first sub gear-shifting drive gear 331a is rotated by the driving power transmitted through the first power transmission path in order to rotate the first sub gear-shifting sleeve 332a and the sub gear-shifting output mechanism 30.

The second sub gear-shifting drive gear 331b may be disposed to be spaced apart from the first sub gear-shifting drive gear 331a in the first axis direction (the X axis direction). The first sub gear-shifting sleeve 332a may be disposed between the second sub gear-shifting drive gear 331b and the first sub gear-shifting drive gear 331a. The second sub gear-shifting drive gear 331b may be disposed between the first sub gear-shifting sleeve 332a and the ultra-low speed gear-shifting part 4. The second sub gear-shifting drive gear 331b may be rotated by the driving power provided from the sub gear-shifting connection mechanism 32. That is, the second sub gear-shifting drive gear 331b may be rotated by the driving power transmitted through the second power transmission path. One side of the sub gear-shifting connection mechanism 32 may be coupled to the second main gear-shifting drive gear 211b and the other side of the sub gear-shifting connection mechanism 32 may be coupled to the second sub gear-shifting drive gear 331b. Among the main gear-shifting drive gears 211 and the sub gear-shifting drive gears 331, the second main gear-shifting drive gear 211b and the second sub gear-shifting drive gear 331b are disposed to be spaced apart from each other by the shortest distance on the basis of the first axis direction (the X axis direction). One side of the sub gear-shifting connection mechanism 32 may be coupled to the second drive output gear 2112b of the second main gear-shifting drive gear 211b.

The second sub gear-shifting drive gear 331b may include a second output gear for being connected to the first sub gear-shifting sleeve 332a. In this case, when the second output gear is connected to the first sub gear-shifting sleeve 332a, the second sub gear-shifting drive gear 331b is rotated by the driving power transmitted through the second power transmission path in order to rotate the first sub gear-shifting sleeve 332a.

The first sub gear-shifting sleeve 332a may be coupled to the sub gear-shifting output mechanism 30 so as to be positioned between the first sub gear-shifting drive gear 331a and the second sub gear-shifting drive gear 331b. The first sub gear-shifting sleeve 332a may be coupled to the sub gear-shifting output mechanism 30 to be movable in the first axis direction (the X axis direction). Accordingly, the first sub gear-shifting sleeve 332a may be selectively connected to the first sub gear-shifting drive gear 331a or the second sub gear-shifting drive gear 331b to perform the second gear shifting. In this case, the first sub gear-shifting sleeve 332a may be selectively connected to the first sub gear-shifting drive gear 331a or the second sub gear-shifting drive gear 331b by the gear-shifting operation of the operator while moving along the first axis direction (the X axis direction).

As shown in FIG. 26, when the first sub gear-shifting sleeve 332a is connected to the first sub gear-shifting drive gear 331a, the first sub gear-shifting sleeve 332a may receive the driving power transmitted through the first power transmission path through the sub gear-shifting input mechanism 31. Accordingly, the sub gear-shifting drive mechanism 33 may perform the second gear shifting using the sub gear-shifting input mechanism 31, the first sub gear-shifting drive gear 331a, and the first sub gear-shifting sleeve 332a and output the driving power in which the second gear shifting is performed through the sub gear-shifting output mechanism 30. When the first sub gear-shifting sleeve 332a is connected to the first sub gear-shifting drive gear 331a, the first sub gear-shifting sleeve 332a may receive the driving power through the first power transmission path for all first gear-shifting stages performable by the main gear-shifting part 2 and all gear-shifting stages performable by the ultra-low speed gear-shifting part 4.

In this case, when normal gear shifting is selected in the ultra-low speed gear-shifting part 4, the driving power in which the first gear shifting is performed is sequentially transmitted through the ultra-low speed sleeve 44 and the sub gear-shifting input member 312 to perform the normal gear shifting and may be transmitted to the first sub gear-shifting sleeve 332a. In this case, the driving power may be transmitted along a solid-line arrow shown in the ultra-low speed gear-shifting part 4 of FIG. 26. When an ultra-low speed gear shifting is selected in the ultra-low speed gear-shifting part 4, the driving power in which the first gear shifting is performed is sequentially transmitted through the ultra-low speed input gear 42, the ultra-low speed gear-shifting mechanism 41, the ultra-low speed output gear 43, the ultra-low speed sleeve 44, and the sub gear-shifting input member 312 to perform the ultra-low speed gear shifting and may be transmitted to the first sub gear-shifting sleeve 332a. In this case, the driving power may be transmitted along dot dash-line arrows shown in the ultra-low speed gear-shifting part 4 of FIG. 26.

As shown in FIG. 27, when the first sub gear-shifting sleeve 332a is connected to the second sub gear-shifting drive gear 331b, the first sub gear-shifting sleeve 332a may receive the driving power transmitted through the second power transmission path through the sub gear-shifting connection mechanism 32. Accordingly, the sub gear-shifting drive mechanism 33 may perform the second gear shifting using the sub gear-shifting connection mechanism 32, the second sub gear-shifting drive gear 331b, and the first sub gear-shifting sleeve 332a and output the driving power in which the second gear shifting is performed to the sub gear-shifting output mechanism 30. When the first sub gear-shifting sleeve 332a is connected to the second sub gear-shifting drive gear 331b, the first sub gear-shifting sleeve 332a may receive the driving power in which the first gear shifting is performed through the second power transmission path for all first gear-shifting stages performable by the main gear-shifting part 2. In this case, the driving power in which the first gear shifting is performed may be directly transmitted to the sub gear-shifting part 3 without passing through the ultra-low speed gear-shifting part 4.

Figure 29:
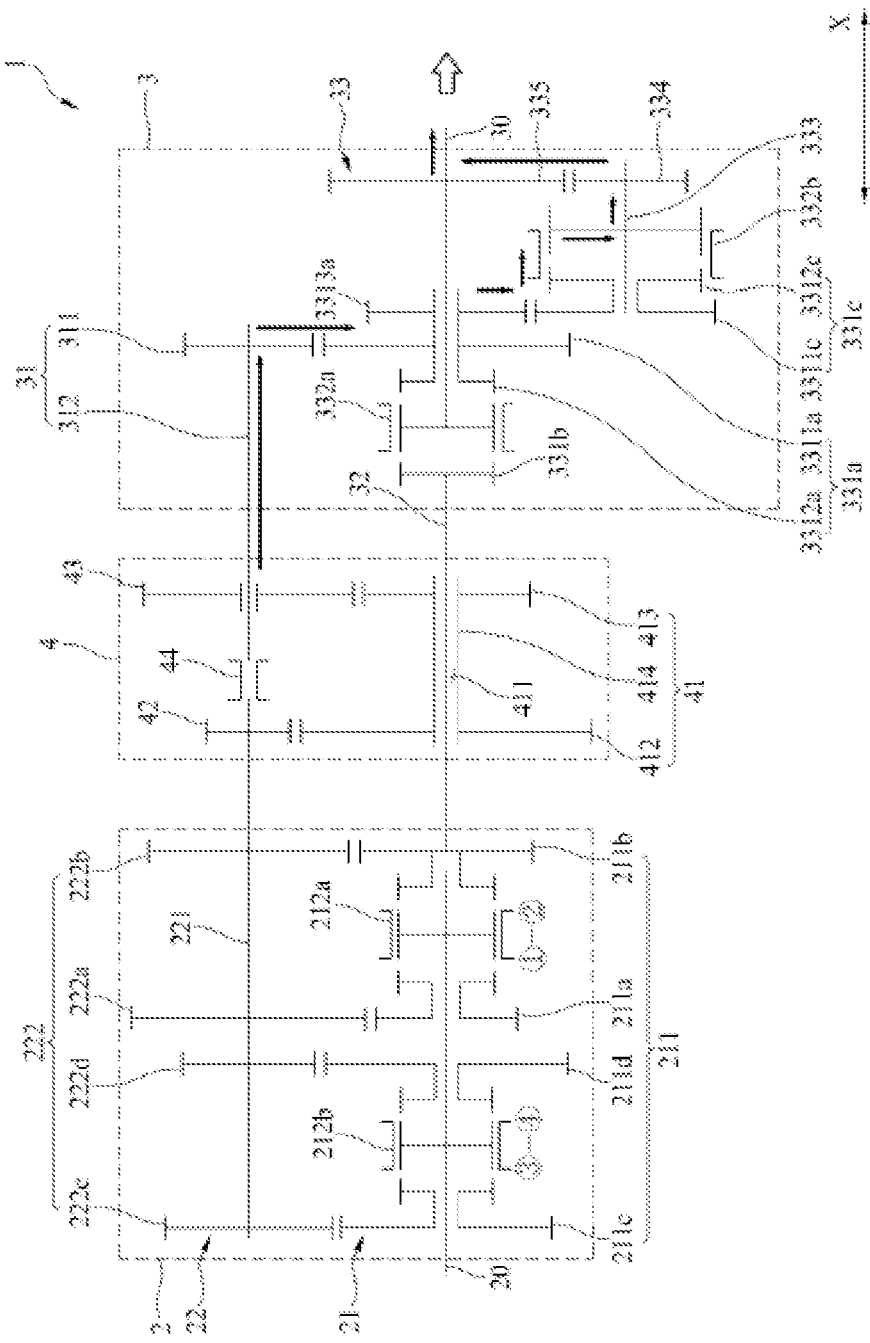
Figure 30:
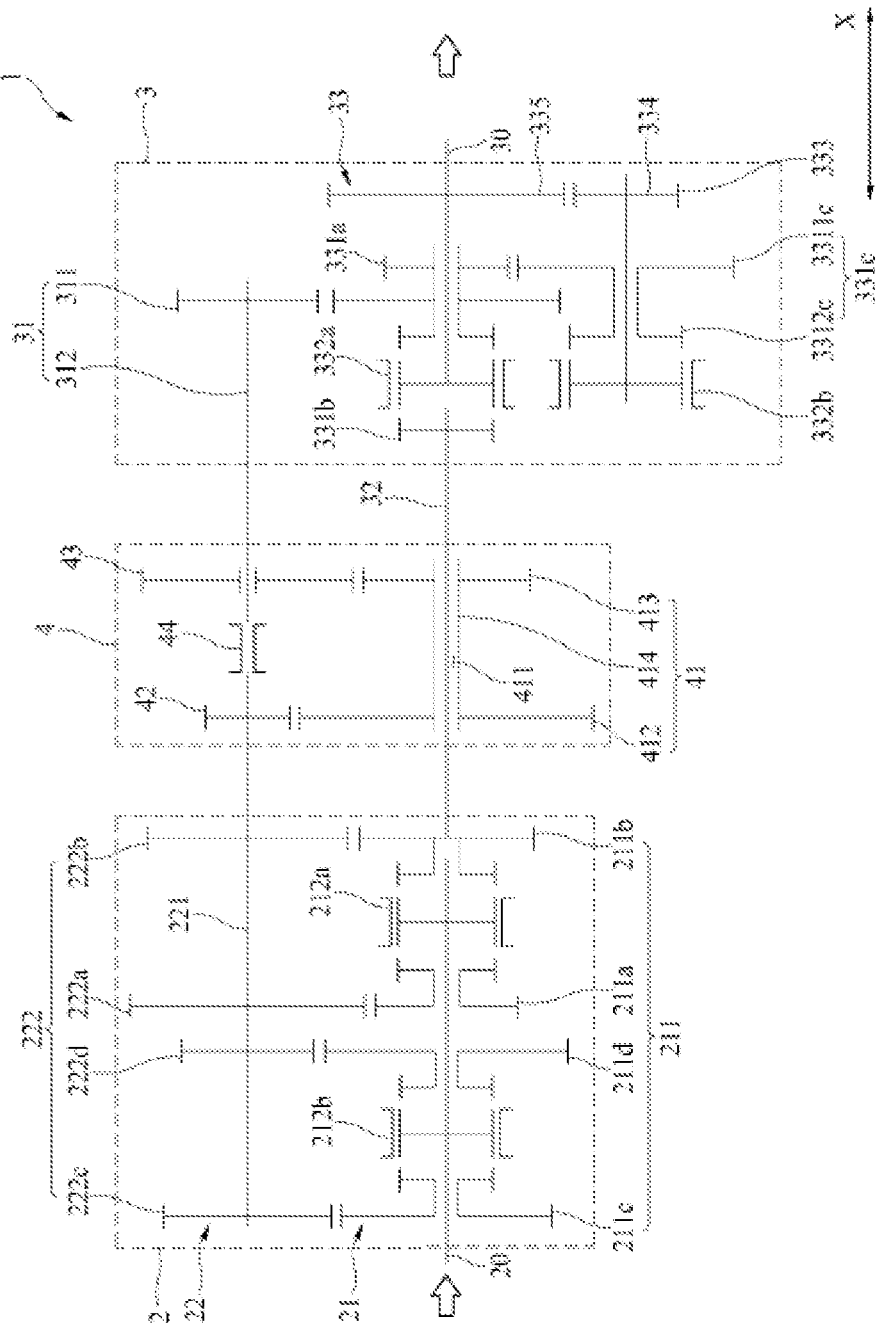

Referring to FIGS. 29 and 30, the transmission apparatus 1 of an agricultural working automobile according to the second embodiment of the present invention may be implemented to include the sub gear-shifting part 3 according to the above-described modified embodiment of the present invention. In this case, the sub gear-shifting part 3 may include the third sub gear-shifting drive gear 331c, the second sub gear-shifting sleeve 332b, the connection shaft 333, the first connection gear 334, and the second connection gear 335. This is substantially the same as that described in the sub gear-shifting part 3 according to the above-described modified embodiment of the present invention, and thus a detailed description thereof will be omitted.

Figure 31:
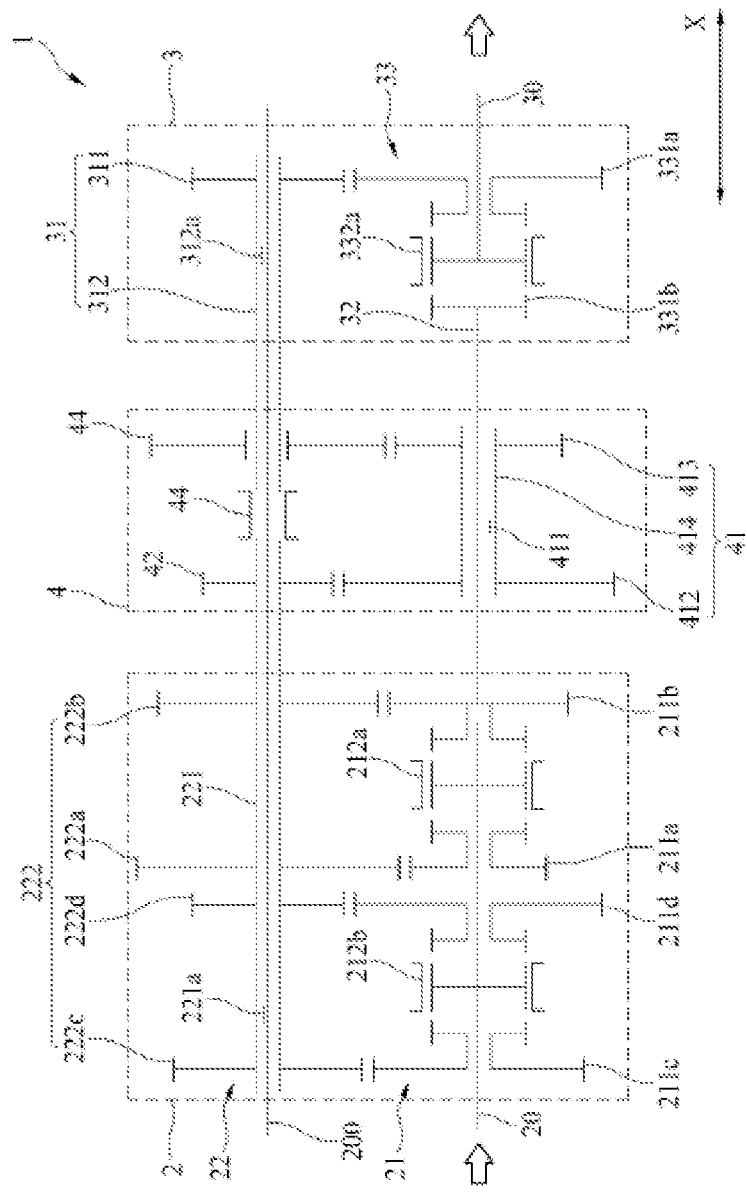
FIGS. 31 and 32 are schematic power transmission diagrams for describing a modified embodiment of a main gear-shifting output member and a sub gear-shifting input member in the transmission apparatus of an agricultural working automobile according to the second embodiment of the present invention.
Figure 32:
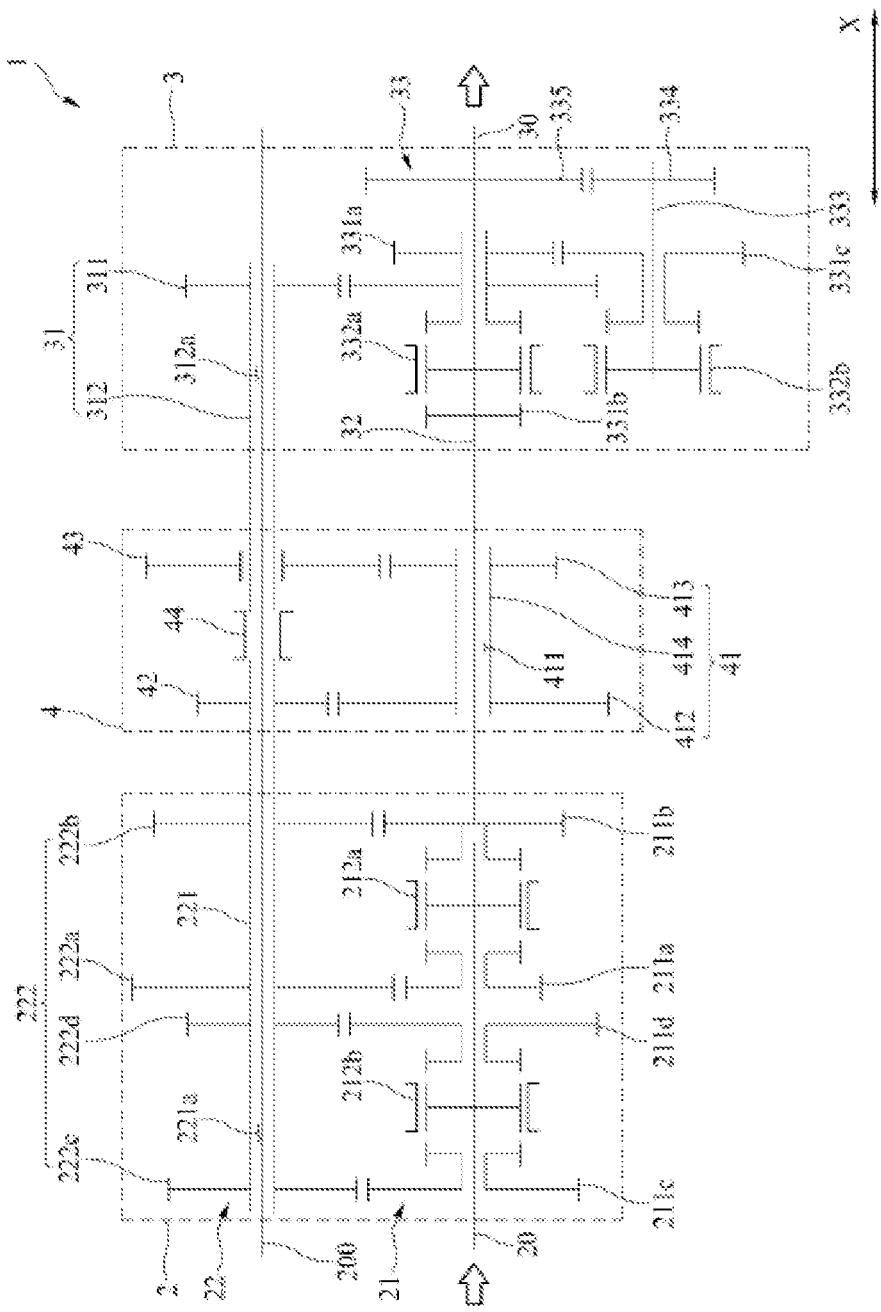

Referring to FIGS. 31 and 32, in the transmission apparatus 1 of an agricultural working automobile according to the second embodiment of the present invention, a main gear-shifting through hole 221a may be formed in the main gear-shifting output member 221. The main gear-shifting through hole 221a may be formed to pass through the main gear-shifting output member 221. A sub gear-shifting through hole 312a may be formed in the sub gear-shifting input member 312. The sub gear-shifting through hole 312a may be formed to pass through the sub gear-shifting input member 312.

Accordingly, the power transmission shaft 200 may be installed inside the main gear-shifting output member 221 and inside the sub gear-shifting input member 312. The power transmission shaft 200 is installed to traverse the inside of the main gear-shifting output member 221 and the inside of the sub gear-shifting input member 312 through the main gear-shifting through hole 221a and the sub gear-shifting through hole 312a to transmit a predetermined drive. Accordingly, the transmission apparatus 1 of a working automobile according to the second embodiment of the present invention may contribute to further improving utilization of a space for installing and disposing various devices on the agricultural working automobile.

Figure 33:
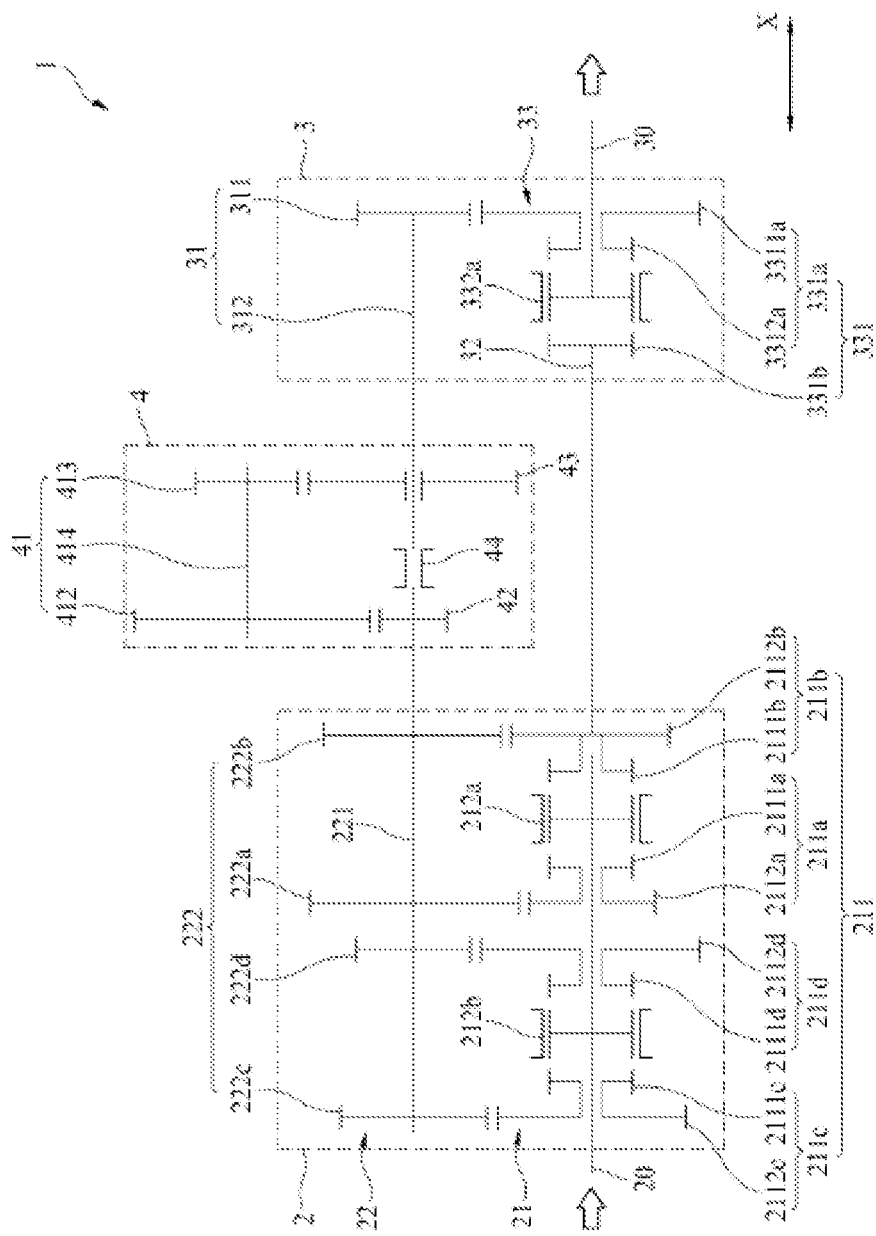
FIG. 33 is a schematic power transmission diagram for describing a modified embodiment of an ultra-low speed gear-shifting part in the transmission apparatus of an agricultural working automobile according to the second embodiment of the present invention.

Referring to FIG. 33, in the transmission apparatus 1 of an agricultural working automobile according to the second embodiment of the present invention, an ultra-low speed gear-shifting part 4 according a modified embodiment of the present invention may be implemented as described below.

The ultra-low speed gear-shifting mechanism 41 may be disposed to be positioned at a position spaced apart from each of the main gear-shifting output member 221 and the sub gear-shifting connection mechanism 32. Accordingly, the ultra-low speed gear-shifting mechanism 41 may be disposed at a position spaced apart from a space between the main gear-shifting drive mechanism 21 and the sub gear-shifting drive mechanism 33 so as to avoid the sub gear-shifting connection mechanism 32. Accordingly, the sub gear-shifting connection mechanism 32 may connect the main gear-shifting drive mechanism 21 to the sub gear-shifting drive mechanism 33 without being interfered with by the ultra-low speed gear-shifting mechanism 41 even without the connection hole 411. Thus, the transmission apparatus 1 of an agricultural working automobile according to the second embodiment of the present invention may simply implement a configuration for connecting the main gear-shifting drive mechanism 21 to the sub gear-shifting drive mechanism 33 in a direct connection manner.

The ultra-low speed gear-shifting mechanism 41 may be disposed so that the coupling member 414 is positioned at a position spaced apart from each of the main gear-shifting output member 221 and the sub gear-shifting connection mechanism 32. For example, the main gear-shifting output member 221 may be disposed to be positioned between the coupling member 414 and the sub gear-shifting connection mechanism 32. The coupling member 414, the main gear-shifting output member 221, and the sub gear-shifting connection mechanism 32 may be disposed parallel to each other. In this case, the sub gear-shifting input member 312 may be disposed to be positioned between the coupling member 414 and the sub gear-shifting connection mechanism 32. The coupling member 414, the main gear-shifting output member 221, the sub gear-shifting connection mechanism 32, and the sub gear-shifting input member 312 may be disposed parallel to each other. In this case, the main gear-shifting output member 221 and the sub gear-shifting input member 312 may be disposed to be positioned on the same line.

The ultra-low speed gear-shifting mechanism 41 may be implemented so that the ultra-low speed input gear 42 is disposed between the first gear-shifting gear 412 and the sub gear-shifting connection mechanism 32. The ultra-low speed gear-shifting mechanism 41 may be implemented so that the ultra-low speed output gear 43 is disposed between the second gear-shifting gear 413 and the sub gear-shifting connection mechanism 32.

Figure 34:
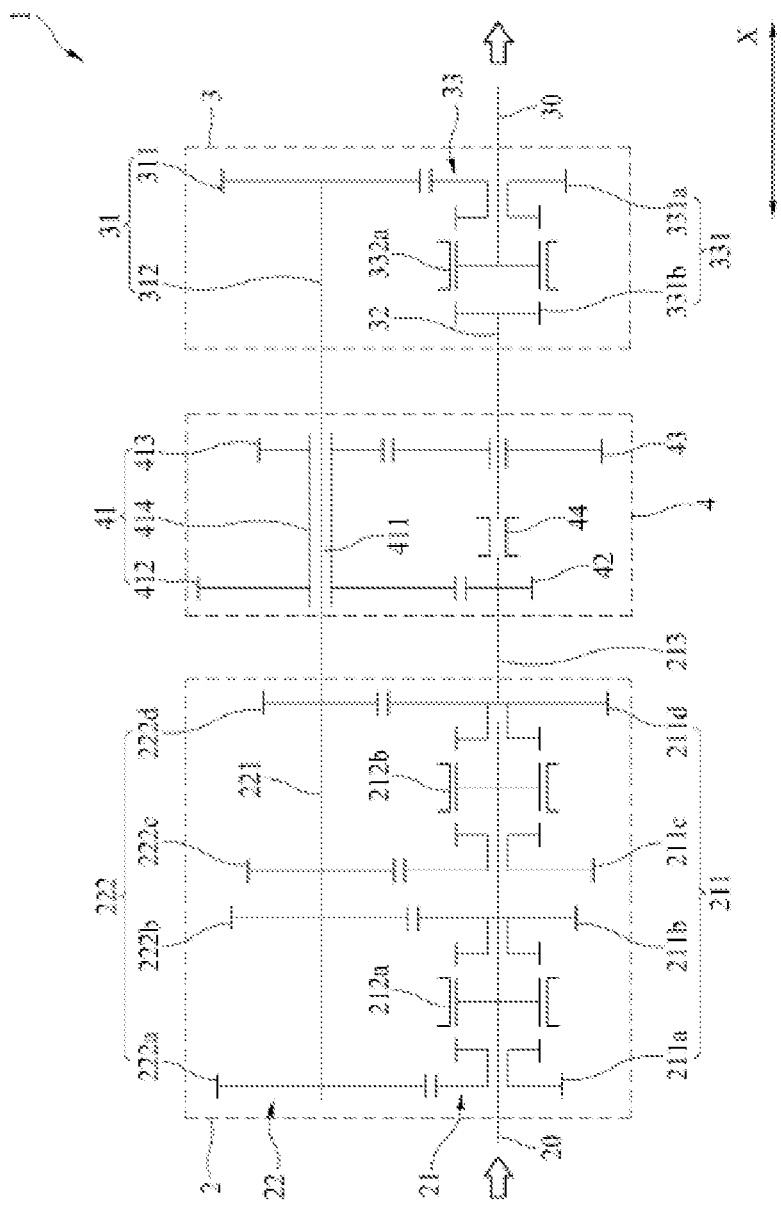
FIG. 34 is a schematic power transmission diagram for describing another modified embodiment of the ultra-low speed gear-shifting part in the transmission apparatus of an agricultural working automobile according to the second embodiment of the present invention.

Referring to FIG. 34, an ultra-low speed gear-shifting part 4 according to another modified embodiment of the present invention may be implemented as described below.

The ultra-low speed gear-shifting part 4 may be connected to each of the main gear-shifting drive mechanism 21 and the sub gear-shifting connection mechanism 32. The ultra-low speed input gear 42, the ultra-low speed output gear 43, and the ultra-low speed sleeve 44 may be disposed between the main gear-shifting drive mechanism 21 and the sub gear-shifting drive mechanism 33 on the basis of the first axis direction (the X axis direction). The ultra-low speed gear-shifting mechanism 41 may be disposed between the main gear-shifting output mechanism 22 and the sub gear-shifting input mechanism 31 on the basis of the first axis direction (the X axis direction).

The sub gear-shifting connection mechanism 32 may be connected to the ultra-low speed gear-shifting part 4 to implement the first power transmission path. In this case, the main gear-shifting drive mechanism 21 may include a main gear-shifting drive member 213. The ultra-low speed input gear 42 may be connected to the main gear-shifting drive mechanism 21 by being coupled to the main gear-shifting drive member 213. The main gear-shifting drive member 213 may function as a rotation shaft of the ultra-low speed input gear 42. For example, the main gear-shifting drive member 213 may be a shaft. The ultra-low speed output gear 43 may be idly coupled to the sub gear-shifting connection mechanism 32. The ultra-low speed sleeve 44 may selectively connect the sub gear-shifting connection mechanism 32 to the main gear-shifting drive member 213 or the ultra-low speed output gear 43.

The sub gear-shifting input mechanism 31 may be directly connected to the main gear-shifting output mechanism 22 to implement the second power transmission path. When the ultra-low speed gear-shifting mechanism 41 is disposed between the main gear-shifting output mechanism 22 and the sub gear-shifting input mechanism 31 on the basis of the first axis direction (the X axis direction), the sub gear-shifting input member 312 is positioned in the ultra-low speed gear-shifting mechanism 41 through the connection hole 411 formed in the ultra-low speed gear-shifting mechanism 41 to directly connect the main gear-shifting output member 221 to the sub gear-shifting input gear 311. Although not shown in the drawings, the ultra-low speed gear-shifting mechanism 41 may also be disposed to be positioned at a position spaced apart from each of the sub gear-shifting input member 312 and the sub gear-shifting connection mechanism 32. In this case, the ultra-low speed gear-shifting mechanism 31 may be disposed at a positon spaced apart from a space between the main gear-shifting output mechanism 22 and the sub gear-shifting input mechanism 31 so as to avoid the sub gear-shifting input member 312. Accordingly, the sub gear-shifting input member 312 may connect the main gear-shifting output mechanism 22 to the sub gear-shifting input gear 311 without being interfered with by the ultra-low speed gear-shifting mechanism 41 even without the connection hole 411.

When an ultra-low speed gear-shifting part 3 according to another modified embodiment of the present invention is applied, the main gear-shifting part 2 may be implemented so that the fourth main gear-shifting drive gear 211d is connected to the ultra-low speed gear-shifting part 4, and the fourth main gear-shifting output gear 222d is directly connected to the sub gear-shifting input mechanism 31 through the main gear-shifting output member 221. In this case, the main gear-shifting part 2 may correspond to an embodiment in which the fourth main gear-shifting drive gear 211d is implemented as a fourth speed stage, the third main gear-shifting drive gear 211c is implemented as a third speed stage, the second main gear-shifting drive gear 211b is implemented as a second speed stage, and the first main gear-shifting drive gear 211a is implemented as a first speed stage, in order from the highest speed to the lowest speed.

Figure 35:
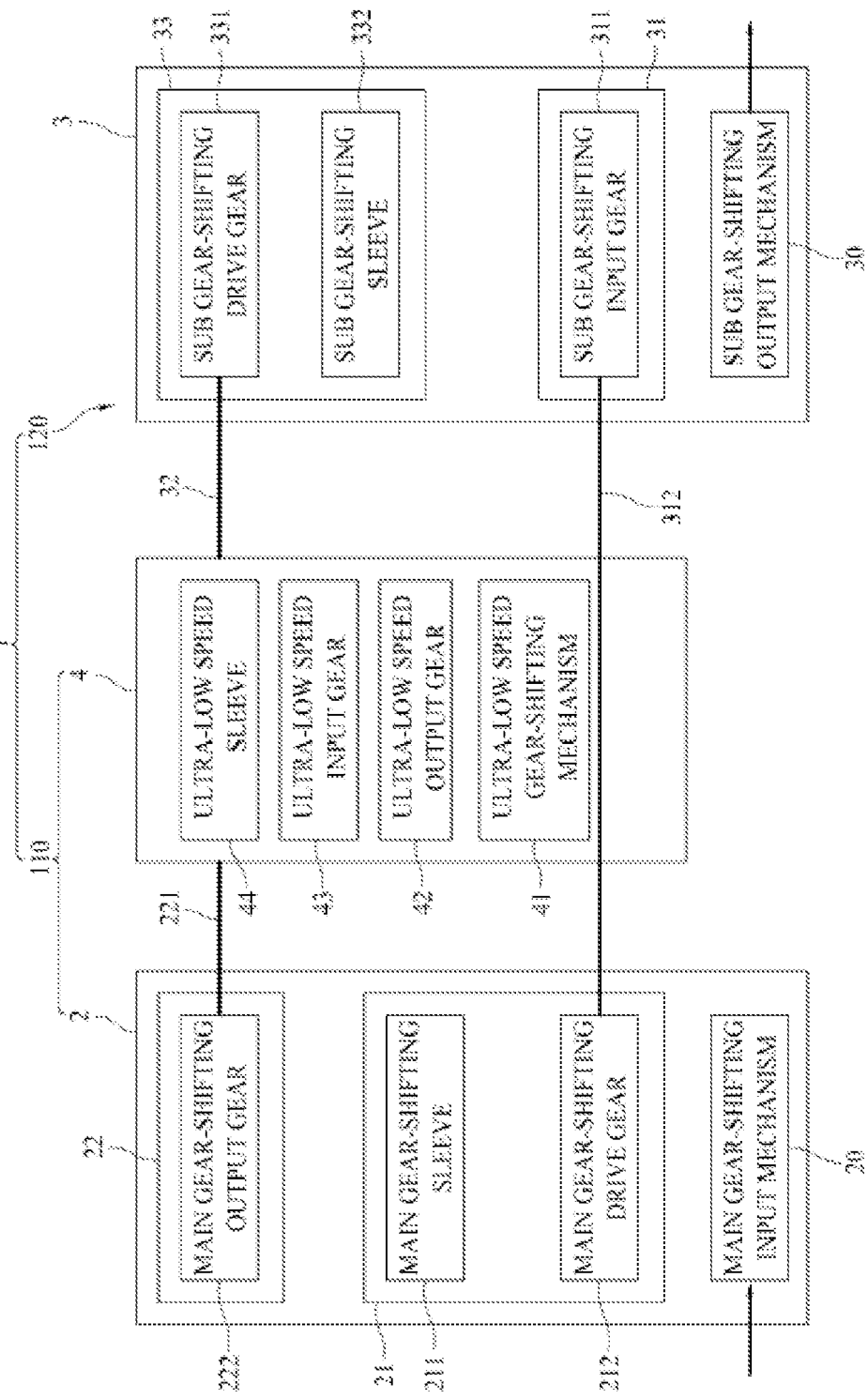
FIG. 35 is a schematic block diagram of a transmission apparatus of an agricultural working automobile according to a modified second embodiment of the present invention.
Figure 36:
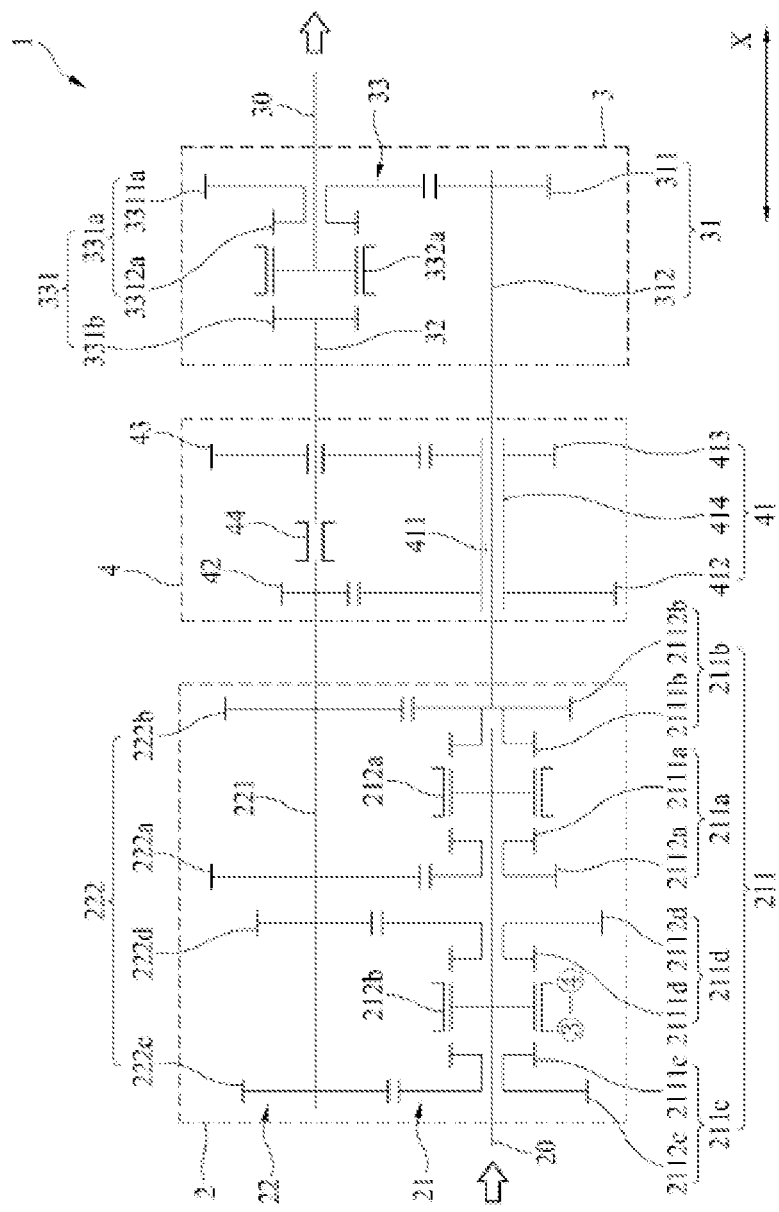
FIGS. 36 to 40 are schematic power transmission diagrams of the transmission apparatus of an agricultural working automobile according to the modified second embodiment of the present invention.

Referring to FIGS. 35 and 36, a transmission apparatus 1 of an agricultural working automobile according to a modified second embodiment of the present invention may include the first gear-shifting part 110 and the second gear-shifting part 120. Since the first gear-shifting part 110 and the second gear-shifting part 120 are substantially the same as those described in the transmission apparatus 1 of an agricultural working automobile according to the second embodiment of the present invention, the following description will focus on parts with differences.

The sub gear-shifting connection mechanism 32 may be connected to the ultra-low speed gear-shifting part 4. Accordingly, the sub gear-shifting connection mechanism 32 may implement the first power transmission path which receives the driving power after passing through the ultra-low speed gear-shifting part 4. One side of the sub gear-shifting connection mechanism 32 may be connected to the ultra-low speed gear-shifting part 3 and the other side of the sub gear-shifting connection mechanism 32 may be connected to the sub gear-shifting drive mechanism 33. Accordingly, when the driving power transmitted through the first power transmission path is selected by the gear-shifting operation, the sub gear-shifting drive mechanism 33 may perform the second gear shifting using the driving power transmitted from the main gear-shifting output mechanism 22 after passing through the ultra-low speed gear-shifting part 4 through the sub gear-shifting connection mechanism 32. In this case, the ultra-low speed sleeve 44 may selectively connect the sub gear-shifting connection mechanism 32 to the main gear-shifting output mechanism 22 or the ultra-low speed output gear 43. One side of the sub gear-shifting drive mechanism 33 may be connected to the ultra-low speed sleeve 44. The other side of the sub gear-shifting drive mechanism 33 may be connected to the second sub gear-shifting drive gear 331b.

The sub gear-shifting input mechanism 31 may be directly connected to the main gear-shifting drive mechanism 21. Accordingly, the sub gear-shifting input mechanism 31 may implement the second power transmission path which receives the driving power without passing through the ultra-low speed gear-shifting part 4. The sub gear-shifting input mechanism 31 may be connected to each of the main gear-shifting drive mechanism 21 and the sub gear-shifting drive mechanism 33. Accordingly, when the driving power transmitted through the second power transmission path is selected by the gear-shifting operation, the sub gear-shifting drive mechanism 33 may perform the second gear shifting using the driving power directly transmitted from the main gear-shifting drive mechanism 21 through the sub gear-shifting input mechanism 31. When the sub gear-shifting input mechanism 31 includes the sub gear-shifting input member 312 and the sub gear-shifting input gear 311, one side of the sub gear-shifting input member 312 may be connected to the main gear-shifting drive mechanism 21. The one side of the sub gear-shifting input member 312 may be connected to the second main gear-shifting drive gear 211b. The other side of the sub gear-shifting input member 312 may be connected to the sub gear-shifting input gear 311. The sub gear-shifting input gear 311 may be connected to the first sub gear-shifting drive gear 331a.

The sub gear-shifting input member 312 is positioned in the ultra-low speed gear-shifting mechanism 41 through the connection hole 411 formed in the ultra-low speed gear-shifting mechanism 41 to connect the main gear-shifting drive mechanism 21 to the sub gear-shifting input gear 311. In this case, the ultra-low speed gear-shifting mechanism 41 may be disposed to be positioned between the main gear-shifting part 2 and the sub gear-shifting part 3 on the basis of the first axis direction (the X axis direction). The sub gear-shifting input member 312 traverses the ultra-low speed gear-shifting mechanism 41 through the connection hole 411 to be coupled to each of the main gear-shifting drive mechanism 21 and the sub gear-shifting drive mechanism 33.

Figure 37:
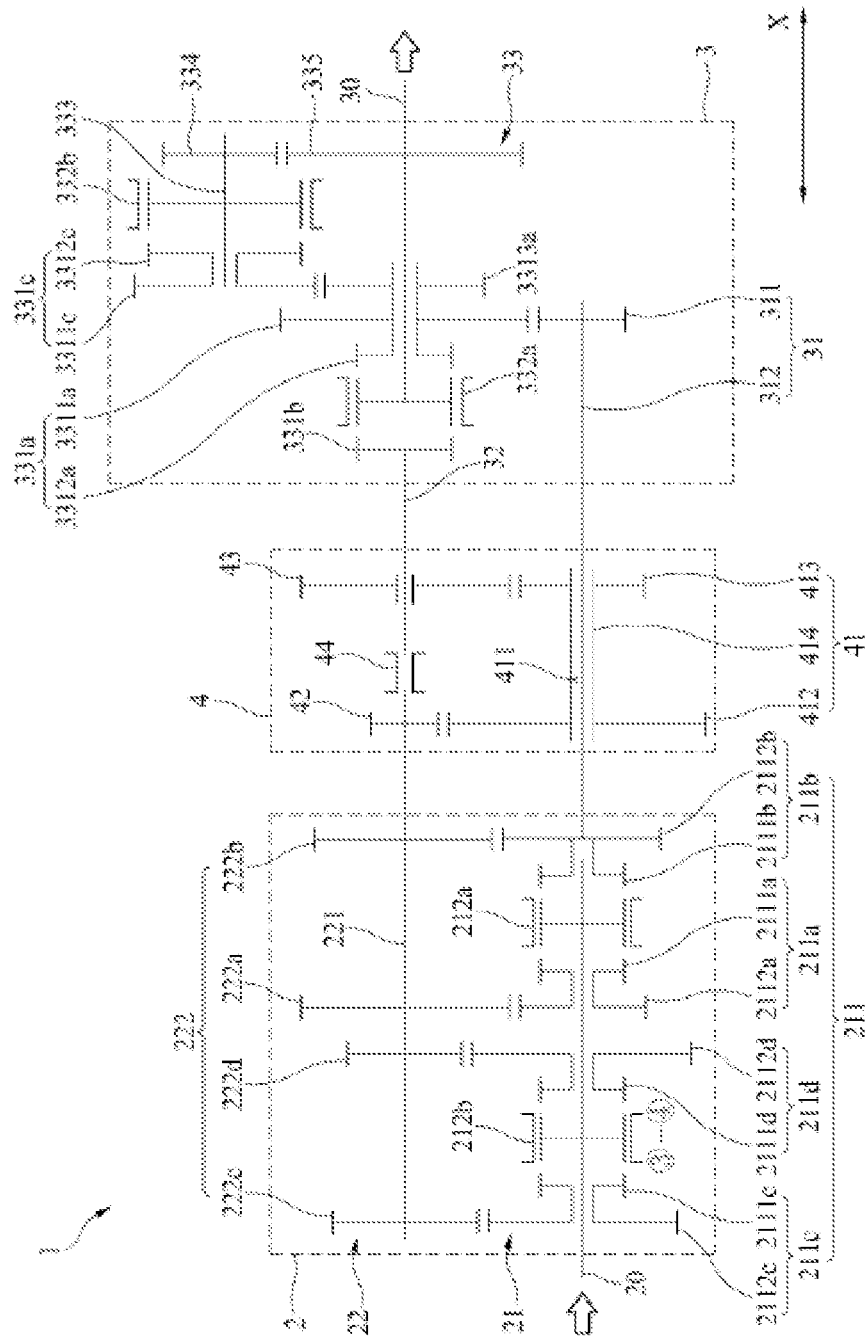
Figure 38:
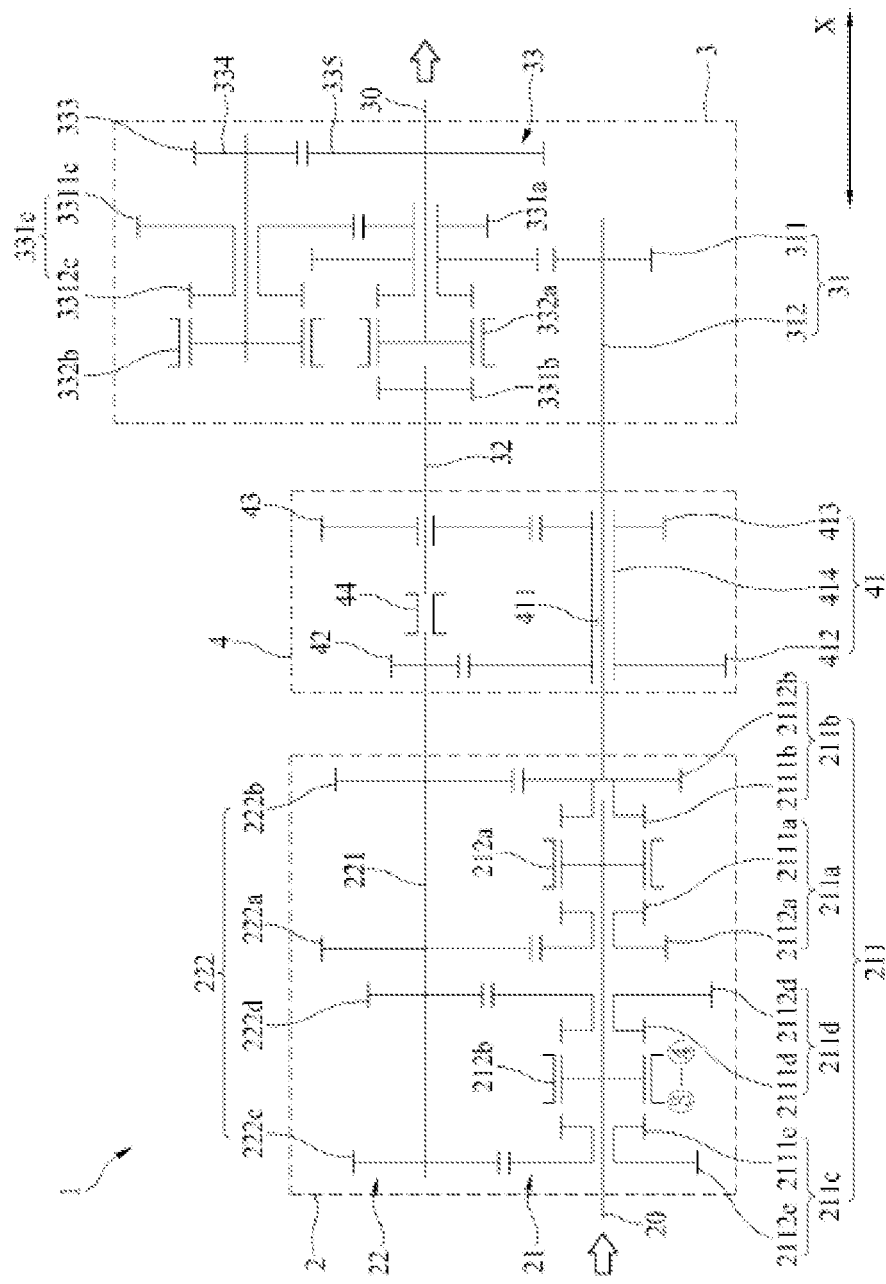

Referring to FIGS. 37 and 38, a transmission apparatus 1 of an agricultural working automobile according to a modified second embodiment of the present invention may be implemented to include the sub gear-shifting part 3 according to the above-described modified embodiment of the present invention. In this case, the sub gear-shifting part 3 may include the third sub gear-shifting drive gear 331c, the second sub gear-shifting sleeve 332b, the connection shaft 433, the first connection gear 434, and the second connection gear 435. This is substantially the same as that described in the sub gear-shifting part 3 according to the above-described modified embodiment of the present invention, and thus a detailed description thereof will be omitted.

Figure 39:
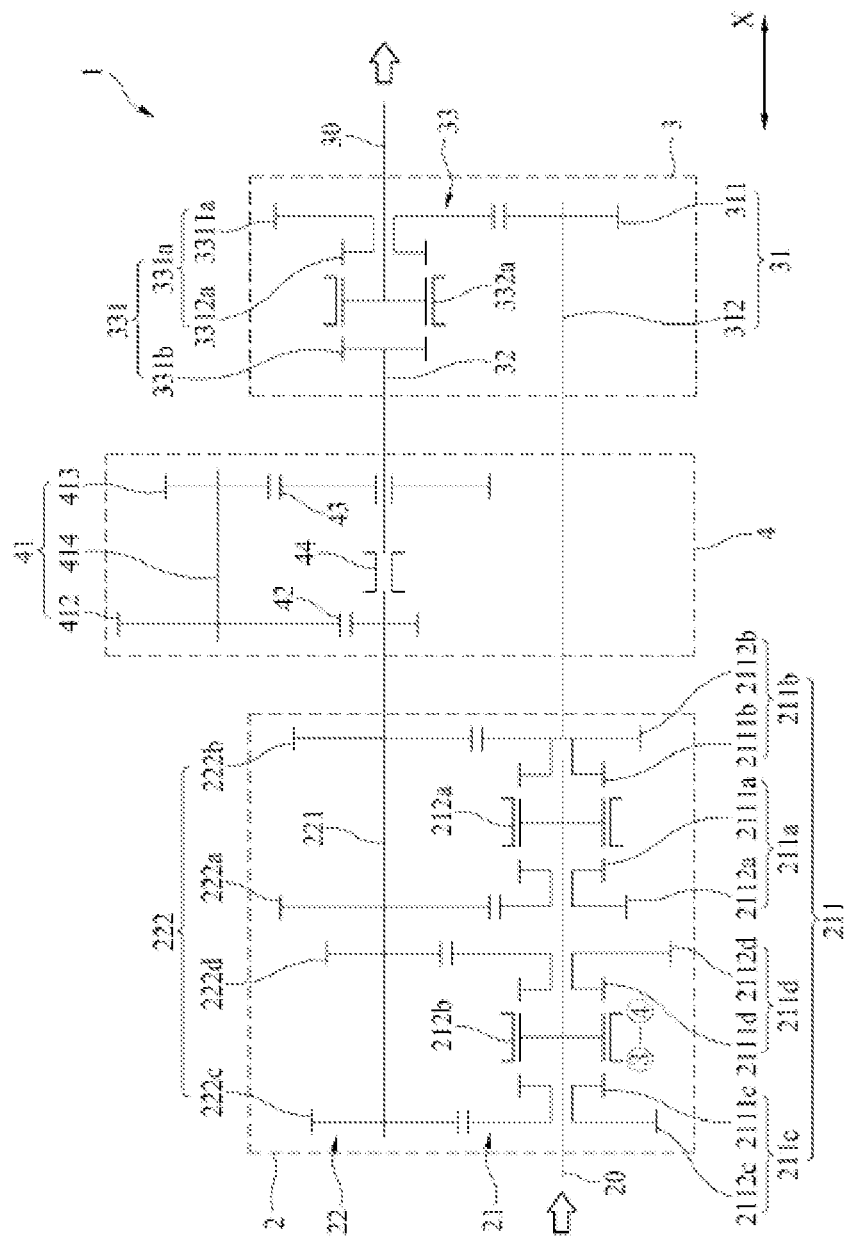

Referring to FIG. 39, the transmission apparatus 1 of an agricultural working automobile according to the modified second embodiment of the present invention may be implemented to include the ultra-low speed gear-shifting part 4 according to the above-described modified embodiment of the present invention.

The ultra-low speed gear-shifting mechanism 41 may be disposed to be positioned at a position spaced apart from each of the main gear-shifting output member 221 and the sub gear-shifting input member 312. Accordingly, the ultra-low speed gear-shifting mechanism 41 may be disposed at a position spaced apart from a space between the main gear-shifting drive mechanism 21 and the sub gear-shifting drive mechanism 33 to avoid the sub gear-shifting input member 312. Accordingly, the sub gear-shifting input member 312 may connect the main gear-shifting drive mechanism 21 to the sub gear-shifting input gear 311 without being interfered with by the ultra-low speed gear-shifting mechanism 41 even without the connection hole 411. Thus, the transmission apparatus 1 of an agricultural working automobile according to the modified second embodiment of the present invention may simply implement a configuration for connecting the main gear-shifting drive mechanism 21 to the sub gear-shifting input gear 311 in a direct connection manner.

The ultra-low speed gear-shifting mechanism 41 may be disposed so that the coupling member 414 is positioned at a position spaced apart from each of the main gear-shifting output member 221 and the sub gear-shifting input member 312. For example, the main gear-shifting output member 221 may be disposed to be positioned between the coupling member 414 and the sub gear-shifting input member 312. The coupling member 414, the main gear-shifting output member 221, and the sub gear-shifting input member 312 may be disposed parallel to each other. In this case, the sub gear-shifting connection mechanism 32 may be disposed to be positioned between the coupling member 414 and the sub gear-shifting input member 312. The coupling member 414, the main gear-shifting output member 221, the sub gear-shifting input member 312, and the sub gear-shifting connection mechanism 32 may be disposed parallel to each other. In this case, the main gear-shifting output member 221 and the sub gear-shifting connection mechanism 32 may be disposed to be positioned on the same line.

The ultra-low speed gear-shifting mechanism 41 may be implemented so that the ultra-low speed input gear 42 is disposed between the first gear-shifting gear 412 and the sub gear-shifting input member 312. The ultra-low speed gear-shifting mechanism 41 may be implemented so that the ultra-low speed output gear 43 is disposed between the second gear-shifting gear 413 and the sub gear-shifting input member 312.

Figure 40:
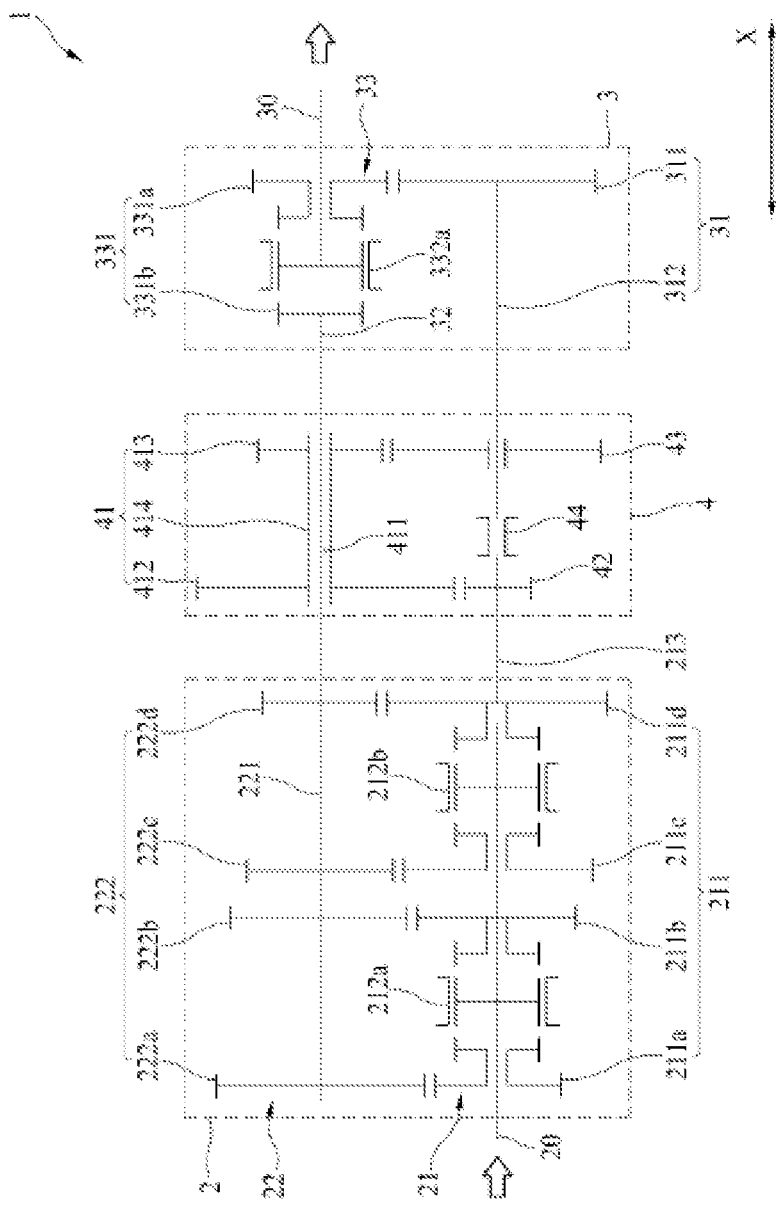

Referring to FIG. 40, the transmission apparatus 1 of an agricultural working automobile according to the modified second embodiment of the present invention may be implemented to include the ultra-low speed gear-shifting part 4 according to the above-described another modified embodiment of the present invention.

The ultra-low speed gear-shifting part 4 may be connected to each of the main gear-shifting drive mechanism 21 and the sub gear-shifting input mechanism 31. The ultra-low speed input gear 42, the ultra-low speed output gear 43, and the ultra-low speed sleeve 44 may be disposed between the main gear-shifting drive mechanism 21 and the sub gear-shifting input mechanism 31 on the basis of the first axis direction (the X axis direction). The ultra-low speed gear-shifting mechanism 41 may be disposed between the main gear-shifting output mechanism 22 and the sub gear-shifting drive mechanism 33 on the basis of the first axis direction (the X axis direction).

The sub gear-shifting input mechanism 31 may be connected to the ultra-low speed gear-shifting part 4 to implement the first power transmission path. In this case, the ultra-low speed input gear 42 may be connected to the main gear-shifting drive mechanism 21 by being coupled to the main gear-shifting drive member 213. The ultra-low speed output gear 43 may be idly coupled to sub gear-shifting input member 312. The ultra-low speed sleeve 44 may selectively connect the sub gear-shifting input member 312 to the main gear-shifting drive member 213 or the ultra-low speed output gear 43.

The sub gear-shifting connection mechanism 32 may be directly connected to the main gear-shifting output mechanism 22 to implement the second power transmission path. When the ultra-low speed gear-shifting mechanism 41 is disposed between the main gear-shifting output mechanism 22 and the sub gear-shifting drive mechanism 33 on the basis of the first axis direction (the X axis direction), the sub gear-shifting connection mechanism 32 is positioned in the ultra-low speed gear-shifting mechanism 41 through the connection hole 411 formed in the ultra-low speed gear-shifting mechanism 41 to directly connect the main gear-shifting output member 221 to the sub gear-shifting drive mechanism 33. Although not shown in the drawings, the ultra-low speed gear-shifting mechanism 41 may also be disposed to be positioned at a position spaced apart from each of the sub gear-shifting input member 312 and the sub gear-shifting connection mechanism 32. In this case, the ultra-low speed gear-shifting mechanism 41 may be disposed at a position spaced apart from a space between the main gear-shifting output mechanism 22 and the sub gear-shifting drive mechanism 33 so as to avoid the sub gear-shifting connection mechanism 32. Accordingly, the sub gear-shifting connection mechanism 32 may connect the main gear-shifting output mechanism 22 to the sub gear-shifting drive mechanism 33 without being interfered with by the ultra-low speed gear-shifting mechanism 41 even without the connection hole 411.

When the ultra-low speed gear-shifting part 4 according to another modified embodiment of the present invention is applied, the main gear-shifting part 2 may be implemented so that the fourth main gear-shifting drive gear 211d is connected to the ultra-low speed gear-shifting part 4, and the fourth main gear-shifting output gear 222d is directly connected to the sub gear-shifting connection mechanism 32 through the main gear-shifting output member 221. In this case, the main gear-shifting part 2 may correspond to an embodiment in which the fourth main gear-shifting drive gear 211d is implemented as a fourth speed stage, the third main gear-shifting drive gear 211c is implemented as a third speed stage, the second main gear-shifting drive gear 211b is implemented as a second speed stage, and the first main gear-shifting drive gear 211a is implemented as a first speed stage, in order from the highest speed to the lowest speed.

While the embodiments of the present invention and their advantages have been described in detail with reference to the accompanying drawings, it will be apparent to those skilled in the art to which the present invention belongs that various changes, substitutions and alterations may be made herein without departing from the scope of the present invention.

The invention claimed is:

1. A transmission apparatus of an agricultural working automobile, comprising:
    a first gear-shifting part which performs gear shifting to adjust a speed of an agricultural working automobile; and
    a second gear-shifting part which performs gear shifting to adjust the speed of the agricultural working automobile,
    wherein the first gear-shifting part includes a main gear-shifting part which performs first gear shifting to adjust the speed of the agricultural working automobile,
    wherein the second gear-shifting part includes a sub gear-shifting part which performs second gear shifting on a driving power transmitted from the first gear-shifting part,
    wherein the main gear-shifting part includes a main gear-shifting drive mechanism which performs the first gear shifting and a main gear-shifting output mechanism connected to the sub gear-shifting part,
    wherein sub gear-shifting part includes a sub gear-shifting input mechanism connected to the main gear-shifting output mechanism, a sub gear-shifting connection mechanism connected to the main gear-shifting part, and a sub gear-shifting drive mechanism which performs the second gear shifting,
    wherein the main gear-shifting output mechanism includes a plurality of main gear-shifting output gears connected to the main gear-shifting drive mechanism, and a main gear-shifting output member coupled to the main gear-shifting output gears,
    wherein one side of the main gear-shifting output member is coupled to the main gear-shifting output gears and the other side of the main gear-shifting output member is coupled to the sub gear-shifting input mechanism to implement the first power transmission path,
    wherein one side of the sub gear-shifting connection mechanism is coupled to the main gear-shifting drive mechanism and the other side of the sub gear-shifting connection mechanism is coupled to the sub gear-shifting drive mechanism to implement the second power transmission path,
    wherein the sub gear-shifting drive mechanism performs the second gear shifting using one driving power selected from a driving power transmitted through the first power transmission path and a driving power transmitted through the second power transmission path,
    wherein the main gear-shifting drive mechanism includes a main gear-shifting input mechanism and a plurality of main gear-shifting drive gears,
    wherein the main gear-shifting input mechanism is rotated by a driving power provided from an engine of the agricultural working automobile,
    wherein the main gear-shifting drive gears are idly coupled to the main gear-shifting input mechanism,
    wherein the sub gear-shifting drive mechanism includes a plurality of sub gear-shifting drive gears, and
    wherein one side of the sub gear-shifting connection mechanism is coupled to one main gear-shifting drive gear of the main gear-shifting drive gears, and the other side of the sub gear-shifting connection mechanism is coupled to one sub gear-shifting drive gear of the sub gear-shifting drive gears.

2. The transmission apparatus of claim 1, wherein the main gear-shifting drive mechanism performs the first gear shifting on the driving power provided from the engine,
    the main gear-shifting output mechanism is connected to the main gear-shifting drive mechanism so as to be driven as the main gear-shifting drive mechanism is driven, and
    the sub gear-shifting drive mechanism is connected to the sub gear-shifting input mechanism.

3. The transmission apparatus of claim 2, wherein
the sub gear-shifting part includes a sub gear-shifting output mechanism configured to output a driving power in which the second gear shifting is performed, and
the sub gear-shifting output mechanism, the main gear-shifting input mechanism, and the sub gear-shifting connection mechanism are positioned on the same line.

4. The transmission apparatus of claim 1, wherein the sub gear-shifting connection mechanism is coupled to each of the one sub gear-shifting drive gear and the one main gear-shifting drive gear, which are spaced apart from each other by the shortest distance, among the sub gear-shifting drive gears and the main gear-shifting drive gears.

5. The transmission apparatus of claim 1, wherein the sub gear-shifting input mechanism includes a sub gear-shifting input gear connected to the main gear-shifting output member,
the number of the sub gear-shifting input gear is fewer than the number of the sub gear-shifting drive gears.

6. The transmission apparatus of claim 1, wherein the sub gear-shifting connection mechanism connects the one main gear-shifting drive gear to the one sub gear-shifting drive gear in a direct connection manner.

7. The transmission apparatus of claim 1, wherein the sub gear-shifting connection mechanism connects the one main gear-shifting drive gear, which corresponds to the gear-shifting stage having the highest frequency of use in the main gear-shifting part, to the one sub gear-shifting drive gear, which corresponds to the gear-shifting stage having the highest frequency of use in the sub gear-shifting part, in a direct connection manner.

8. The transmission apparatus of claim 1, wherein the sub gear-shifting connection mechanism is a shaft.

9. The transmission apparatus of claim 1, wherein,
the sub gear-shifting drive mechanism includes a first sub gear-shifting sleeve,
the first sub gear-shifting sleeve is disposed between a first sub gear-shifting drive gear of the sub gear-shifting drive gears and a second sub gear-shifting drive gear of the sub gear-shifting drive gears,
the sub gear-shifting input mechanism includes a sub gear-shifting input gear,
the sub gear-shifting input gear is engaged with the first sub gear-shifting drive gear,
the second sub gear-shifting drive gear is the one sub gear-shifting drive gear,
the sub gear-shifting connection mechanism is coupled to the second sub gear-shifting drive gear.

10. The transmission apparatus of claim 9, wherein,
the sub gear-shifting part includes a sub gear-shifting output mechanism configured to output a driving power in which the second gear shifting is performed,
the sub gear-shifting drive mechanism includes a second sub gear-shifting sleeve, a connection shaft, a first connection gear, and a second connection gear,
the second sub gear-shifting sleeve is selectively connected to a third sub gear-shifting drive gear of the sub gear-shifting drive gear for the second gear shifting, and is coupled to the connection shaft,
the third sub gear-shifting drive gear is connected to the first sub gear-shifting drive gear, and is idly coupled to the connection shaft,
the first sub gear-shifting drive gear includes a first input gear for being engaged with the sub gear-shifting input gear, and a first sub output gear for being engaged with the third sub gear-shifting drive gear,
the connection shaft connects the second sub gear-shifting sleeve to the first connection gear,
the first connection gear is coupled to the connection shaft, and is engaged with the second connection gear, and
the second connection gear is coupled to the sub gear-shifting output mechanism.

11. The transmission apparatus of claim 10, wherein the second sub gear-shifting sleeve is positioned between the third sub gear-shifting drive gear and the first connection gear.

12. The transmission apparatus of claim 10, wherein the third sub gear-shifting drive gear is positioned between the second sub gear-shifting sleeve and the first connection gear.

* * * * *